United States Patent
Oyama

(10) Patent No.: US 8,090,195 B2
(45) Date of Patent: Jan. 3, 2012

(54) COMPOUND EYE IMAGING APPARATUS, DISTANCE MEASURING APPARATUS, DISPARITY CALCULATION METHOD, AND DISTANCE MEASURING METHOD

(75) Inventor: Ichiro Oyama, Osaka (JP)

(73) Assignee: Panasonic Corporation, Osaka (JP)

( * ) Notice: Subject to any disclaimer, the term of this patent is extended or adjusted under 35 U.S.C. 154(b) by 331 days.

(21) Appl. No.: 12/594,975

(22) PCT Filed: Feb. 10, 2009

(86) PCT No.: PCT/JP2009/000534
§ 371 (c)(1), (2), (4) Date: Oct. 7, 2009

(87) PCT Pub. No.: WO2009/101798
PCT Pub. Date: Aug. 20, 2009

(65) Prior Publication Data
US 2010/0150455 A1    Jun. 17, 2010

(30) Foreign Application Priority Data
Feb. 12, 2008    (JP) ................... 2008-030598

(51) Int. Cl.
*G06K 9/00* (2006.01)
*H04N 15/00* (2006.01)

(52) U.S. Cl. .................................. 382/154; 348/42
(58) Field of Classification Search .......... 382/100–317; 348/42–60, 180–194
See application file for complete search history.

(56) References Cited

U.S. PATENT DOCUMENTS
4,745,562 A * 5/1988 Prazdny .......................... 702/71
(Continued)

FOREIGN PATENT DOCUMENTS
JP          62-066113          3/1987
(Continued)

OTHER PUBLICATIONS

International Search Report issued Mar. 24, 2009 in International (PCT) Application No. PCT/JP2009/000534.
(Continued)

*Primary Examiner* — Manav Seth
(74) *Attorney, Agent, or Firm* — Wenderoth, Lind & Ponack, L.L.P.

(57) ABSTRACT

A compound eye imaging apparatus can estimate a sub-pixel disparity with a high degree of accuracy without depending on a brightness of a surface of an object. The compound eye imaging apparatus includes: a standard imaging optical system generating a picture including a standard image; reference imaging optical systems of an even number equal to or larger than two arranged substantially point-symmetrically with respect to the standard imaging optical system, which generate an picture including a reference image; a correlation value calculation unit (6) calculating a correlation value for each shifting amount by which one of the reference images is shifted parallel to a baseline, with respect to the standard image, for each of the reference imaging optical systems of an even number equal to or larger than two; a correlation value addition unit (7) calculating an integrated correlation value by adding, to each corresponding shifting amount, the correlation value calculated for each of said reference imaging optical systems of an even number equal to or larger than two; and a disparity calculation unit (8) calculating a disparity that is a shifting amount resulting in the largest degree of similarity between the standard image and the reference image.

11 Claims, 35 Drawing Sheets

U.S. PATENT DOCUMENTS

| | | | |
|---|---|---|---|
| 4,803,645 A | | 2/1989 | Ohtomo et al. |
| 5,109,425 A * | | 4/1992 | Lawton .................... 382/107 |
| 5,179,441 A * | | 1/1993 | Anderson et al. ............ 348/43 |
| 5,612,735 A * | | 3/1997 | Haskell et al. ............... 348/43 |
| 5,652,616 A * | | 7/1997 | Chen et al. .................. 348/43 |
| 5,719,954 A * | | 2/1998 | Onda ........................ 382/154 |
| 5,867,591 A * | | 2/1999 | Onda ........................ 382/154 |
| 5,917,937 A * | | 6/1999 | Szeliski et al. ............. 382/154 |
| 6,125,198 A * | | 9/2000 | Onda ........................ 382/154 |
| 6,141,440 A * | | 10/2000 | Melen ....................... 382/154 |
| 6,215,899 B1 * | | 4/2001 | Morimura et al. .......... 382/154 |
| 6,222,938 B1 * | | 4/2001 | Melen ....................... 382/154 |
| 6,847,728 B2 * | | 1/2005 | Tao et al. ................... 382/106 |
| 6,961,481 B2 * | | 11/2005 | Lee et al. ................... 382/300 |
| 7,085,431 B2 * | | 8/2006 | Jones et al. ................. 382/278 |
| 7,164,784 B2 * | | 1/2007 | Beardsley ................... 382/154 |
| 7,231,081 B2 * | | 6/2007 | Snow et al. ................. 382/151 |
| 7,277,118 B2 * | | 10/2007 | Foote ........................... 348/36 |
| 7,710,463 B2 * | | 5/2010 | Foote ......................... 348/218.1 |
| 7,925,077 B2 * | | 4/2011 | Woodfill et al. ............. 382/154 |
| 7,961,954 B2 * | | 6/2011 | Rohaly ....................... 382/209 |
| 2002/0012459 A1 * | | 1/2002 | Oh .............................. 382/154 |
| 2003/0090681 A1 * | | 5/2003 | Jones et al. ................. 356/614 |
| 2004/0005082 A1 * | | 1/2004 | Lee et al. .................... 382/103 |
| 2004/0022431 A1 * | | 2/2004 | Beardsley ................... 382/154 |
| 2006/0171598 A1 * | | 8/2006 | Lebowsky et al. .......... 382/232 |

FOREIGN PATENT DOCUMENTS

| | | |
|---|---|---|
| JP | 64-073468 | 3/1989 |
| JP | 7-234111 | 9/1995 |
| JP | 8-061932 | 3/1996 |
| JP | 9-049728 | 2/1997 |
| JP | 2000-283753 | 10/2000 |

OTHER PUBLICATIONS

Jo Go et al., "Sanjigen Bijon" Kyoritsu Shuppan Co., Ltd., pp. 96-99, Apr. 20, 1998.

* cited by examiner

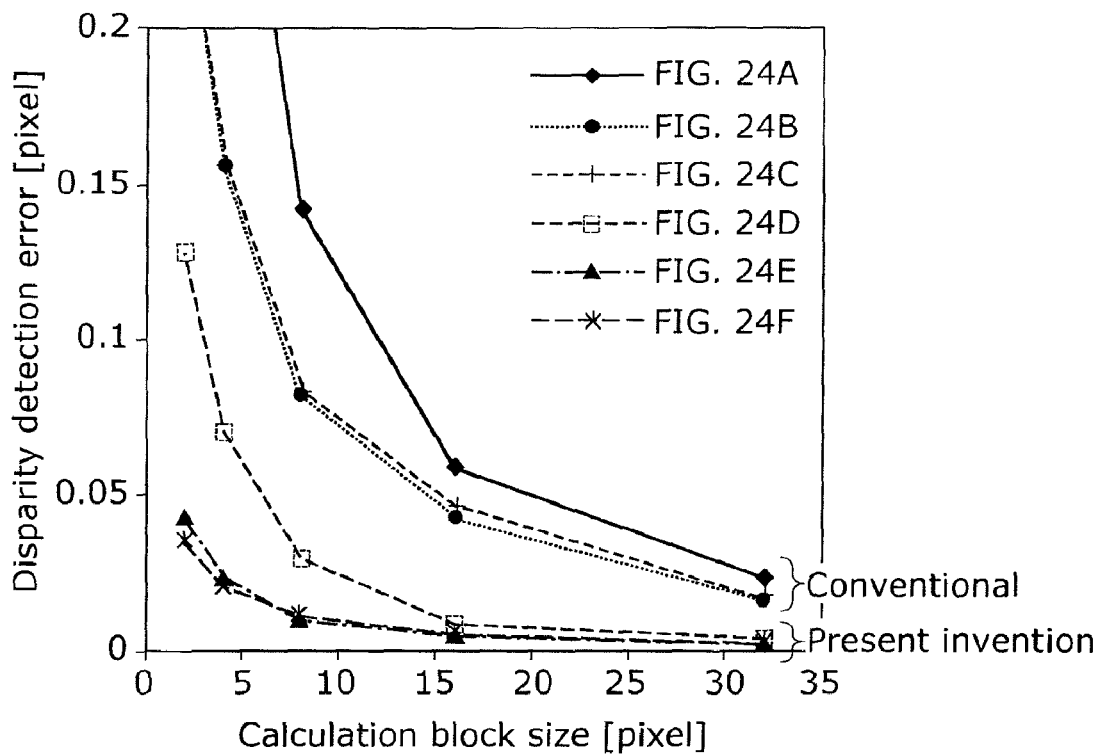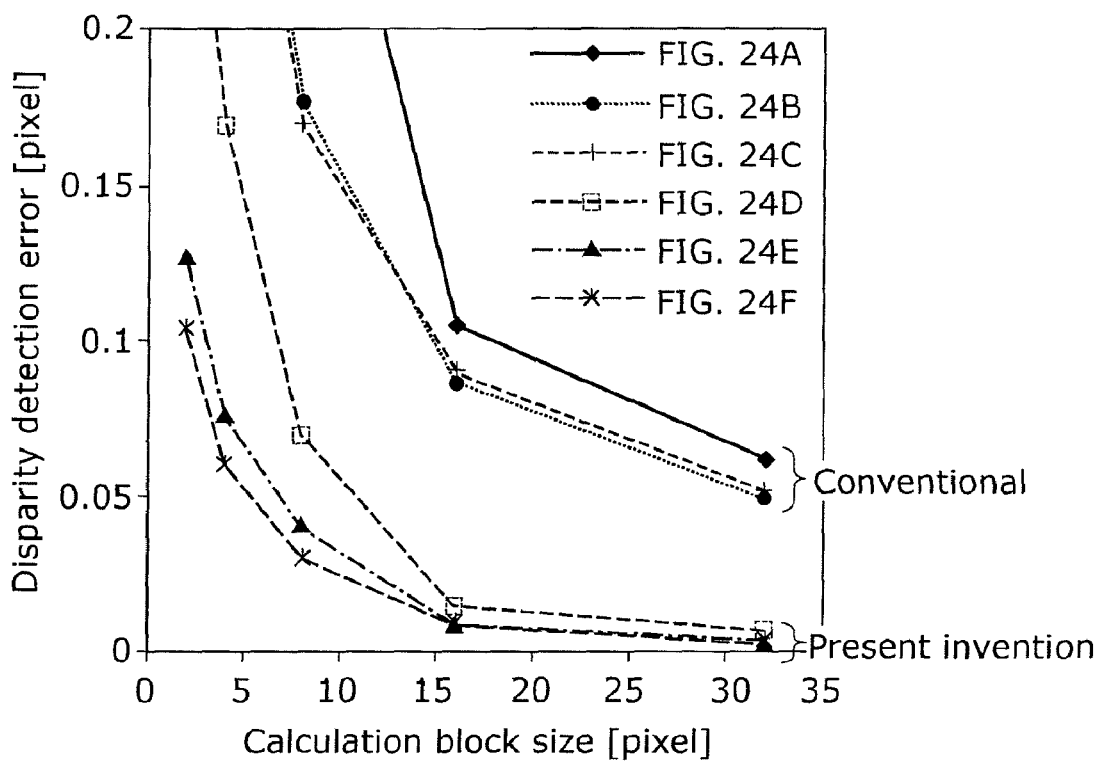

Image block a

Image block b

COMPOUND EYE IMAGING APPARATUS, DISTANCE MEASURING APPARATUS, DISPARITY CALCULATION METHOD, AND DISTANCE MEASURING METHOD

TECHNICAL FIELD

The present invention relates to a compound eye imaging apparatus and the like which include plural imaging optical systems and calculate a disparity that occurs between the imaging optical systems.

BACKGROUND ART

In recent years, there has been an increasing demand for measuring a distance from an intended position to an object or a three-dimensional position (shape) of the object. For example, there has been proposed for a visibility support for a vehicle driver, a method for avoiding collision with surroundings more precisely by not only presenting an image of the surroundings captured by a compact camera mounted on a vehicle, but also concurrently presenting accurate information on the distance between the vehicle and the object measured by a distance measuring apparatus. Further, input and output devices for a three-dimensional image are in demand for mobile phones and television sets to reproduce more realistic images. The distance measuring apparatuses for the above-described applications are required to be miniaturized and have high precision.

A conventionally used method for measuring a distance to an object or a three-dimensional position of an object includes a stereo distance-measuring method that utilizes a principle of triangulation. With the stereo distance-measuring method, a distance to an object is calculated based on a disparity that occurs between plural cameras.

FIG. 30 is a diagram that describes an example of distance calculation to an object using the stereo distance-measuring method in the case where two cameras, a camera a and a camera b are used. Rays 101a and 101b of an object 100 form images on an imaging regions 104a and 104b via optical centers 105a and 105b of a lens 102a of a camera a and a lens 102b of a camera b, respectively. An optical axis 103a and an optical axis 103b represent an optical axis of each camera. In this case, when the object 100 forms an image at a position 107a that is away by Pa from an intersection 106a of the imaging region 104a and the optical axis 103a in the camera a, and at a position 107b that is away by Pb from an intersection 106b of the imaging region 104b and the optical axis 103b in the camera b, for example, a disparity P (=Pb−Pa) occurs between the camera a and the camera b. The disparity P changes depending on a distance D between the distance measuring apparatus and the object. When the optical axis 103a of the camera a and the optical axis 103b of the camera b are parallel to each other, the distance therebetween is a baseline length B, and a focal distance of the camera a and the camera b is f, the distance D to the object is expressed by (Equation 1). Therefore, when the baseline length B and the focal distance f are known by calibration processing and the like in advance, the distance D to the object 100 can be calculated by obtaining the disparity P.

[Equation 1]

$$D = f\frac{B}{P}$$ Equation 1

It is to be noted that the optical axes of the camera a and the camera b are not parallel to each other in many cases in a real environment. Therefore, rectification as shown in Non-patent reference 1 is performed. This produces a picture in which the optical axes are parallel, and it is known that the distance D can be calculated by using operation using the above (Equation 1).

The imaging regions 104a and 104b are configured generally by an imaging device such as CCD (charge coupled device) and CMOS (complementary metal oxide semiconductor). Therefore, the disparity P is calculated by using a brightness signal of an object image that has been discretized on a two-dimensional plane, so that a disparity detection resolution is one pixel in general. A distance measuring resolution (hereinafter referred to as a measuring accuracy) is determined from the relationship of (Equation 1) using the disparity detection resolution.

Further, the three-dimensional position of an object can be calculated by using a method described below with reference to FIG. 31 to FIG. 33, for example.

FIG. 31 is a diagram which shows a positional relationship of the distance measuring apparatus and the object. In FIG. 31, the original point Mw (0, 0, 0) of the world coordinate is the optical center 105a of the camera a. As shown in the diagram, when a three-dimensional position coordinate of a point 111 in the object 110 is Mw (Xw1, Yw1, Zw1), Zw1 is derived from the distance D calculated using (Equation 1) described with reference to FIG. 30.

FIG. 32 is a diagram which shows the camera a and the point 111 on the object viewed from the direction of a minus side of Yw axis. As shown in the diagram, when the intersection 106a is an original point ms (0, 0) of a two-dimensional coordinate system of the imaging region 104a, Xw1 can be expressed as (Equation 2) by using the coordinate ms (xs1, ys1) of an imaging position 107a.

[Equation 2]

$$Xw1 = xs1\frac{Zw1}{f}$$ Equation 2

FIG. 33 is a diagram which shows the camera a and the point 110 on the object viewed from the direction of a plus side of Xw axis. In the same manner as in FIG. 32, when the intersection 106a is the original point ms (0, 0) of the two-dimensional coordinate system of the imaging region 104a, Yw1 can be expressed as (Equation 3) by using the coordinate ms (xs1, ys1) of an imaging position 107a

[Equation 3]

$$Yw1 = ys1\frac{Zw1}{f}$$ Equation 3

A measuring accuracy of the three-dimensional position is also determined by the disparity detection resolution as well as the measuring accuracy described above.

The following describes a specific example of a method of calculating the disparity P. A SAD (sum of absolute difference) that is a correlation value of each sub region of each of the images is calculated for the picture captured in the imaging region 104a of the camera a and the picture b captured in the imaging region 104b of the camera b, and then the disparity P; that is, an image shift for each sub region between the picture a and the picture b is calculated by using the calculated correlation value. It is to be noted that the SAD is an example of the correlation value, and generally known SSD (sum of squared difference) and NCC (normalized cross-correlation) and the like can be used as the correlation value as well.

The following describes calculation of disparity that uses a SAD that is a representative correlation value with reference to FIG. 34 to FIG. 36.

FIG. 34 is a diagram that explains a method of expressing brightness of each pixel in a picture. As shown in the diagram, the gradation of brightness in each pixel is expressed by the density of lines, where 0 is black and 15 is white. The brightness may be a value after decimal point.

FIG. 35A is a diagram which illustrates a portion of a picture a when a texture of a imaged object is viewed from the direction of the object. FIG. 35B is a diagram which illustrates a portion of a picture b when a texture of an imaged object is viewed from the direction of the object.

In an image block b surrounded by a bold line in FIG. 35B, an image identical to the image in an image block a surrounded by a bold line in FIG. 35A appears when the object is at infinity. A disparity occurs in the case where the object is within a finite distance as shown in FIG. 35A and FIG. 35B, so that the image of FIG. 35B appears on the right with respect to the image in FIG. 35A. The case where FIG. 35A and FIG. 35B have actual disparity of 3.6 pixels will be described here. The image block b is shifted by one pixel in the right direction from the position indicated by the bold line in FIG. 35B in order to search for an image region which has the highest correlation with the image block a, and the SAD is calculated based on (Equation 4) for each shifting amount.

[Equation 4]

$$SAD = \Sigma |Ia(i,j) - Ib(i,j)| \quad \text{Equation 4}$$

Here, Ia and Ib represent a brightness value of respective image blocks, and i and j represent local address of respective image blocks. The image block a and the image block b are the same image size, and a sum of absolute values, in the block, of brightness difference at the same address in both image blocks is calculated for each shifting amount. The shape of the image block is explained as square here, however, the shape of the image block may be rectangular or correspond to the characteristic of the texture.

FIG. 36 is a diagram which illustrates a transition of the SAD when the image block b is shifted by one pixel at a time. The SAD is the smallest when the shifting amount is 4 pixels, and thus the correlation between the image block a and the image block b is considered to be the highest. Therefore, the disparity of the camera a and the camera b in the image block a is calculated as 4 pixels, and the disparity P of (Equation 1) is obtained by multiplying the calculated disparity by an pixel pitch size, so that the distance D to the object can be calculated. Although the disparity close to the actual disparity of 3.6 pixels can be obtained in this case, a disparity with the accuracy of pixels after the decimal point (hereinafter referred to as a sub-pixel disparity) cannot be obtained because the accuracy of disparity detection is one pixel.

A method of estimating a disparity of a sub-pixel level is proposed as a method to obtain a disparity with a measuring accuracy, that is, the distance measuring resolution of higher accuracy than a one pixel unit (see, for example, Patent Reference 1). With the method of estimating a sub-pixel disparity called equiangular linear fitting, for example, an actual disparity is estimated at the sub-pixel level through linear interpolation by assuming the SAD transition has the same tilt angle of θ in both the right and left side with respect to the actual disparity as shown in FIG. 37. An equation for calculating a sub-pixel disparity of an equiangular linear fitting, that is, an interpolation function is indicated by (Equation 5).

[Equation 5]

$$P = P\min + d \cdot \text{in the case of } R(1) < R(-1) \quad \text{Equation 5}$$
$$d = 0.5 \frac{R(1) - R(-1)}{R(0) - R(-1)} \cdot \text{in other cases}$$
$$d = 0.5 \frac{R(1) - R(-1)}{R(0) - R(1)}$$

Here, P is a sub-pixel disparity, Pmin is an shifting amount when the SAD is the smallest (integer disparity), R(0) is a correlation value (SAD) with the shifting amount having the smallest SAD, and R(−1) and R(1) are a SAD with adjacent shifting amount.

In addition, a method of interpolation calculation for an actual disparity through a linear function of higher order such as a quadratic function or a nonlinear function by assuming that a transition of correlation value such as the SAD for each shifting amount with the actual disparity being the basis is proposed. In the case of an object in which the brightness changes linearly as shown in FIG. 35A and FIG. 35B, the SAD transition becomes symmetrical with the actual disparity being the basis as shown in FIG. 36, and the SAD changes linearly. Therefore, the disparity of 3.6 pixels can be obtained accurately by performing sub-pixel disparity estimation by using equiangular linear fitting.

Patent Reference 1: Japanese Unexamined Patent Application Publication No. 2000-283753

Non-Patent Reference 1: "Sanjigen Bijon" Jo Go, Tsuji Saburo, Kyoritsu Shuppan Co., Ltd., pp 96 to 99, published on Sep. 25, 2002

DISCLOSURE OF INVENTION

Problems that Invention is to Solve

As described above, FIG. 35A, FIG. 35B, and FIG. 36 explain, as an example, the object of which a brightness distribution changes linearly and uniformly in the search direction. In such a case, since the transition of the correlation value becomes symmetrical with the actual disparity being the basis, it is possible to estimate a sub-pixel disparity with equiangular linear fitting. However, in an actual object, a pattern (texture) on the surface rarely changes uniformly, and the brightness distribution does not change uniformly in most cases as shown in FIG. 38A and FIG. 38B, for example.

FIG. 38A is a diagram which illustrates a portion of the picture a as viewed from the direction of the object. FIG. 38B is a diagram which illustrates a portion of the picture b as viewed from the direction of the object. In an image block b surrounded by a bold line in FIG. 38B, an image identical to the image in an image block a surrounded by a bold line in FIG. 38A appears when the object is at infinity. A disparity occurs in the case where the object is within a finite distance as shown in FIG. 30, so that the image of FIG. 38B moves to the right with respect to the image in FIG. 38A. Here, the case where FIG. 38A and FIG. 38B have an actual disparity of 3.6 pixels is described in the same manner as in FIG. 35A and FIG. 35B.

FIG. 39 is a diagram which explains a SAD transition in the case of the image in FIG. 38A and FIG. 38B, and estimation of a sub-pixel disparity using the above-mentioned equiangular linear fitting at the time. As shown in the diagram, the SAD transition is not symmetrical with the actual disparity being the basis, so that a result of estimating the sub-pixel disparity is not matched to the actual disparity. More specifically, the sub-pixel disparity is estimated as approximately 3.2 pixels. As a result, an error of approximately 0.4 pixels occurs between the estimated disparity and the actual disparity.

As described above, the interpolation function that performs a sub-pixel parallax estimation used in conventional stereo distance-measuring methods assumes the case where the transition of the correlation value becomes symmetrical with the actual disparity being the basis. Therefore, there has been a problem that an estimation error in disparity occurs in the case of an object of which the transition of the correlation value is not symmetrical with the actual disparity being the basis. Further, with a multiple eyes stereo camera that uses at least three optical systems as shown in FIG. 40A and FIG. 40B, for example, there has also been a problem that an estimation error in disparity occurs in the case of an object of which the transition of the correlation value is not symmetrical with the actual disparity being the basis.

The present invention has been conceived to solve the problems described above, and aims to provide a compound eye imaging apparatus or a distance measuring apparatus with which a transition of a correlation value becomes symmetrical with the actual disparity being the basis without depending on a brightness distribution of an object, and which can estimate a sub-pixel disparity with a high degree of accuracy by using a sub-pixel disparity estimation method with the above-mentioned conventional interpolation.

Means to Solve the Problems

In order to achieve the object described above, a compound eye imaging apparatus according to an aspect of the present invention is a compound eye imaging apparatus which calculates a disparity occurring in a plurality of imaging optical systems that take an image of a same object, and the apparatus includes: a standard imaging optical system which generates a picture including a standard image by taking an image of the object; reference imaging optical systems of an even number equal to or larger than two, each of which has an optical center and generates a picture including a reference image by taking an image of the object, the optical centers being arranged substantially point-symmetrically with respect to an optical center of the standard imaging optical system; a correlation value calculation unit configured to calculate a correlation value indicating a degree of similarity between the standard image and the reference image, for each shifting amount by which a search position of the reference image in the picture generated by the reference imaging optical systems is shifted in a direction parallel to a baseline so that an image position of the reference image which is similar to the standard image is searched for, for each of the reference imaging optical systems of an even number equal to or larger than two, the baseline being a straight line connecting the optical center of the standard imaging optical system and the optical center of the reference imaging optical systems; a correlation value addition unit configured to calculate an integrated correlation value by adding the correlation value to each corresponding shifting amount, the correlation value being calculated for each of the reference imaging optical systems of an even number equal to or larger than two; and a disparity calculation unit configured to calculate, at a sub-pixel level, a disparity that is a shifting amount which results in a largest degree of similarity between the standard image and the reference image.

The above structure makes it possible to add a correlation value calculated for each of the reference imaging optical systems of equal to or larger than two, which are arranged to be substantially symmetrical with respect to the standard imaging optical system, to each corresponding shifting amount. Therefore, a transition of the correlation value becomes symmetrical with the actual disparity being the basis without depending on an object, making it possible to estimate a sub-pixel disparity with a high degree of accuracy.

Here, a substantially point-symmetrically means that, in the case where two reference imaging optical systems are included, the optical centers of two reference imaging optical systems and the optical center of the standard imaging optical system are arranged substantially in alignment, and the baseline length of two reference imaging optical systems and the standard imaging optical system are substantially the same. Further, in the case where four reference imaging optical systems are included, the optical centers of added two reference imaging optical systems and the optical center of the standard imaging optical system are arranged substantially in alignment, and the baseline length of added two reference imaging optical systems and the standard imaging optical system are substantially the same. Furthermore, in the case where a larger number of reference imaging optical systems are included, each set of optical centers of an added pair of reference imaging optical systems and the optical center of the standard imaging optical system are arranged substantially in alignment, and the baseline length of each set of an added pair of reference imaging optical systems and the standard imaging optical system are substantially the same.

Further, it is preferable that the disparity calculation unit is configured to calculate a disparity at the sub-pixel level by interpolating the correlation value with use of an interpolation function using a symmetric property, the correlation value having been added for each of the shifting amounts by the correlation value addition unit.

The above structure makes it possible to estimate a sub-pixel disparity with a high degree of accuracy even with a conventional sub-pixel disparity estimation method by using an interpolation which is premised on a symmetric property.

Further, it is preferable that the compound eye imaging apparatus includes at least four reference imaging optical systems including a pair of first reference imaging optical systems and a pair of second reference imaging optical systems that are different from the first reference imaging optical systems arranged so that a direction of a baseline of the pair of first reference imaging optical systems is at an angle of a predetermined degree to a direction of a baseline of the pair of second reference imaging optical systems, the pair of first reference imaging optical systems being arranged substantially point-symmetrically with respect to the optical center of the standard imaging optical system and the pair of second reference imaging optical systems being arranged substantially point-symmetrically with respect to the optical center of the standard imaging optical system.

The above structure increases the number of reference imaging optical systems, that is, reference images compared to the case where two reference imaging optical systems are used, so that the amount of information increases and linearity of the transition of the correlation value is improved. Further, since the direction of the baseline that is a straight line connecting the optical centers of the standard imaging optical system and a pair of the reference imaging optical systems arranged substantially point-symmetrically with respect to the standard imaging optical system is at an angle of a predetermined degree to the direction of the baseline of the standard imaging optical system and other pair of reference imaging optical systems, the amount of information of the imaged object further increases, thereby improving linearity of the transition of the correlation value. As a result, the accuracy of estimating the sub-pixel disparity further improves.

Further, it is preferable that the at least four reference imaging optical systems are arranged so that a first baseline length differs from a second baseline length, the first baseline length being a length of the baseline of the first reference imaging optical system and the standard imaging optical system, the second baseline length being a length of the baseline of the second reference imaging optical system and the standard imaging optical system, and the correlation value calculation unit is configured to calculate, when calculating a correlation value of the reference image generated by the second reference imaging optical systems, the correlation value for each second shifting amount, the second shifting amount being a value obtained by multiplying a value resulted from subtracting the first baseline length from the second baseline length by the first shifting amount used for calculating the correlation value of the reference image generated by the first reference imaging optical systems.

The above structure makes it possible to increase the symmetric property of the transition of the correlation value even when the baseline length of the standard imaging optical system and a pair of the reference imaging optical systems arranged substantially point-symmetrically with respect to the standard imaging optical system differs from the baseline length of the standard imaging optical system and other pair of reference imaging optical systems. As a result, it is possible to increase flexibility in arrangement of the reference imaging optical systems, and to improve estimation accuracy of the sub-pixel disparity.

Further, it is preferable that the standard imaging optical system and the at least four reference imaging optical systems are arranged to have a same positional relationship as a positional relationship of pixels included in an imaging apparatus included in the standard imaging optical system.

With the above structure, a boundary of the block corresponding to the shifting amount is the same as a boundary of a pixel when performing block matching calculation, thereby eliminating the needs for image processing such as bilinear interpolation. As a result, it is possible to reduce calculation time for block matching calculation.

Further, it is preferable that, in each pair of the reference imaging optical systems arranged substantially point-symmetrically with respect to the optical center of the standard imaging optical system, an optical center position error satisfies: the optical center position error $\leq D \cdot pitch \cdot 0.15/f$, where D is a distance to the object, pitch is a pixel pitch, f is a focal length, and the optical center position error is a distance between a straight line and the optical center of one of the pair of reference imaging optical systems, the straight line connecting the optical center of an other of the pair of reference imaging optical systems and the optical center of the standard imaging optical system.

With the above structure, the transition of the correlation value becomes point-symmetrical with respect to the standard imaging optical system at a sufficient level without depending on an object, so that it is possible to estimate a sub-pixel disparity with a higher degree of accuracy than ever before.

Further, it is preferable that, in each pair of the reference imaging optical systems arranged substantially point-symmetrically with respect to the optical center of the standard imaging optical system, a baseline length error that is a difference in a length between a first baseline length and a second baseline length satisfies: the baseline length error $\leq D \cdot pitch \cdot 0.2/f$, where D is a distance to the object, pitch is a pixel pitch, and f is a focal length, the first baseline length being a distance between the optical center of one of the pair of reference imaging optical systems and the optical center of the standard imaging optical system.

With the above structure, the transition of the correlation value becomes point-symmetrical with respect to the standard imaging optical system at a sufficient level without depending on an object, so that it is possible to estimate a sub-pixel disparity with a higher degree of accuracy than ever before.

Further, it is preferable that the compound eye imaging apparatus further includes a preprocessing unit configured to apply a smoothing filter to the standard image and the reference image, and that the correlation value calculation unit is configured to calculate the correlation value based on the standard image and reference image to which smoothing filter has been applied.

The above structure makes it possible to lower the degree of decrease in accuracy caused by a noise, without depending on distribution of brightness of an object, and to smooth the variation of the brightness of the object. Therefore, in the case where the above-described SAD and equiangular linear fitting are used, for example, the linearity of the SAD transition improves with the symmetric property of the transition of the correlation value being retained, and the accuracy in estimating the sub-pixel disparity further improves.

Further, in order to achieve the object described above, a distance measuring apparatus according to an aspect of the present invention is a distance measuring apparatus which calculates a distance to an object or a three-dimensional location of the object by calculating a disparity occurring in a plurality of imaging optical systems that take an image of the same object, the apparatus including: a standard imaging optical system which generates a picture including a standard image by taking an image of the object; reference imaging optical systems of an even number equal to or larger than two, each of which has an optical center and generates a picture including a reference image by taking an image of the object, the optical centers being arranged substantially point-symmetrically with respect to an optical center of the standard imaging optical system; a correlation value calculation unit configured to calculate a correlation value indicating a degree of similarity between the standard image and the reference image, for each shifting amount by which a search position of the reference image in the picture generated by the reference imaging optical systems is shifted in a direction parallel to a baseline so that an image position of the reference image which is similar to the standard image is searched for, for each of the reference imaging optical systems of an even number equal to or larger than two, the baseline being a straight line connecting the optical center of the standard imaging optical system and the optical center of the reference imaging optical systems; a correlation value addition unit configured to calculate an integrated correlation value by adding the correlation value to each corresponding shifting amount, the correlation value being calculated for each of the reference imaging optical systems of an even number equal to or larger than two; a disparity calculation unit configured to calculate, at a sub-pixel level, a disparity that is a shifting amount which results in a largest degree of similarity between the standard image and the reference image; and a distance calculation unit configured to calculate a distance from the distance measuring apparatus to the object or a three-dimensional location of the object based on the calculated disparity, a focal length of the standard imaging optical system, and a length of the baseline.

With the above structure, the transition of the correlation value becomes symmetrical with the actual disparity being the basis without depending on an object by adding the correlation value calculated for each of the reference imaging optical systems of equal to or larger than two. Therefore, it is possible to estimate a sub-pixel disparity with a high degree of accuracy. As a result, it is possible to estimate a distance to an object to be imaged with a high degree of accuracy.

Further, a disparity calculation method according to an aspect of the present invention is a disparity calculation method for calculating a disparity occurring in a plurality of imaging optical systems that take an image of a same object, the plurality of imaging optical systems including: a standard imaging optical system which generates a picture including a standard image by taking an image of the object; and reference imaging optical systems of an even number equal to or larger than two, each of which has an optical center and generates a picture including a reference image by taking an image of the object, the optical centers being arranged substantially point-symmetrically with respect to an optical center of the standard imaging optical system, the disparity calculation method including: calculating a correlation value indicating a degree of similarity between the standard image and the reference image, for each shifting amount by which a search position of the reference image in the picture generated by the reference imaging optical systems is shifted in a direction parallel to a baseline so that an image position of the reference image which is similar to the standard image is searched for, for each of the reference imaging optical systems of an even number equal to or larger than two, the baseline being a straight line connecting the optical center of the standard imaging optical system and the optical center of the reference imaging optical systems; calculating an integrated correlation value by adding the correlation value to each corresponding shifting amount, the correlation value being calculated for each of the reference imaging optical systems of an even number equal to or larger than two; and calculating, at a sub-pixel level, a disparity that is a shifting amount which results in a largest degree of similarity between the standard image and the reference image.

The above structure makes it possible to produce an advantageous effect as that of the compound eye imaging apparatus described above.

Further, a distance measuring method according to an aspect of the present invention is a distance measuring method for calculating a distance to an object or a three-dimensional location of the object by calculating a disparity occurring in a plurality of imaging optical systems that take an image of the same object, the plurality of imaging optical systems including: a standard imaging optical system which generates a picture including a standard image by taking an image of the object; and reference imaging optical systems of an even number equal to or larger than two, each of which has an optical center and generates a picture including a reference image by taking an image of the object, the optical centers being arranged substantially point-symmetrically with respect to an optical center of the standard imaging optical system, the distance measuring method including: calculating a correlation value indicating a degree of similarity between the standard image and the reference image, for each shifting amount by which a search position of the reference image in the picture generated by the reference imaging optical systems is shifted in a direction parallel to a baseline so that an image position of the reference image which is similar to the standard image is searched for, for each of the reference imaging optical systems of an even number equal to or larger than two, the baseline being a straight line connecting the optical center of the standard imaging optical system and the optical center of the reference imaging optical systems; calculating an integrated correlation value by adding the correlation value to each corresponding shifting amount, the correlation value being calculated for each of the reference imaging optical systems of an even number equal to or larger than two; calculating, at a sub-pixel level, a disparity that is a shifting amount which results in a largest degree of similarity between the standard image and the reference image; and calculating a distance from the distance measuring apparatus to the object or a three-dimensional location of the object based on the calculated disparity, a focal length of the standard imaging optical system, and a length of the baseline.

The above structure makes it possible to produce an advantageous effect as that of the distance measuring apparatus described above.

It should be noted here that the present invention can also be realized as a program which causes a computer to execute steps included in the above-described disparity calculation method and the distance measuring method. Further, the program may be distributed via recording medium such as a compact disc-read only memory (CD-ROM) and a communication network such as the Internet.

Effects of the Invention

According to the present invention, a transition of a correlation value becomes symmetrical with an actual disparity being the basis, and it is possible to provide a compound eye imaging apparatus or a distance measuring apparatus which can estimate a sub-pixel disparity with a high degree of accuracy even with a conventional sub-pixel disparity estimation method with use of interpolation as described above.

BRIEF DESCRIPTION OF DRAWINGS

FIG. 26A is a diagram which illustrates performance evaluation with the distance measuring apparatus according to the practical example of the present invention.

FIG. 26B is a diagram which illustrates performance evaluation with the distance measuring apparatus according to the practical example of the present invention.

Figure 1:
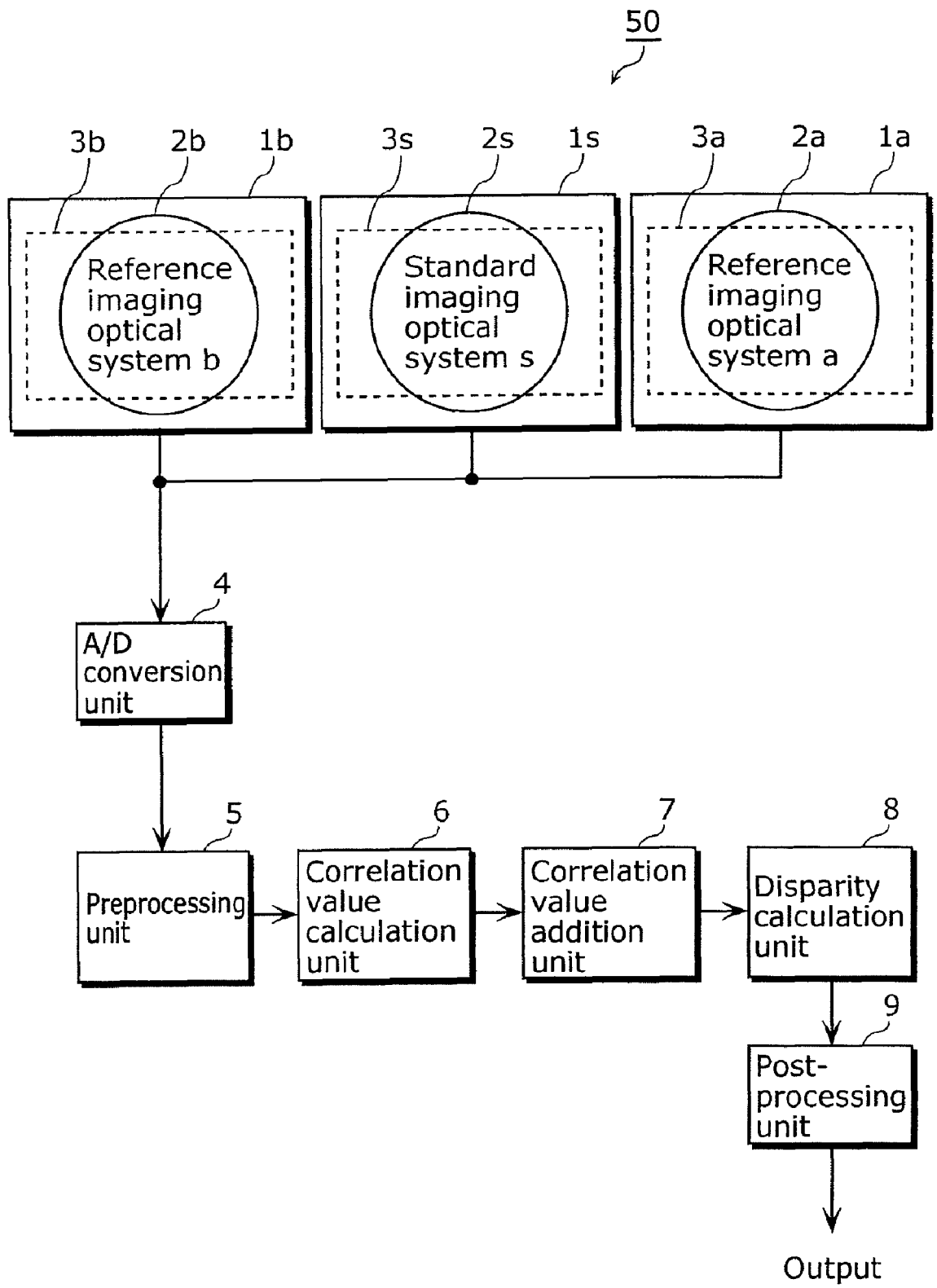
FIG. 1 is a diagram which illustrates a configuration of a distance measuring apparatus according to a first embodiment of the present invention.

NUMERICAL REFERENCES 1s, 1a, 1b camera
2s, 2a, 2b, 21a, 21b, 21c, 21d, 21e, 21f, 21g, 21h lens
3s, 3a, 3b, 22a, 22b, 22c, 22d, 22e, 22f, 22g, 22h imaging region
4 A/D conversion unit
5 preprocessing unit
6 correlation value calculation unit
7 correlation value addition unit
8 disparity calculation unit
9 post-processing unit
10s, 10a, 10b optical center
11s, 11a, 11b optical axis
12 object
13 dot on the surface of an object
14s, 14a, 14b, 15s, 15a, 15b block
16a, 16b, 17a, 17b arrow
20 compound eye camera
23 smoothing filter
24 disparity conversion unit
25s optical center
50, 60, 70, 80 distance measuring apparatus

BEST MODE FOR CARRYING OUT THE INVENTION

Embodiments according to the present invention will be described below with reference to the drawings.

First Embodiment

FIG. 1 is a diagram which illustrates a configuration of a distance measuring apparatus 50 according to the present embodiment. The distance measuring apparatus 50 includes: three cameras 1s, 1a, and 1b; A/D conversion unit 4; preprocessing unit 5; correlation value calculation unit 6, correlation value addition unit 7, a disparity calculation unit 8; and post-processing unit 9.

The three cameras 1s, 1a, and 1b have a configuration similar to each other. More specifically, the camera is includes a lens 2s and an imaging region 3s. The camera 1a and the camera 1b include a lens 2a and an imaging region 3a and a lens 2b and an imaging region 3b, respectively. Here, the camera is referred to as a standard imaging optical system s, and the cameras 1a and 1b are referred to as a reference imaging optical system a and a reference imaging optical system b, respectively.

The imaging regions 3s, 3a, and 3b are formed on a solid-state imaging device such as a CCD and a CMOS, and generate an image using a light passing through the lenses 2s, 2a, and 2b from an object.

Here, the standard imaging optical system s and the reference imaging optical systems a and b according to the present embodiment have a characteristic described below. First, an optical axis of each of the imaging optical systems is in parallel with each other. Further, an optical center of each of the imaging optical systems is arranged in a straight line, and the straight line is vertical to the optical axis. Furthermore, the imaging region (two-dimensional plane) and the optical axis of each of the imaging optical systems are arranged vertical to each other, and a focal distance (a distance from the imaging region to the optical center) is the same among all of the imaging optical systems. Further, a line connecting the optical center of each of the imaging optical systems, that is, an epipolar line, is in parallel with a pixel array in a horizontal direction of each of the imaging regions, and a disparity between the imaging optical systems occurs in the horizontal direction of the pixel array of each of the imaging regions.

It is to be noted that, the present invention does not necessary have to include the characteristics of the optical axis, the optical center, the imaging region, the focal distance, and so on of the standard imaging optical system s and the reference imaging optical systems a and b according to the present embodiment as described above. When it is correctable by performing calibration and the like, the optical axis, for example, is not necessary to be strictly parallel to each other. Further, when an error of a characteristic of the optical axis, the optical center, the imaging region, the focal distance, and the like is such extent that can be ignored, it raises no problem.

Further, the standard imaging optical system s is placed in the middle of three imaging optical systems, and a distance Ba that is a distance between the optical center of the standard imaging optical system s and the optical center of the reference imaging optical system a (hereinafter referred to as a baseline length) is the same as a distance (baseline length) Bb between the optical center of the standard imaging optical system s and the optical center of the reference imaging optical system b. In other words, the reference imaging optical systems a and b are placed point-symmetrically with respect to the standard imaging optical system s.

The A/D conversion unit 4 converts brightness information transmitted from an imaging device included in the imaging regions 3s, 3a, and 3b from an analogue value to a digital value (quantization). Here, an image of the imaging region 3s which is quantized by the A/D conversion unit 4 will be called a picture s, and images of the imaging region 3a and the imaging region 3b which are quantized by the A/D conversion unit 4 will be called a picture a and a picture b, respectively. The A/D conversion unit 4 may be configured separately for each of the cameras 1s, 1a, and 1b, or commonly for the cameras 1s, 1a, and 1b, or it may also be possible to configure only one of the A/D conversion units 4 separately.

The preprocessing unit 5 performs correction on a picture in order to perform correlation calculation such as calibration, shading correction of brightness, reduction compensation of difference in brightness between optical systems, with a high degree of accuracy, on the digitally converted brightness information of each of the imaging regions. The calibration includes, for example, lens distortion correction, rectification of a stereo image, and the like, which are generally well known. By performing the calibration, it is possible to obtain a picture in which a manufacturing error has been corrected. It is to be noted that, although the case where the preprocessing unit 5 performs picture correction such as calibration processing is described in the present embodiment, the distance measuring apparatus to which the present invention is applied is not limited to such a distance measuring apparatus. It may also be possible that the distance measuring apparatus does not include calibration processing, for example.

The correlation value calculation unit 6, which will be described in detail later, calculates, for each of the reference imaging optical systems a and b, a correlation value that indicates a degree of similarity between a standard image included in the picture s and a reference image included in the picture a or b, for each shifting amount in the case where the standard image and the reference image are compared by shifting an image position (picture coordinate) of the reference image with respect to the standard image along the direction of a baseline that is a straight line connecting the optical center of the standard imaging optical system s and the optical center of the reference imaging optical system a or b (block matching calculation). Here, shifting an image position of one of the reference images with respect to the standard image means selecting a portion of a region of each of the pictures generated by the standard imaging optical system and the reference imaging optical system as the standard image and the reference image, respectively, and shifting the selected position (search position) of the reference image with respect to the standard image.

The correlation value addition unit 7, which will be described in detail later, calculates an integrated correlation value which has a symmetrical distribution with an actual disparity being a basis, by adding the correlation value calculated for each combination of the imaging optical systems in the correlation value calculation unit 6 to each of the corresponding shifting amounts.

The disparity calculation unit 8 estimates a disparity of a sub-pixel level in the standard image and the reference image by interpolating the integrated correlation value which has the symmetrical distribution with the actual disparity being the basis and has been added by the correlation value addition unit 7, with use of an interpolation formula utilizing the symmetric property. Here, the sub-pixel level means an accuracy of a pixel after the decimal point.

The post-processing unit 9 generates data corresponding to output of each application, such as calculation of a three-dimensional position of the object (or a distance from the distance measuring apparatus to the object), filtering of estimated three-dimensional shape, generation of a texture of the object which has been estimated, and the like, based on the disparity of sub-pixel level which has been calculate by the disparity calculation unit 8. It is to be noted that, although the present embodiment describes the case where the post-processing unit 9 calculates a three-dimensional position of or a distance to the object, the apparatus to which the present invention is applied is not limited to such a distance measuring apparatus. The post-processing unit 9 may be a device that outputs disparity calculated by the disparity calculation unit 8 to a different device, for example. In this case, since a distance to the object is not measured, the apparatus that calculates the disparity is called a compound eye imaging apparatus.

Figure 2:
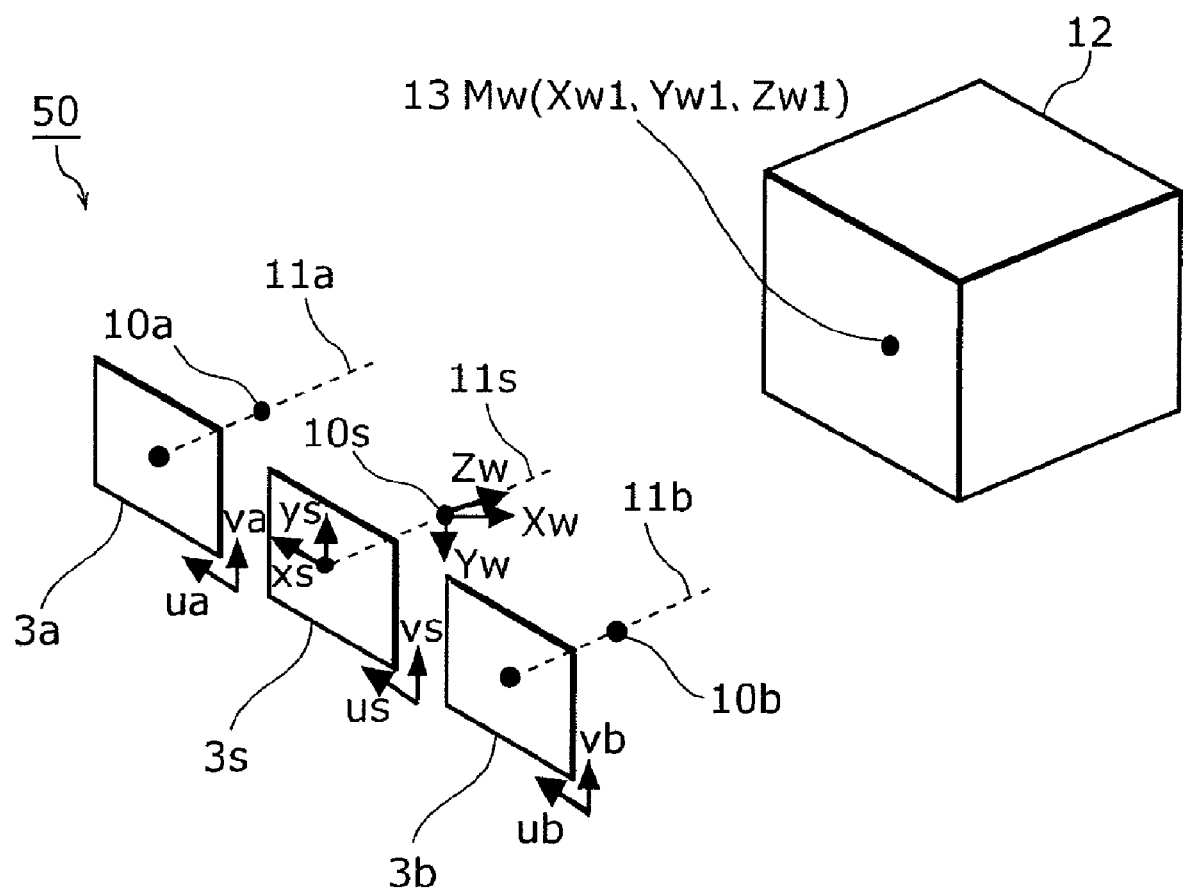
FIG. 2 is a diagram which illustrates a positional relationship between the distance measuring apparatus and an object according to the first embodiment of the present invention.

FIG. 2 is a diagram which illustrates a positional relationship between the distance measuring apparatus 50 and an object 12 as shown in FIG. 1. An optical center 10s is an optical center of the standard imaging optical system s, an optical center 10a is an optical center of the reference imaging optical system a, and an optical center 10b is an optical center of the reference imaging optical system b. Here, it is assumed that the optical center 10s of the standard imaging optical system s is an original point Mw (0, 0, 0,) of a three-dimensional world coordinate system.

An optical axis 11s is an optical axis of the standard imaging optical system s, an optical axes 11a and 11b are axes of the reference imaging optical system a and the reference imaging optical system b, respectively.

The object 12 is an object of which a three-dimensional position or a distance is measured.

A dot 13 on a surface of an object is a dot on the surface of the object 12, and a region surrounding the dot 13 is arranged parallel to the imaging region. Further, a world coordinate of the dot 13 is Mw (Xw1, Yw1, Zw1).

The following describes a fundamental operation of the distance measuring apparatus 50 configured as described above according to the present embodiment.

Figure 3:
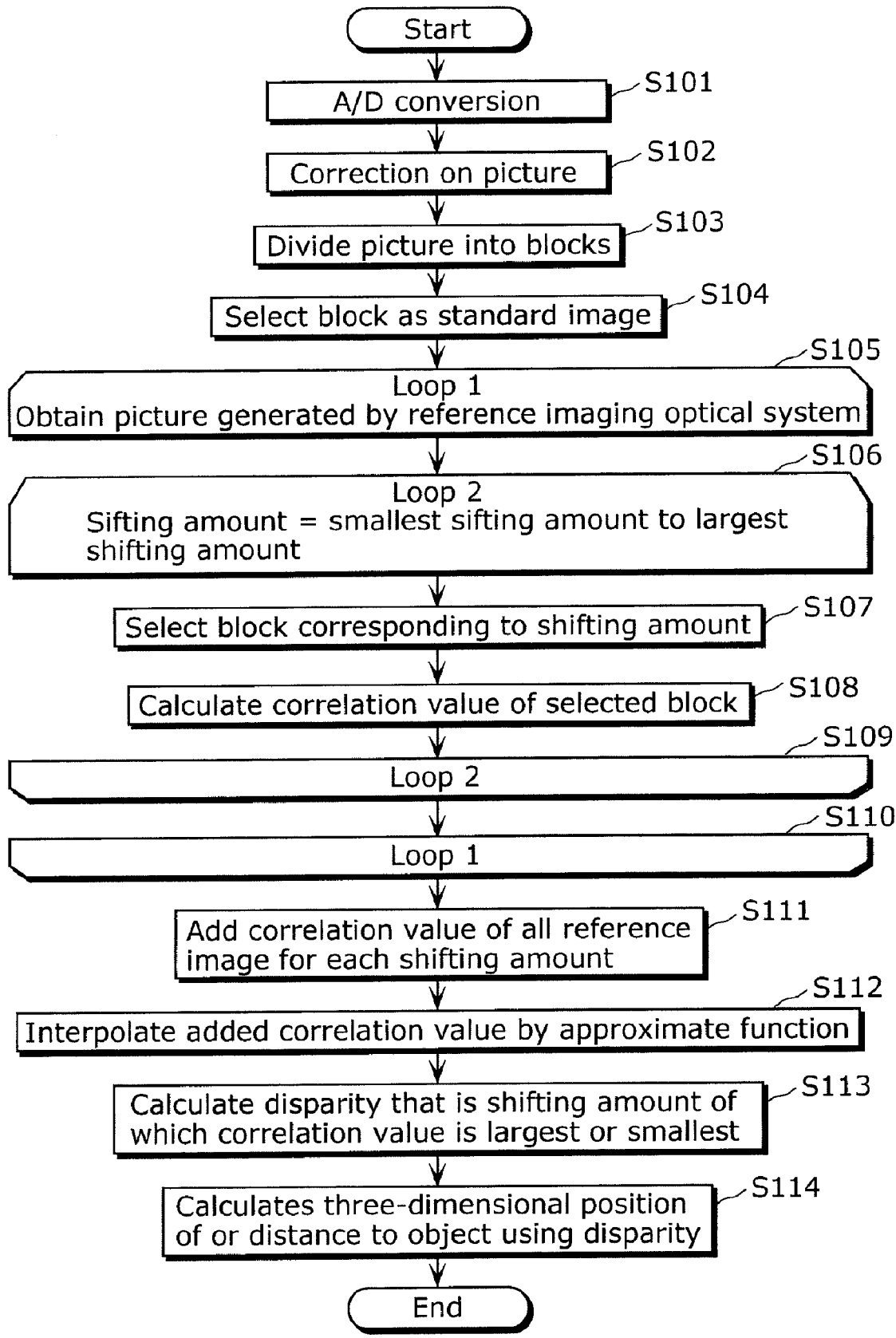
FIG. 3 is a flowchart which shows an operational flow of calculating a three-dimensional location of or distance to the object performed by the distance measuring apparatus according to the first embodiment of the present invention.

FIG. 3 is a flowchart which shows a processing flow of calculating a three-dimensional position of or a distance to the object 12 performed by the distance measuring apparatus 50.

First, the A/D conversion unit 4 converts, from an analogue value to a digital value, brightness information transmitted from an imaging device included in the imaging regions 3s, 3a, and 3b (S101).

Next, the preprocessing unit 5 performs correction on a picture in order to perform correlation calculation such as calibration, shading correction of brightness, reduction compensation of difference in brightness between optical systems, with a high degree of accuracy, on the digitally converted brightness information of each of the imaging regions (S102).

Next, the correlation value calculation unit 6 divides the picture on which correction has been performed in Step S102, into predetermined sub regions (hereinafter referred to as blocks) (S103). Then, the correlation value calculation unit 6 selects, as a standard image, a block of a picture s corresponding to the dot 13 on the surface of the object 12 of which a three-dimensional position or a distance is calculated (S104). Then, the correlation value calculation unit 6 starts a loop 1 when a picture a or a picture b which has been generated by the reference imaging optical system and has not yet been performed processes of Steps S106 to S109, is obtained (S105). Further, the correlation value calculation unit 6 starts a loop 2 when a shifting amount is obtained (S106).

Then, the correlation value calculation unit 6 selects, as a reference image, a block corresponding to the shifting amount obtained in Step S106, from the picture a or the picture b obtained in Step S105 (S107). Next, a correlation value, such as SAD, which represents a degree of similarity between the standard image that is a block of the picture s selected in Step S104 and the reference image that is a block of the picture a or the picture b selected in Step S107, is calculated (S108).

As described above, the correlation value calculation unit 6 calculates a correlation value for each shifting amount in order from the predetermined smallest shifting amount to larger shifting amounts (S106 to S109). Here, when the shifting amount reaches the predetermined largest shifting amount, the correlation value calculation unit 6 terminates the loop 2 (S106 to S109).

Further, when the loop 2 (S106 to S109) that is the calculation of the correlation value for each shifting amount, is terminated, the correlation value calculation unit 6 obtains a picture which has been generated by the reference imaging optical system and has not yet been performed the process of calculating the correlation value, and repeats the processes of the loop 2 (S106 to S109). Here, when there is no picture which has been generated by the reference imaging optical system and has not yet been performed the process of calculating the correlation value, that is, when processing of both the picture a and the picture b has ended, the correlation value calculation unit 6 terminates the loop 1 (S105 to S110).

Next, the correlation value addition unit 7 calculates an integrated correlation value by adding, for each of the corresponding shifting amounts, the correlation value between the standard image and each of the reference images calculated through the above-described processing (S111). The integrated correlation value obtained by this processing has a symmetrical distribution with the actual disparity being the basis.

Then, the disparity calculation unit 8 interpolates the correlation value for each of the shifting amounts after the addition in Step S111, with use of an interpolation formula utilizing the symmetric property (S112). The interpolation function used here is, for example, an interpolation function used in a sub-pixel disparity estimation method such as an equiangular linear fitting and a parabolic fitting (a fitting using a quadratic function), assuming that the correlation value has a symmetrical distribution with the actual disparity being the basis. Then, the disparity calculation unit 8 calculate a sub-pixel disparity that is a shifting amount of which the correlation value is the largest or the smallest (degree of similarity is the highest) by using the interpolated correlation value (S113). To be more specific, in the case where the SAD is used as a correlation value, the disparity calculation unit 8 calculates the shifting amount of which the SAD is the smallest, as the sub-pixel disparity.

The post-processing unit 9 calculates the three-dimensional position of or the distance to the object by using the disparity obtained as descried above (S114).

It is to be noted that, although the distance measuring apparatus 50 obtains the sub-pixel disparity for a single block selected in the picture s and calculates the three-dimensional position of or the distance to the object in the processing described above, it may also be possible to calculate the three-dimensional position of or the distance to the object by repeating selection of a block in the picture s and obtains the sub-pixel disparity for all of the blocks in the picture s.

The following describes, as a specific example of the processing described in FIG. 3, calculation of the three-dimensional position of the object 12 performed by the distance measuring apparatus 50 with reference to FIG. 4 to FIG. 7.

Figure 4:
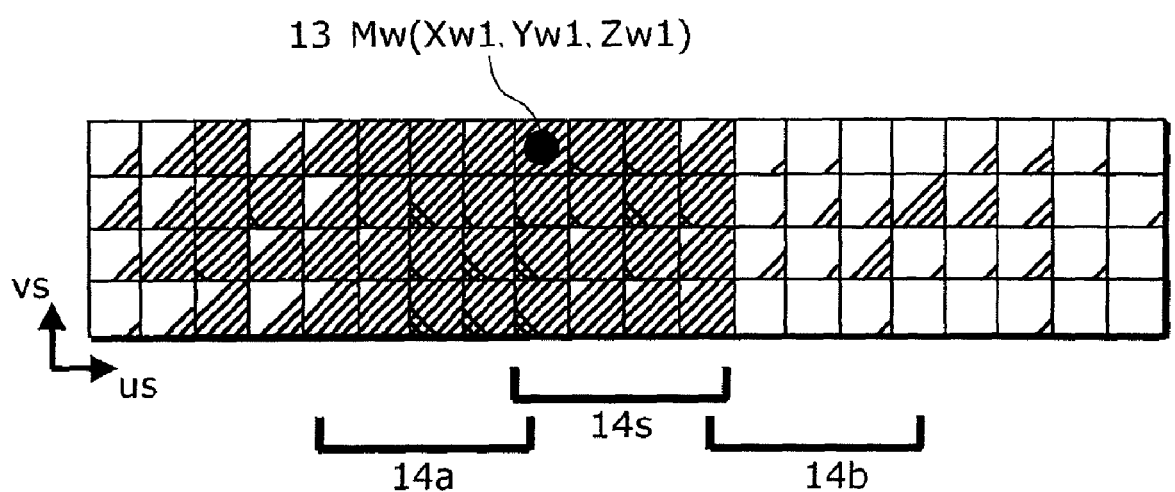
FIG. 4 is a diagram which illustrates a portion of a picture viewed from the direction of the object when texture of the circumference of a dot 13 on the surface of the object is captured by the standard imaging optical system according to the first embodiment of the present invention.

FIG. 4 is a diagram which illustrates a portion of the picture s viewed from the direction of the object in the case where texture of the circumference of the dot 13 on the surface of the object 12 in FIG. 2 is captured by the standard imaging optical system s. Each square represents an pixel as in the description of the Background Art, and the density of lines in each of the pixels represents a brightness value. As shown in the drawing, it is assumed that the dot 13 corresponds to a position indicated by a black circle on the picture s.

In such a case, the correlation value calculation unit 6 divides a picture obtained from each of the imaging optical systems into predetermined sub regions (blocks) and calculates the three-dimensional position for each of the blocks, as shown in Step S103 in FIG. 3.

In the case where the block size of the standard imaging optical system s is assumed to be 4-horizontal×4-vertical pixels, a block located at a position of a block 14s including the dot 13 on the surface of the object 12 which is a target for measurement is selected as a standard image in the picture s as shown in Step S104 in FIG. 3. It is to be noted that, selection of the standard image in the picture s may be performed in whatever way as long as the dot 13 on the surface of the object 12 that is the target for the measurement is included. For example, it may be possible to select, as the standard image, a block shifted to the left by one pixel from the position indicated in FIG. 4.

Here, since the baseline length Ba between the standard imaging optical system s and the reference imaging optical system s is the same as the baseline length Bb between the standard imaging optical system s and the reference imaging optical system b, the disparity between the picture s and the picture a is the same in size as and opposite in direction to the disparity between the picture s and the picture b. Here, the actual disparity between the picture a and the picture b is assumed to be 3.6 pixels.

Figure 5A:
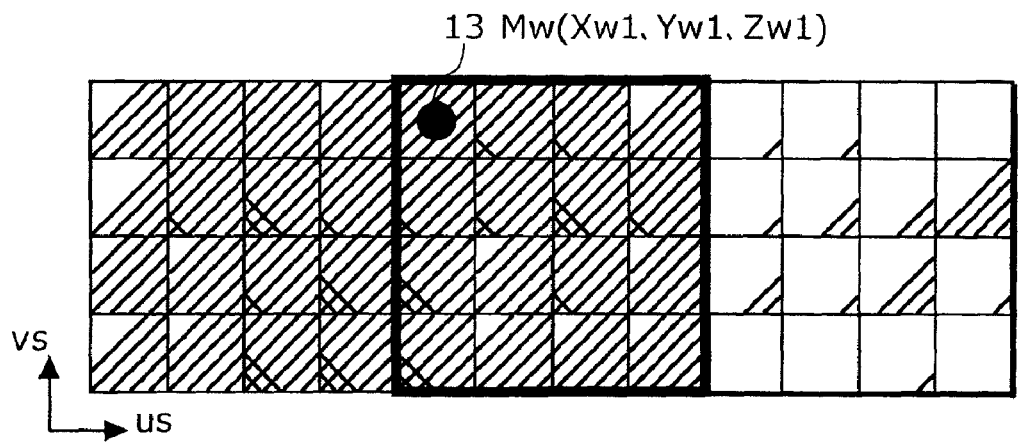
FIG. 5A is a diagram which illustrates a portion of a picture captured by the imaging optical system according to the first embodiment of the present invention.
Figure 5B:
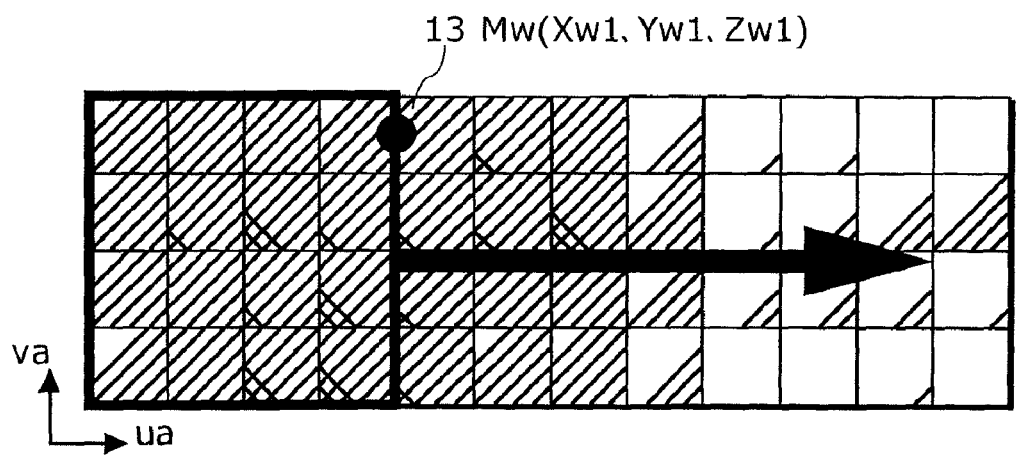
FIG. 5B is a diagram which illustrates a portion of a picture captured by the imaging optical system according to the first embodiment of the present invention.
Figure 5C:
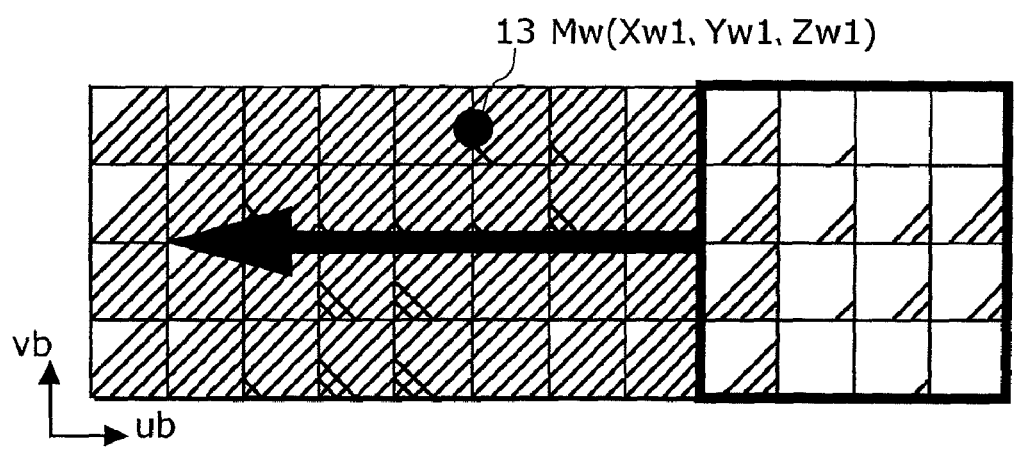
FIG. 5C is a diagram which illustrates a portion of a picture captured by the imaging optical system according to the first embodiment of the present invention.

In the case where the actual disparity is 3.6 pixels as described above, on the picture coordinate of the picture a which is the same as the block 14s in the picture s, an image of the position of the block 14a shown in FIG. 4 appears. Further, on the picture coordinate of the picture b which is the same as the block 14s in the picture s, an image of the position of the block 14b shown in FIG. 4 appears. More specifically, an image of the object 12 on the picture coordinate which is the same among the picture s, the picture a, and the picture b becomes as shown in FIG. 5A to FIG. 5C. Here, the picture coordinate is assumed to be a coordinate indicating a position of a pixel in the case where the intersection of an optical axis and an imaging surface of each of the imaging optical systems is assumed to be an original point. It is to be noted that, when the object is located at infinity, an image of the object forms at the same picture coordinate in the picture s, picture a, and picture b.

FIG. 5A is a diagram which illustrates a portion of the picture s captured by the standard imaging optical system s. FIG. 5B is a diagram which illustrates a portion of the picture a captured by the reference imaging optical system a. FIG. 5C is a diagram which illustrates a portion of the picture b captured by the reference imaging optical system b.

The 4×4 pixel blocks surrounded by a bold line in each of the pictures in FIG. 5A to FIG. 5C correspond to the blocks 14s, 14a, and 14b shown in FIG. 4, respectively, and represent the blocks on the same picture coordinate. The following shows a method of calculating the correlation value In the case where the SAD obtained from the (Equation 4) is used as the correlation value between the picture s and the picture a, or between the picture s and the picture b.

First, as shown in Steps S105 to S110 in FIG. 2, the correlation value calculation unit 6 obtains the picture a that is the picture of FIG. 5B, from among pictures captured by the reference imaging optical systems. Then the correlation value calculation unit 6 calculates the SAD between the block of the picture s that is the selected standard image, that is, the block surrounded by the bold line of FIG. 5A and the reference image that is the block of the picture a. At this time, the correlation value calculation unit 6 selects a block to be the reference image by shifting a block by one pixel at a time to the direction of the disparity, that is, to the right in the horizontal direction of the picture indicated by an arrow of FIG.

Figure 6A:
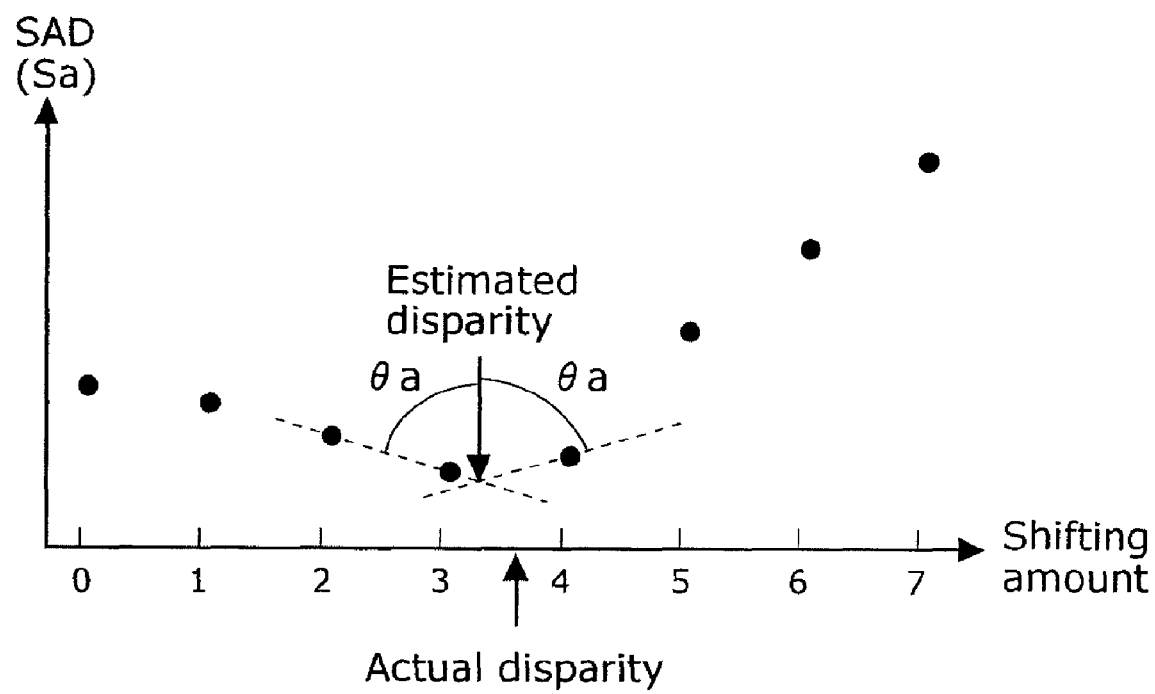
FIG. 6A is a diagram which illustrates a transition of a SAD according to the first embodiment of the present invention.

5B, from the block surrounded by the bold line of FIG. 5B corresponding to 0 pixel that is the smallest shifting amount to the block corresponding to 7 pixels that is the largest shifting amount. As a result, the SAD for each of the shifting amounts is calculated. FIG. 6A shows a transition of the SAD calculated as described above.

Figure 6B:
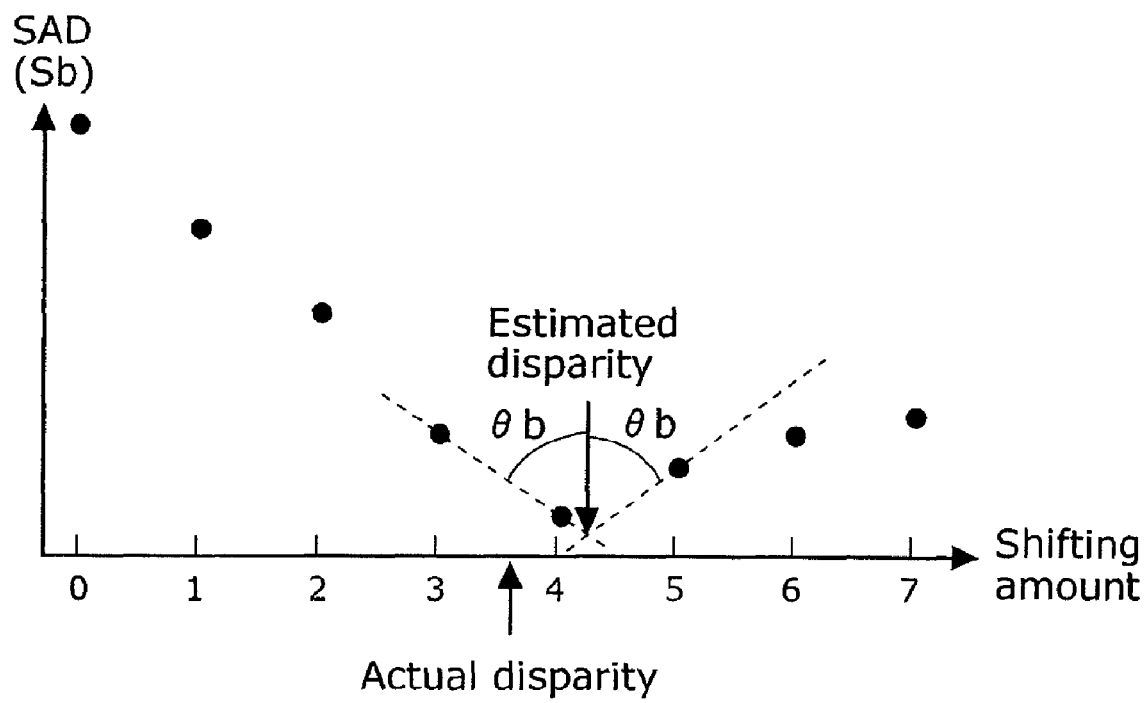
FIG. 6B is a diagram which illustrates a transition of a SAD according to the first embodiment of the present invention.

Next, the correlation value calculation unit 6 selects the picture b of which the correlation value has not yet been calculated, that is, a picture of FIG. 5C. Then the correlation value calculation unit 6 calculates the SAD between the standard picture and the reference image, as in the case of the picture a. At this time, the correlation value calculation unit 6 selects a block to be the reference image by shifting a block by one pixel at a time to the direction of the disparity, that is, to the left in the horizontal direction of the picture indicated by an arrow of FIG. 5C, from the block surrounded by the bold line of FIG. 5C corresponding to 0 pixels that is the smallest shifting amount to the block corresponding to 7 pixels that is the largest shifting amount. As a result, the SAD for each of the shifting amounts is calculated. FIG. 6B shows a transition of the SAD calculated as described above.

FIG. 6A and FIG. 6B are diagrams which show a transition of the SAD between the picture s and the picture a, and the picture s and the picture b. Since the transition of the SAD as shown in each of the diagrams has an unsymmetrical shape with the actual disparity being the basis, when a sub-pixel disparity is estimated by the equiangular linear fitting as described above, an error of 0.4 pixels occurs in the minus side in the picture a (FIG. 6A) and an error of 0.5 pixels occurs in the plus side in the picture b (FIG. 6B) with respect to 3.6 pixels which is the actual disparity.

Thus, the correlation value addition unit 7 calculates an integrated correlation value by adding the SAD for each of the corresponding shifting amounts, so that the transition of the SAD has a symmetrical shape with the actual disparity being the basis as shown in Step S111 of FIG. 2.

Figure 7:
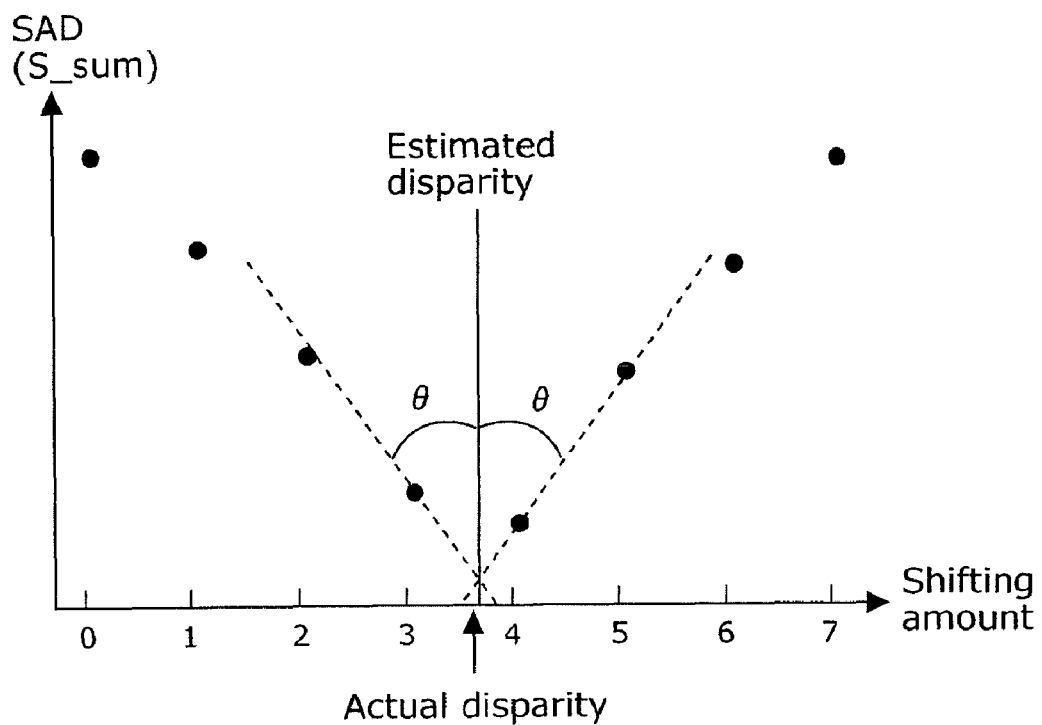
FIG. 7 is a diagram which illustrates a transition of an integrated SAD according to the first embodiment of the present invention.

FIG. 7 is a diagram which illustrates a transition of an integrated SAD that is an integrated correlation value in the case where the SAD shown in FIGS. 6A and 6B is added for each of the shifting amounts. As shown in the diagram, the transition of the SAD after the addition has a symmetrical shape with the actual disparity being the basis. Here, when it is assumed that the transition of the SAD in FIG. 6A is Sa(i) and that the transition of the SAD in FIG. 6B is Sb(i), S_sum (i) that is a transition of the integrated SAD calculated by the correlation value addition unit 7 can be calculated by using (Equation 6).

[Equation 6]

$$S\_sum(i) = Sa(i) + Sb(i) \qquad \text{Equation 6}$$

(i=the smallest shifting amount, the smallest shifting amount+1, the smallest shifting amount+2, . . . the largest shifting amount)

As described above, since the transition of the integrated SAD has a symmetrical shape with the actual disparity being the basis, when a sub-pixel disparity is estimated by the aforementioned equiangular linear fitting with use of the interpolation formula utilizing the symmetric property as shown in Step S112 of FIG. 2, the disparity calculation unit 8 can calculate the disparity with an error being less than a 0.1 pixel as shown in FIG. 7. Therefore, it is possible to significantly improve the accuracy of estimating a sub-pixel disparity, compared to the case where the transition of the SAD has an unsymmetrical shape. More specifically, with the equiangular linear fitting, it is possible to estimate a sub-pixel disparity without an error in the case where the transition of the SAD has a symmetrical shape with the actual disparity being the basis and the transition of the SAD has a linear shape. As shown in FIG. 7, although an estimation error of the disparity occurs because the transition of the SAD does not have a linear shape, it is possible to make the transition of the SAD symmetrical with the actual disparity being a basis by adding the correlation value (SAD), so that an estimation error of the disparity can be significantly minimized.

As described above, based on the disparity of sub-pixel level calculated by the disparity calculation unit 8, the post-processing unit 9 outputs data by converting the disparity into a form that corresponds to the output as shown in Step S114 in FIG. 3. For example, when a three-dimensional position of an object is outputted, m (us1, vs1) that is a two-dimensional picture coordinate system of the picture s is converted into ms (xs1, ys1) that is a two-dimensional coordinate system where an intersection point between the optical axis 10S and the imaging region 3s of FIG. 2 is an original point, so that a three-dimensional position for each of the blocks of the picture s can be obtained by using (Equation 1), (Equation 2), and (Equation 3) as in the description in the Background Art. Here, the disparity P of (Equation 1) can be obtained by multiplying the obtained sub-pixel disparity by a pixel pitch. Further, in the case where only a distance from the distance measuring apparatus to the object is calculated, the distance can be obtained by using (Equation 1) as in the description in the Background Art.

Next, a principle that the integrated correlation value (here, the integrated SAD) becomes symmetrical with respect to the actual disparity as shown in FIG. 7 according to the present embodiment will be explained with reference to FIG. 9A and FIG. 9B.

Figure 8:
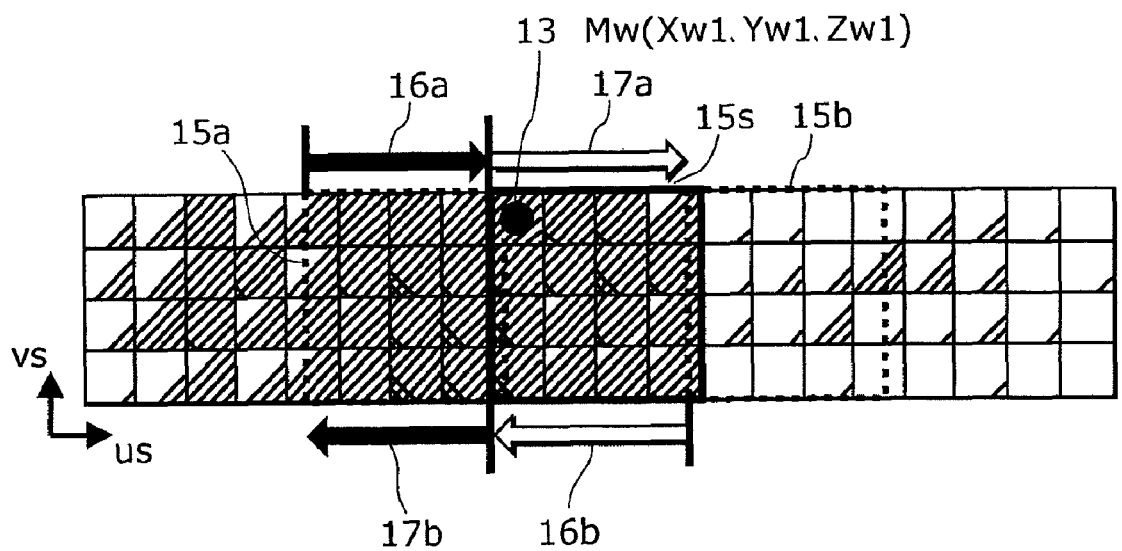
FIG. 8 is a diagram which illustrates texture of the circumference of a dot on an object imaged on a picture according to the first embodiment of the present invention.

FIG. 8 is a diagram which illustrates a texture of the circumference of the dot 13 on the surface of the object 12 imaged on the picture s as viewed from the direction of the object 12. Further, a block 15s surrounded by the bold line is the same as the block surrounded by the bold line as shown in FIG. 5A.

A block 15a surrounded by the dot line is an image region of the picture a which appears on the same picture coordinate as the block 15s of the picture s. Further, a block 15b surrounded by the dot line is an image region of the picture b which appears on the same picture coordinate as the block 15s of the picture s. Here, the transition of the SAD as shown in FIG. 6A corresponds to a transition obtained by shifting the block of the picture a that is the reference image in the regions indicated by a black arrow 16a and a white arrow 17a in FIG. 8. On the other hand, the transition of the SAD as shown in FIG. 6B corresponds to a transition obtained by shifting the block of the picture b that is the reference image in the regions indicated by a white arrow 16b and a black arrow 17b in FIG. 8.

Here, the SAD can be calculated only as a discrete dot with calculation. Thus, FIG. 9A and FIG. 9B show a transition of the SAD in the case where an interval of calculating the SAD, in other words, a sample spacing is assumed to be indefinitely small.

Figure 9A:
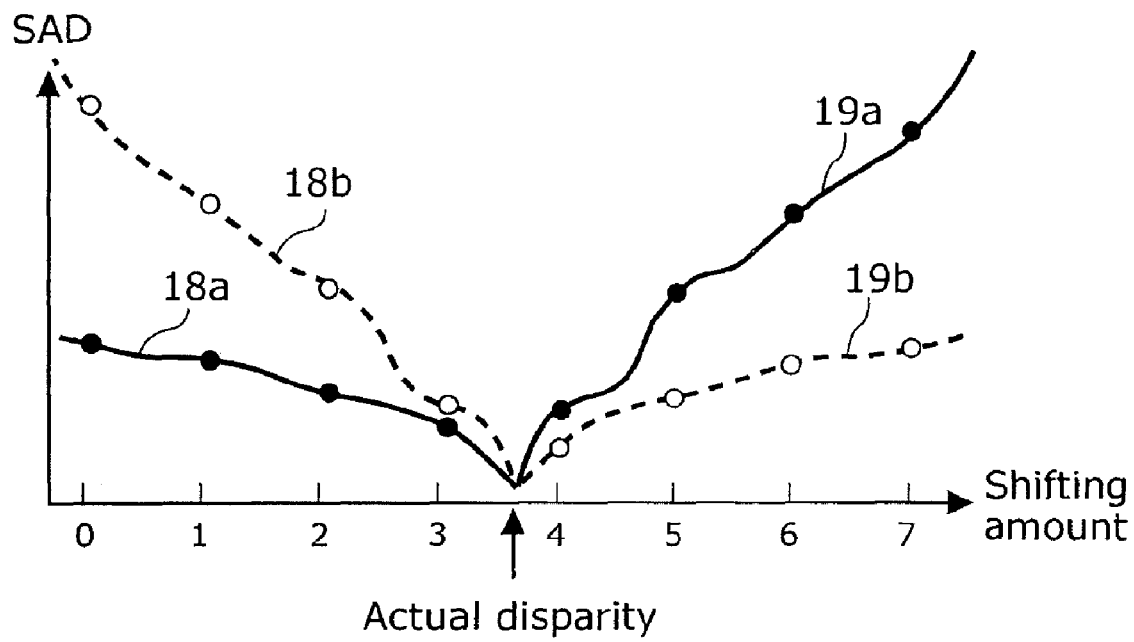
FIG. 9A is a diagram which illustrates a transition of a SAD according to the first embodiment of the present invention.

FIG. 9A is a diagram which illustrates a transition of the SAD corresponding to FIG. 6A and FIG. 6B in the case where the sample spacing is assumed to be indefinitely small. Further, FIG. 9B is a diagram which illustrates a transition of the integrated SAD in the case where the sample spacing is assumed to be indefinitely small.

In FIG. 9A, the transition of the SAD shown by a solid line shows the transition of the SAD of the picture a corresponding to FIG. 6A. In the transition of the SAD indicated by the solid line, the transition of the SAD between the shifting amount 0 and the shifting amount of the actual disparity (the solid line 18*a*) corresponds to the SAD in the region indicated by the black arrow 16*a* shown in FIG. 8, and the transition of the SAD from the shifting amount of the actual disparity and more (the solid line 19*a*) corresponds to the SAD in the region indicated by the white arrow 17*a* shown in FIG. 8. It is to be noted that black dots in FIG. 9A are actual sample dots.

On the other hand, the transition of the SAD indicated by the dot line shows the transition of the SAD of the picture b corresponding to FIG. 6B. In the transition of the SAD indicated by the dot line, the transition of the SAD between the shifting amount 0 and the shifting amount of the actual disparity (the dot line 18*b*) corresponds to the SAD in the region indicated by the white arrow 16*b* shown in FIG. 8, and the transition of the SAD from the shifting amount of the actual disparity and more (the dot line 19*b*) corresponds to the SAD in the region indicated by the black arrow 17*b* shown in FIG. 8. It is to be noted that white dots in FIG. 9A are actual sample dots.

In FIG. 8, when calculating the transition of the SAD in the region of the black arrow 16*a*, that is, the transition between the shifting amount 0 and the shifting amount of the actual disparity in the picture a and the transition of the SAD in the region of the black arrow 17*b*, that is, the transition from the shifting amount of the actual disparity and more in the picture b, a combination of the standard image and the reference image become identical with the shifting amount of the actual disparity being a basis in the case where a sample spacing is indefinitely small. Therefore, the transition of the SAD indicated by the solid line 18*a* and the transition of the SAD indicated by the dot line 19*b* in FIG. 9A become symmetrical with respect to the shifting amount of the actual disparity.

Likewise, in FIG. 8, when calculating the transition of the SAD in the region of the white arrow 17*a*, that is, the transition from the shifting amount of the actual disparity and more and the transition of the SAD in the region of the white arrow 16*b*, that is, the transition between the shifting amount 0 and the shifting amount of the actual disparity, a combination of the standard image and the reference image become identical with the shifting amount of the actual disparity being a basis in the case where a sample spacing is indefinitely small. Therefore, the transition of the SAD indicated by the solid line and the transition of the SAD indicated by the dot line in FIG. 9A become symmetrical with respect to the shifting amount of the actual disparity.

Figure 9B:
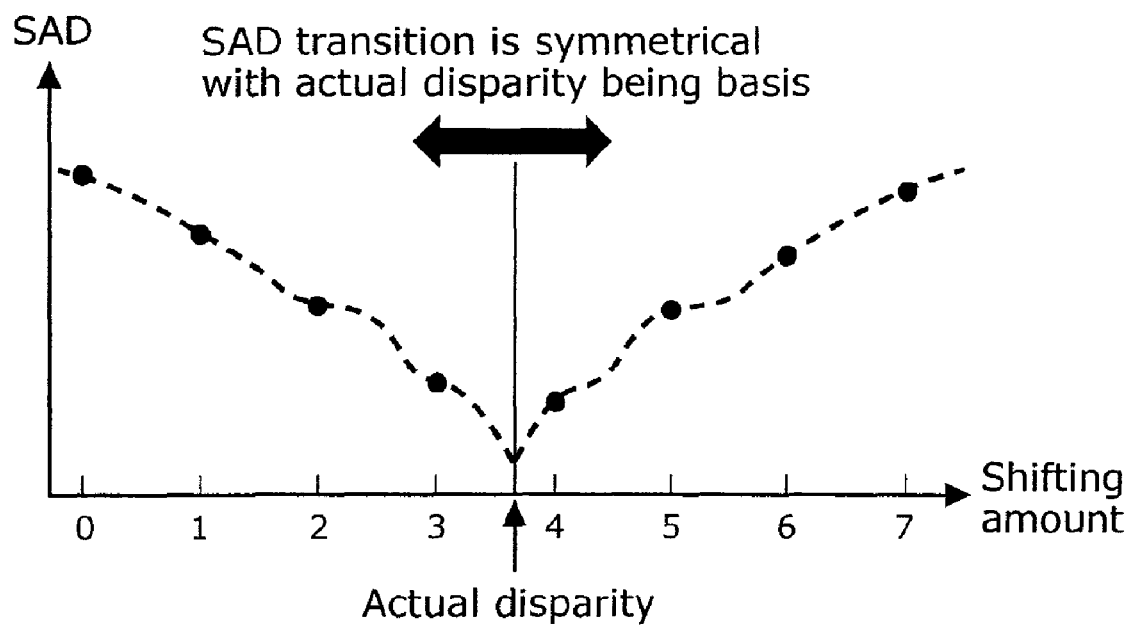
FIG. 9B is a diagram which illustrates a transition of a SAD according to the first embodiment of the present invention.

For the reasons above, the transition of the integrated SAD that is a result of adding the SAD at each shifting amount between the blocks of the picture s and the picture a to the SAD between the blocks of the picture s and the picture b becomes symmetrical with respect to the actual disparity as shown in FIG. 9B. It is to be understood that the symmetrical property of the integrated SAD described above is not impaired even when the sample spacing becomes larger. Therefore, the transition of the integrated correlation value (here, the integrated SAD) becomes symmetrical with respect to the actual disparity as shown in FIG. 7, according to the present embodiment.

It is to be noted that, even when a SSD, a NCC, or the like is used as a correlation value instead of the SAD, the integrated correlation value becomes symmetrical with respect to the actual disparity because the combination of the standard image and the reference image in different imaging optical systems becomes identical.

Further, although the present embodiment describes a single block in the picture s, it is possible to obtain all of the three-dimensional positions of the objects appearing on the picture s by performing the same calculation for all of the blocks in the picture s.

Further, although the present embodiment describes that the post-processing unit 9 calculates the three-dimensional position of or the distance to the object 12, it may also be possible to synthesize plural images by using the disparity calculated by the disparity calculation unit 8.

According to the present embodiment as described above, since the transition of the correlation value becomes symmetrical with the actual disparity being the basis without depending on the distribution of brightness of an object, it is possible to provide a compound eye imaging apparatus and a distance measuring apparatus which can estimate sub-pixel disparity without depending on the object with a high degree of accuracy.

Second Embodiment

The following describes a distance measuring apparatus according to a second embodiment of the present invention.

A distance measuring apparatus 60 according to the present embodiment is different from the distance measuring apparatus 50 according to the first embodiment in that the distance measuring apparatus 60 includes a smoothing filter in a preprocessing unit 5, which reduces a high frequency component of a picture. However, other configuration units and features of the distance measuring apparatus 60 are the same as the distance measuring apparatus 50 according to the first embodiment. Therefore, description will be focused on a characteristic part of the distance measuring apparatus according to the present embodiment.

Figure 10:
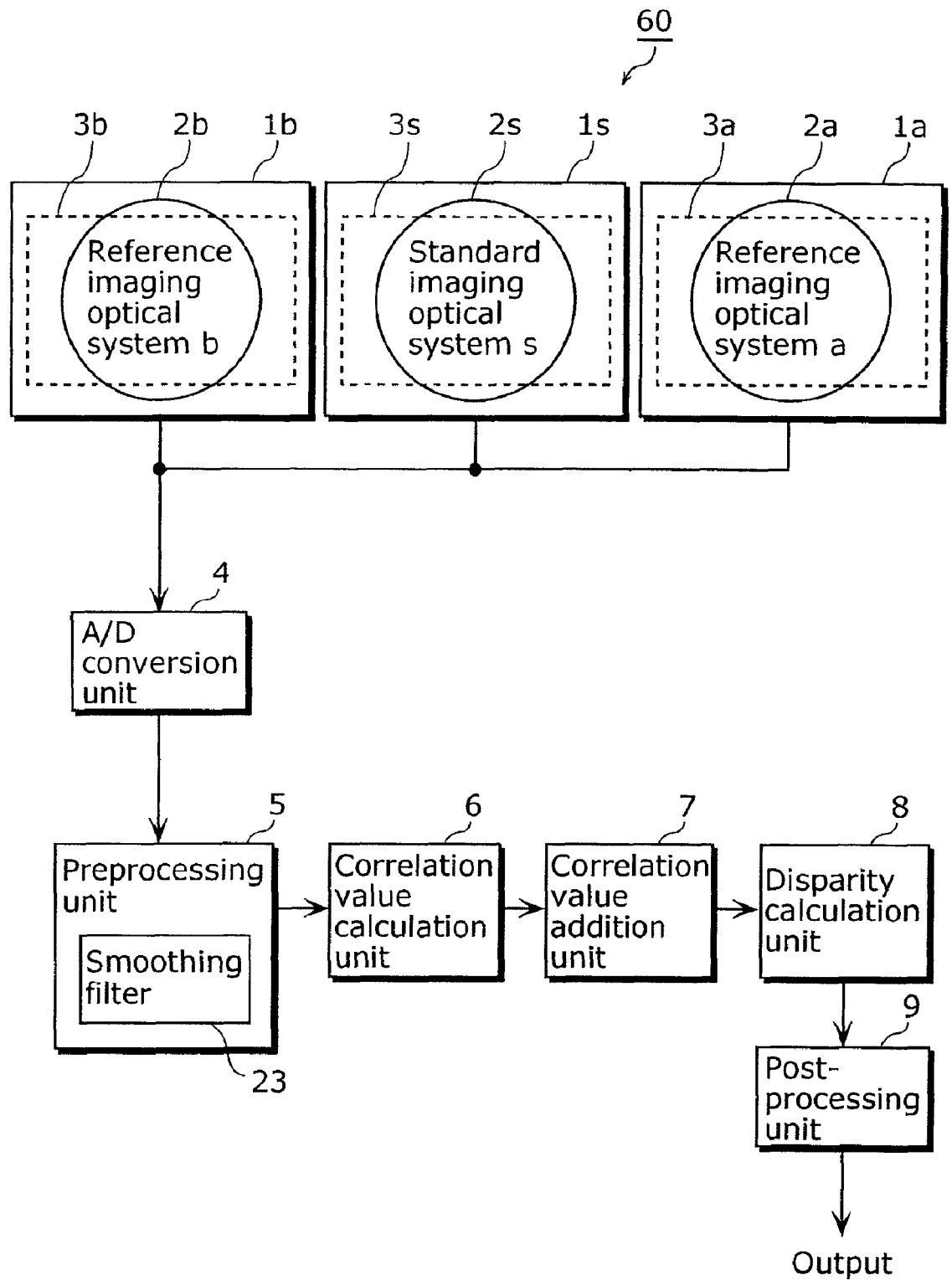
FIG. 10 is a diagram which illustrates a configuration of a distance measuring apparatus according to a second embodiment of the present invention.

FIG. 10 is a diagram which illustrates a configuration of a distance measuring apparatus 60 according to the present embodiment. It is to be noted that the same numerals are assigned to the same configuration units as in the first embodiment and the description that is overlapped will be omitted.

As shown in the diagram, the preprocessing unit 5 included in the distance measuring apparatus 60 according to the present embodiment includes a smoothing filter 23 that reduces a high frequency component of a picture, such as a Gaussian filter, an averaging filter, and a weighted averaging filter, in addition to performing correction of a picture for performing correlation calculation on the image with a high degree of accuracy as in the first embodiment.

As described above, the correlation value calculation unit 6 calculates a transition of a correlation value by performing the same processing as in the first embodiment with use of a picture of which a high frequency component has been reduced, so that linearity in the transition of the correlation value is slightly improved.

Figure 11A:
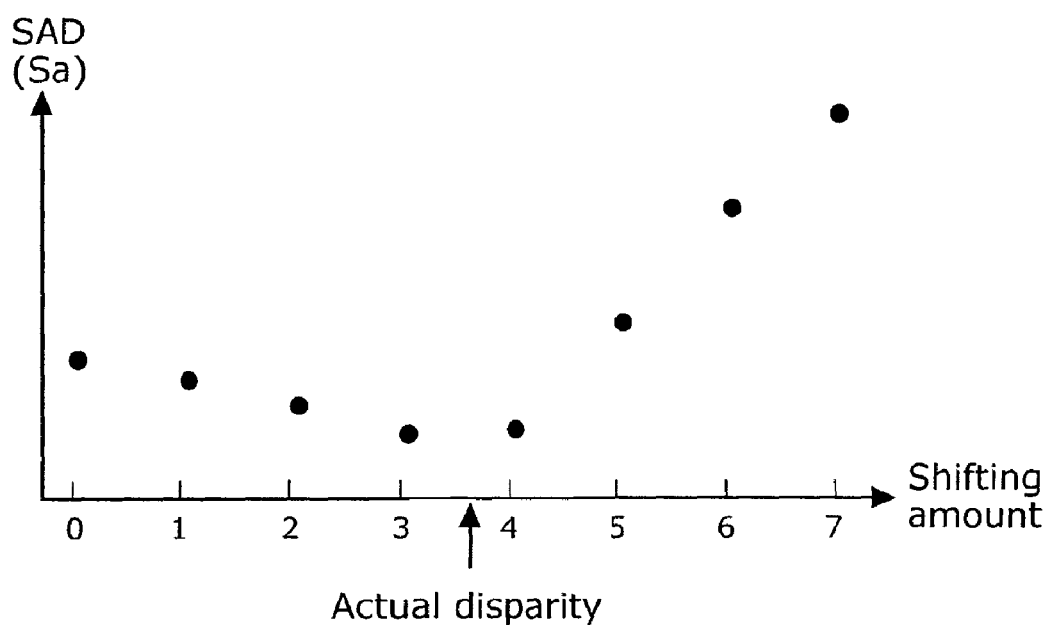
FIG. 11A is a diagram which illustrates a transition of a SAD according to the second embodiment of the present invention.
Figure 11B:
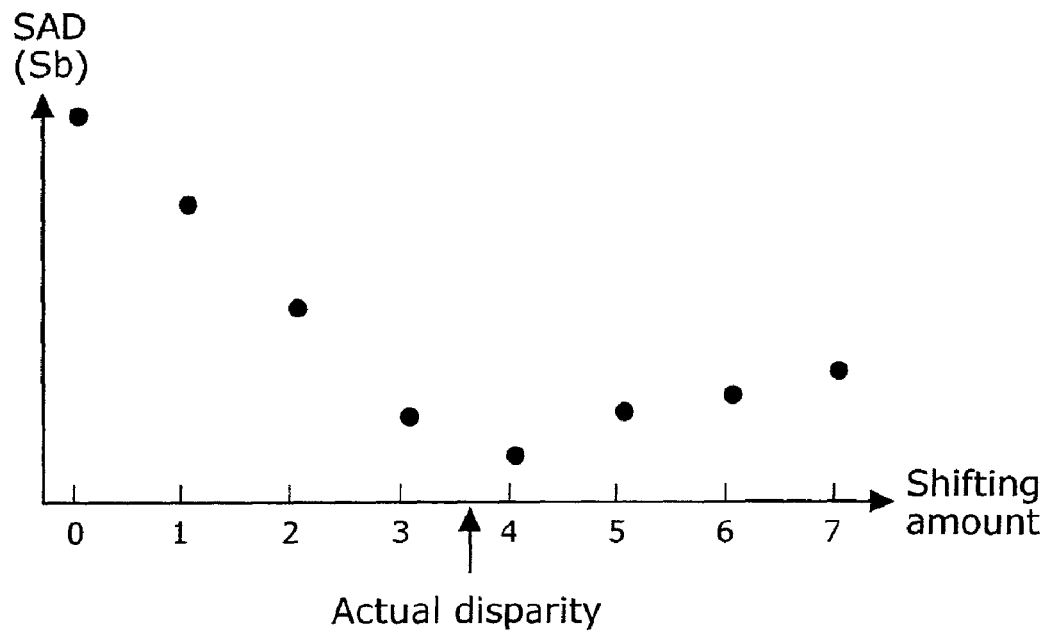
FIG. 11B is a diagram which illustrates a transition of a SAD according to the second embodiment of the present invention.

FIG. 11A and FIG. 11B are diagrams which illustrate transitions of an SAD obtained when applying a Gaussian filter of σ=1 on the picture s, the picture a, and the picture b shown in FIG. 4.

In FIG. 11A and FIG. 11B, linearity in the transition of the SAD is slightly improved compared to the transition of the SAD indicated in FIG. 6A and FIG. 6B according to the first embodiment, for the amount of reduction in a brightness distribution of a high frequency component of a picture. However, the symmetric property of the transition of the SAD with the actual disparity being the basis is hardly improved. Therefore, great improvement in accuracy of disparity estimation cannot be expected even when sub-pixel disparity estimation using the aforementioned equiangular linear fitting is performed on the transition of each of the SADs indicated in FIG. 11A and FIG. 11B. Thus, it is necessary for the correlation value addition unit 7 to add the SAD for each of the shifting amounts so as to improve the symmetric property of the transition of the SAD as in the first embodiment.

Figure 12:
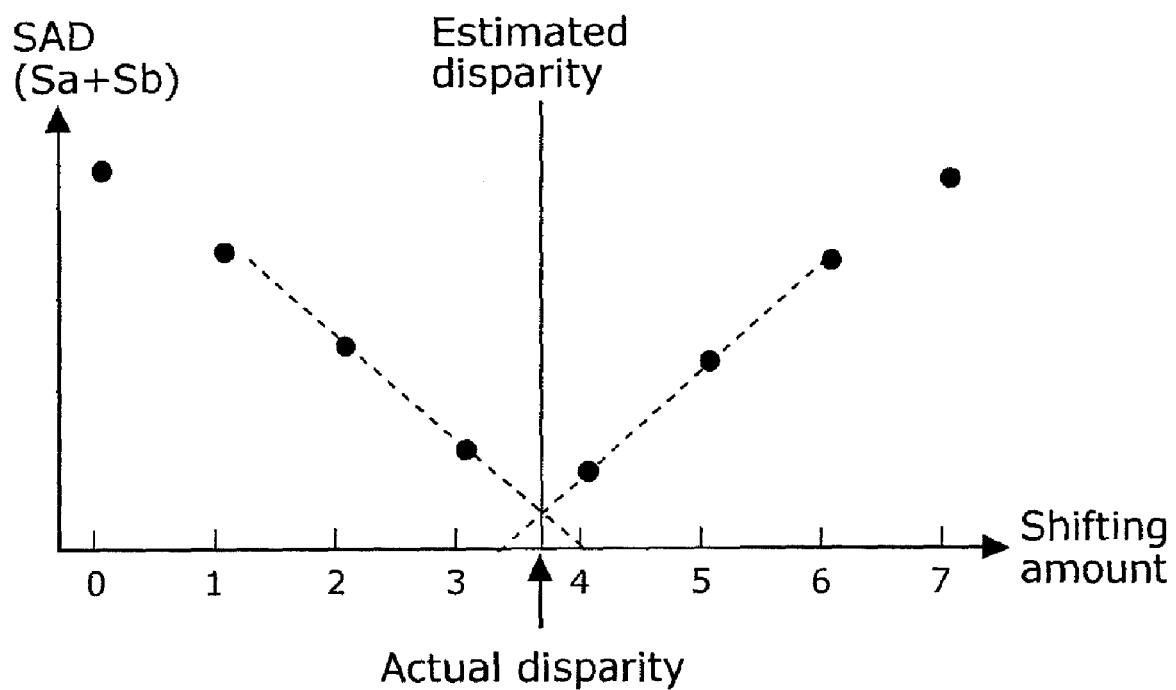
FIG. 12 is a diagram which illustrates a transition of a SAD according to the second embodiment of the present invention.

FIG. 12 is a diagram which illustrates a transition of an integrated SAD when adding the SAD indicated in FIG. 11A and FIG. 11B for each of the shifting amounts.

Performing the sub-pixel disparity estimation using the equiangular linear fitting on the transition of the integrated SADs by the disparity calculation unit 8 further reduces an error than in the case of the first embodiment. This is because, in addition to the fact that the transition of the integrated SAD becomes symmetrical with the actual disparity being the basis, the reduction in the high frequency component of the brightness distribution by the smoothing filter 23 has improved linearity in the transition of the SAD. More specifically, in the case of an object of which a transition of the SAD does not become symmetrical with the actual disparity being the basis, an accuracy of sub-pixel disparity estimation using equiangular linear fitting is not greatly improved by just removing a high frequency component of a picture by the smoothing filter 23. However, in the case where the transition of the integrated SAD becomes symmetrical with the actual disparity being the basis by addition of the SAD performed by the correlation value addition unit 7, it is possible to significantly improve the accuracy of the sub-pixel disparity estimation using equiangular linear fitting regardless of the object.

As described above, Removing the high frequency component of a picture by the smoothing filter 23 improves the linearity of the transition of the correlation value (here, a correlation value) according to the present embodiment. As a result, when interpolating a transition of a correlation value by using a low-order interpolation function, it is possible for the distance measuring apparatus to estimate the sub-pixel estimation with a further high degree of accuracy.

Third Embodiment

The following describes a distance measuring apparatus according to a third embodiment of the present invention.

Figure 13:
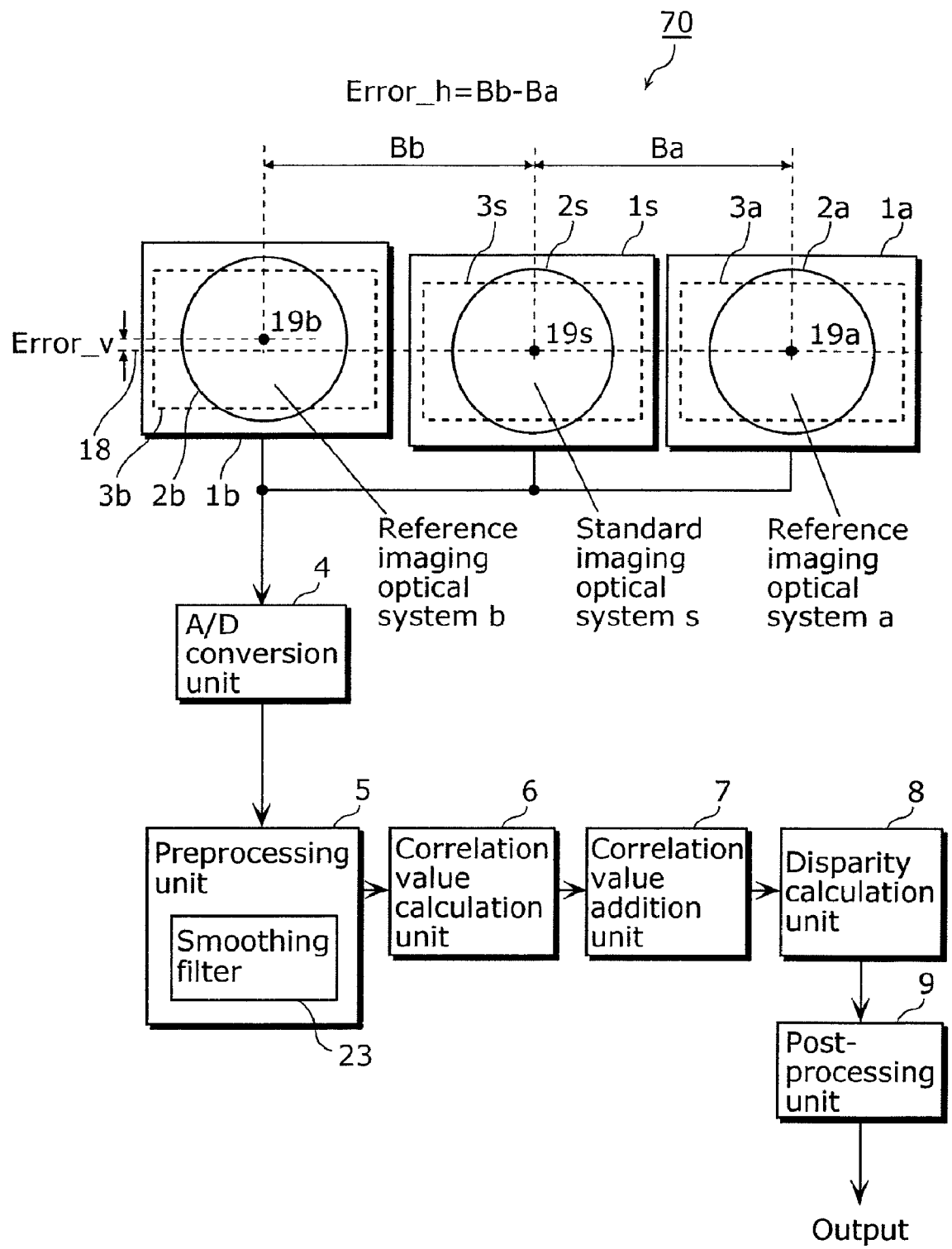
FIG. 13 is a diagram which illustrates a configuration of a distance measuring apparatus according to a third embodiment of the present invention.

FIG. 13 is a diagram which illustrates a configuration of a distance measuring apparatus 70 according to the present embodiment. As shown in FIG. 13, an optical center 19b of the reference imaging optical system b is away from a straight line (a dot line 18 of FIG. 13) connecting an optical center 19s of the standard imaging optical system s and an optical center 19a of the reference imaging optical system a by a distance Error_v in the direction vertical to the dot line 18. Therefore, the distance measuring apparatus 70 includes an optical center position error (hereinafter referred to as a baseline vertical direction error) Error_v. Further, there is a difference of Error_h between a baseline length Ba that is a distance between the optical center 19s and the optical center 19a and a baseline length Bb that is a distance between the optical center 19s and the optical center 19b (distance parallel to the dot line 18). Therefore, the distance measuring apparatus 70 includes a baseline length error (hereinafter referred to as a baseline direction error) Error_h. Other configuration units and features are the same as distance measuring apparatus 60 according to the second embodiment in FIG. 10. Therefore, description will be focused on a characteristic part of the distance measuring apparatus of the present embodiment.

A distance measuring apparatus with high accuracy in disparity detection can be implemented by arranging an optical center of the reference imaging optical system as point symmetry with respect to an optical center of the standard imaging optical system as in the second embodiment of FIG. 10. However, the baseline vertical direction error Error_v or the baseline direction error Error_h may actually occur in some cases due to an implementation error of a camera, a lens molding error, and the like. The transition of the correlation value indicated in FIG. 12 according to the second embodiment becomes less symmetrical with the actual disparity being the basis, as these errors become greater. Thus, the present embodiment will describe an effect which these errors have on the transition of the correlation value and an allowable range thereof. It is to be note that the optical axis of the standard imaging optical system s and the reference imaging optical systems a and b are assumed to be parallel, the optical axis of the standard imaging optical system is assumed to be positioned at the center of the imaging region 3s, and optical axes of the reference imaging optical systems a and b are assumed to be positioned at the center of the imaging regions 3a and 3b, respectively. Further, in the imaging region 3s, the imaging region 3a, and the imaging region 3b, a pixel array is assumed to be arranged parallel both vertically and horizontally. It is to be noted that even in the case where the above assumptions are not satisfied, it may be possible to realize the above assumptions with correction using calibration in the preprocessing unit 5.

Figure 14:
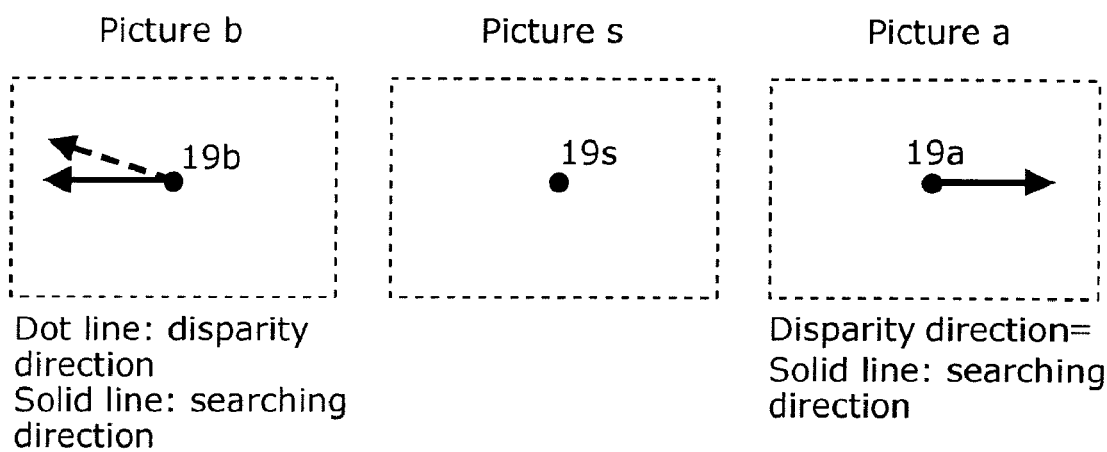
FIG. 14 is a diagram which explains an operation of the distance measuring apparatus according to the third embodiment of the present invention.
Figure 15:
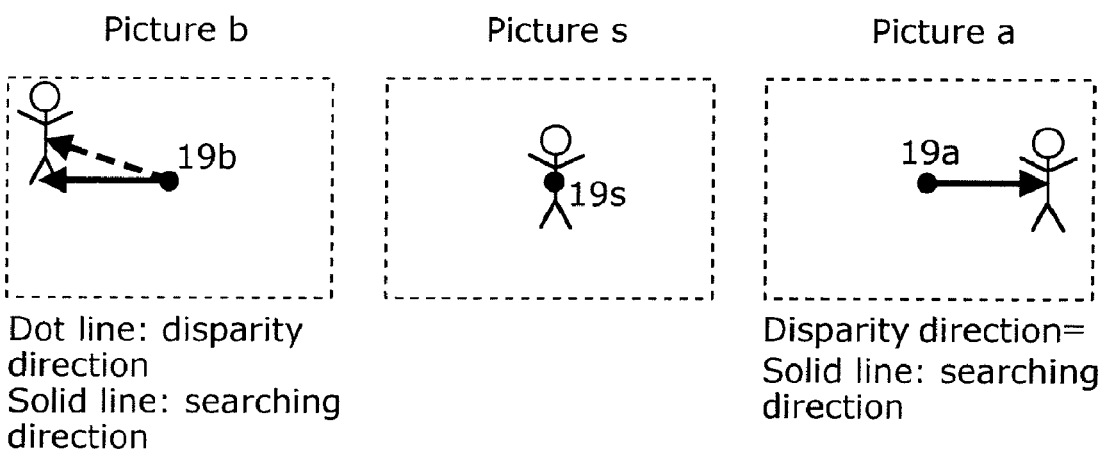
FIG. 15 is a diagram which explains an operation of the distance measuring apparatus according to the third embodiment of the present invention.

First, the case where the baseline vertical direction error Error_v exists will be described. Here, the baseline direction error Error_h is assumed not to exist. In the case where the baseline vertical direction error Error_v exists, a search direction for searching for a picture coordinate of the reference image similar to the standard image is the same as a direction of the disparity in the picture a as shown in FIG. 14. In the picture b, however, a search direction for searching for a picture coordinate of the reference image similar to the standard image differs from a direction of the disparity as the baseline vertical direction error Error_v becomes larger. In FIG. 14, the direction of the disparity is indicated by a dot line and the search direction is indicated by a solid line. In FIG. 14, in order to show the explanation intuitively, the difference between the direction in which the disparity occurs and the search direction is shown to be greater than the actual difference. As viewed from the direction of FIG. 14, since the disparity becomes greater as a distance to an object is smaller, the divergence in the vertical direction between an occurrence position and a search position becomes greater, and thus the transition of the correlation value becomes less symmetrical with respect to the actual disparity as shown in FIG. 12. For example, it is assumed for the camera is, the camera 1a, and the camera 1b that a focal distance f=5 mm, the baseline length Ba=20 mm, the baseline length Bb=20 mm, a pixel pitch pitch=0.002 mm, and a baseline vertical direction error Error_v=0.5 mm. In the case where a distance to an object D=2000 mm, the disparity is 25 pixels based on (Equation 1) as shown in FIG. 15. At this time, in an object image included in the picture a, the disparity is 25 pixels in a search direction, that is, the direction parallel to the baseline as explained in FIG. 14, while in an object image included in the picture b, the disparity is 25 pixels in a dot line direction of FIG. 14. At this time, the object image included in the picture b appears as 0.62 pixels shifted to the direction vertical to the disparity search direction compared to the picture s due to an effect of the baseline vertical direction error Error_v. The disparity is approximately 24.99 pixels in the direction parallel to the disparity search direction, and the disparity can be ignored with difference equal to or less than 0.01 pixels for 25 pixels. Therefore, the transition of the SAD between the picture s and the picture a and the transition of the SAD between the picture s and the picture b becomes not strictly symmetrical with the actual disparity being the basis, due to the shift of approximately 0.62 pixels in this case in the direction vertical to the disparity search direction. In the case where a distance to the object is smaller, a shift of imaging in the direction vertical to the disparity search direction in the picture b becomes greater, and thus the symmetrical property of the SAD transition is further lowered.

Figure 16:
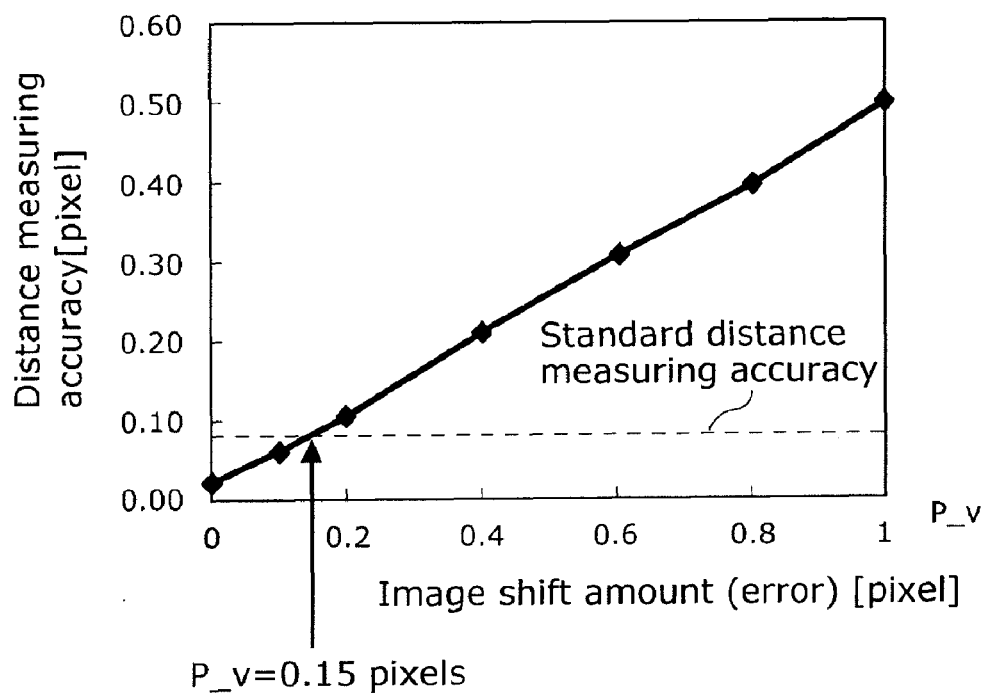
FIG. 16 is a diagram which explains a performance of the distance measuring apparatus according to the third embodiment of the present invention.

FIG. 16 shows a graph indicating a simulation result of decrease in the measuring accuracy (increase in a disparity detection error) in the case where an object is imaged by using a distance measuring apparatus having the baseline vertical direction error Eerro_v as shown in FIG. 13. The decrease in the measuring accuracy is caused by a shift amount of imaging to the direction vertical to the disparity search direction, so that a horizontal axis in FIG. 16 represents a shift amount of imaging to the direction vertical to the disparity search direction. When an image shift amount of the horizontal axis in FIG. 16 is assumed to be P_v, Error_v can be converted by using (Equation 7).

[Equation 7]

$$\text{Error\_v} = \frac{D \cdot \text{pitch} \cdot P\_v}{f} \quad \text{Equation 7}$$

Figure 40A:
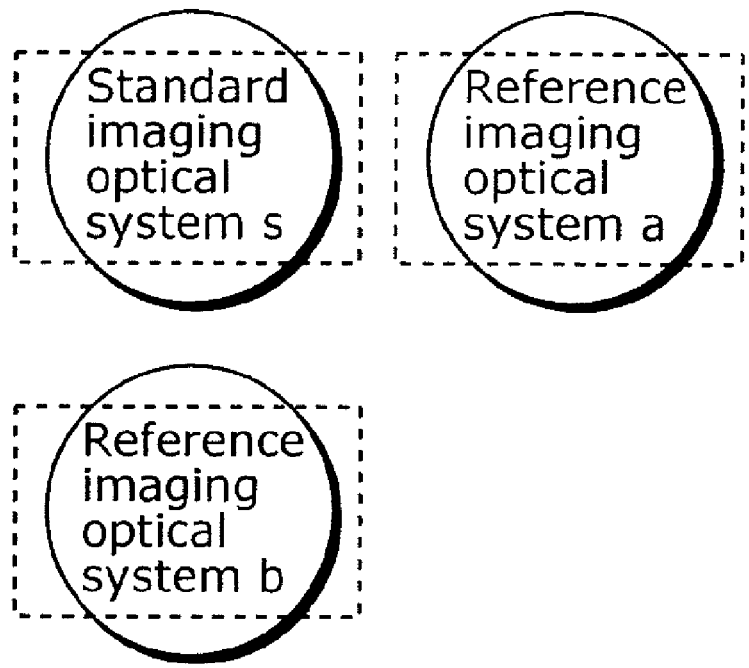
FIG. 40A is a diagram which illustrates a distance measuring apparatus having a different configuration in a description of the conventional art.
Figure 40B:
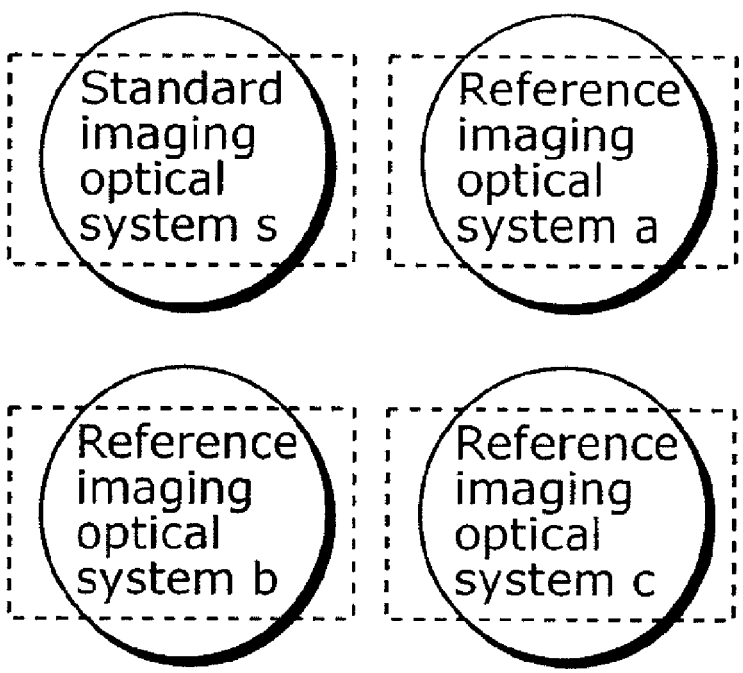
FIG. 40B is a diagram which illustrates a distance measuring apparatus having a different configuration in a description of the conventional art.

Here, D is a distance to an object, pitch is a pixel pitch, and f is a focal distance. FIG. 16 shows that the disparity detection error becomes greater as the image shift P_v becomes larger. The dot line in FIG. 16 indicates a standard distance measuring accuracy that is a simulation result of distance measuring accuracy (disparity detection error) of a conventional stereo camera (three-lens) of FIG. 40A in the case where the same object is used. The focal distance, the pixel pitch, and the distance to the object of the conventional stereo camera are the same, and each of the baseline length of a standard imaging optical system s and a reference imaging optical system a and the baseline length of a standard imaging optical system s and a reference imaging optical system b of FIG. 40A is the same as the baseline length Ba of the present embodiment of FIG. 13. Since an implementation error which corresponds to the baseline vertical direction error Error_v is not provided to the simulation of the conventional stereo camera (three-lens) (because it can be corrected by a conventional calibration scheme and the like), the standard measuring accuracy becomes a constant value. FIG. 16 shows that it is possible to measure the distance (detect the disparity) with higher accuracy than that of the conventional stereo camera when an image shift P_v is within 0.15 pixels. Therefore, the distance measuring apparatus 70 according to the present embodiment can measure a distance (disparity detection) with a higher degree of accuracy than conventional stereo cameras by configuring the distance measuring apparatus 70 so that the baseline vertical direction error Error_v satisfies (Equation 8).

[Equation 8]

$$\text{Error\_v} \le \frac{D \cdot \text{pitch} \cdot 0.15}{f} \quad \text{Equation 8}$$

For example, in the case of the (smallest) distance to the object D=500 mm, the pixel pitch pitch=0.002 mm, and the focal distance 5 mm, it is possible to measure a distance (disparity detection) with a higher degree of accuracy than conventional stereo cameras by setting the vertical direction error Error_v to satisfy equal to or less than 0.03 mm. Therefore, it is preferable to implement a camera so that a relative position of the optical center of each of the cameras in FIG. 13 satisfies the (Equation 8) with a high degree of accuracy. For example, it is possible to relatively easily implement a camera by integrally molding the lenses 2s, 2a, and 2b. Further, it is to be understood that it is also possible to implement a stereo camera by using a mass producing camera technique such as a wafer-level camera (see Nikkei MICRODEVICES July 2008) that is implemented by using a technique of micro electro mechanical systems (MEMS) and the like. Further, although the present embodiment descries three-lens, a number of optical systems including five-lens, seven-lens, and nine-lens can also be applied. It is to be noted that P_v=0.15 obtained from the graph shown in FIG. 16 is not a value that is obtained only when a specific object is imaged. The same tendency is obtained even when the object changes, and P_v=0.15 is a value that does not depend on the object.

Figure 17:
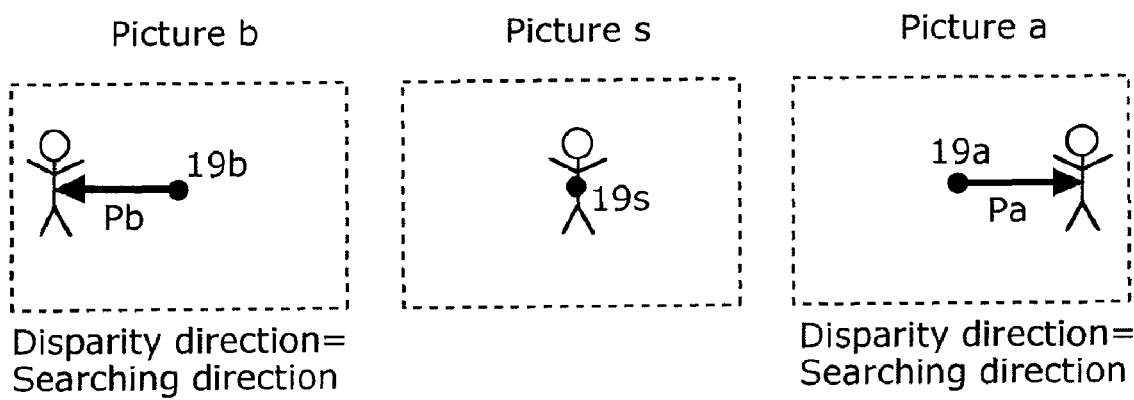
FIG. 17 is a diagram which explains an operation of the distance measuring apparatus according to the third embodiment of the present invention.
Figure 18A:
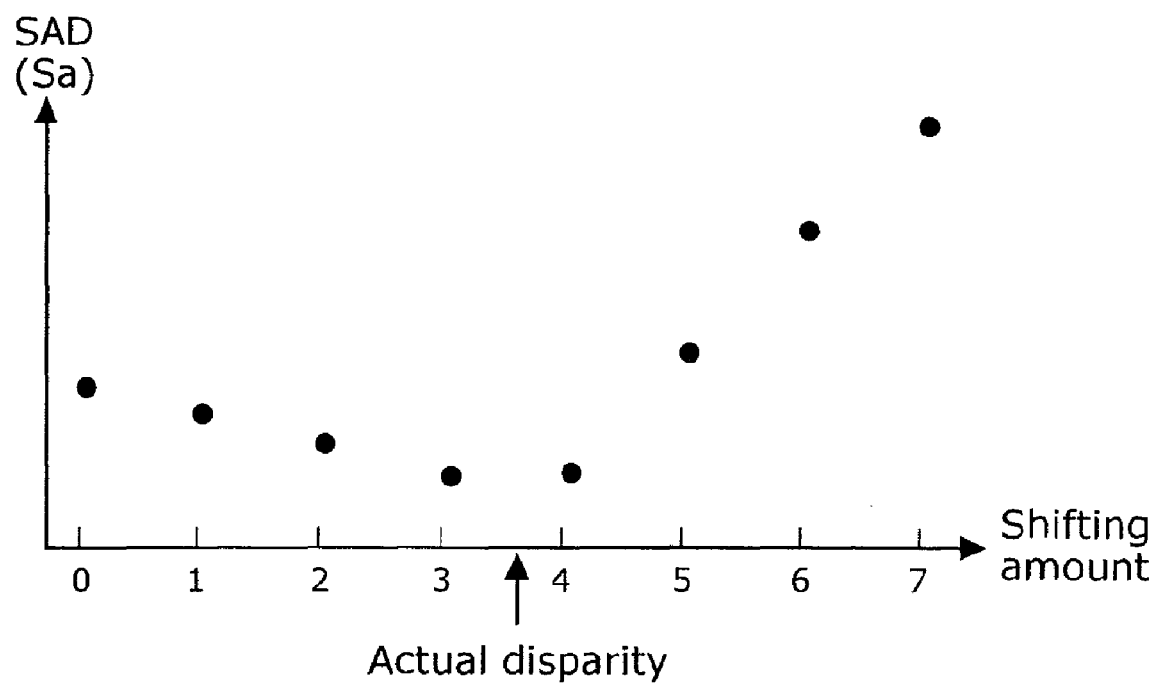
FIG. 18A is a diagram which illustrates a transition of a SAD according to the third embodiment of the present invention.
Figure 18B:
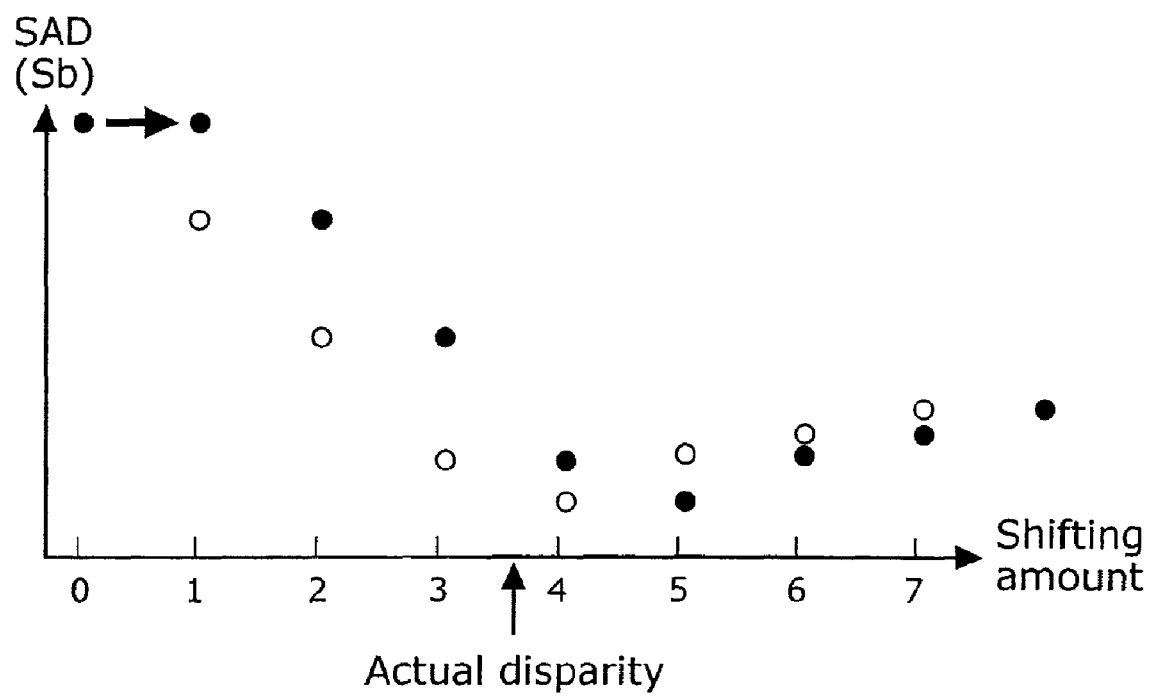
FIG. 18B is a diagram which illustrates a transition of a SAD according to the third embodiment of the present invention.
Figure 19:
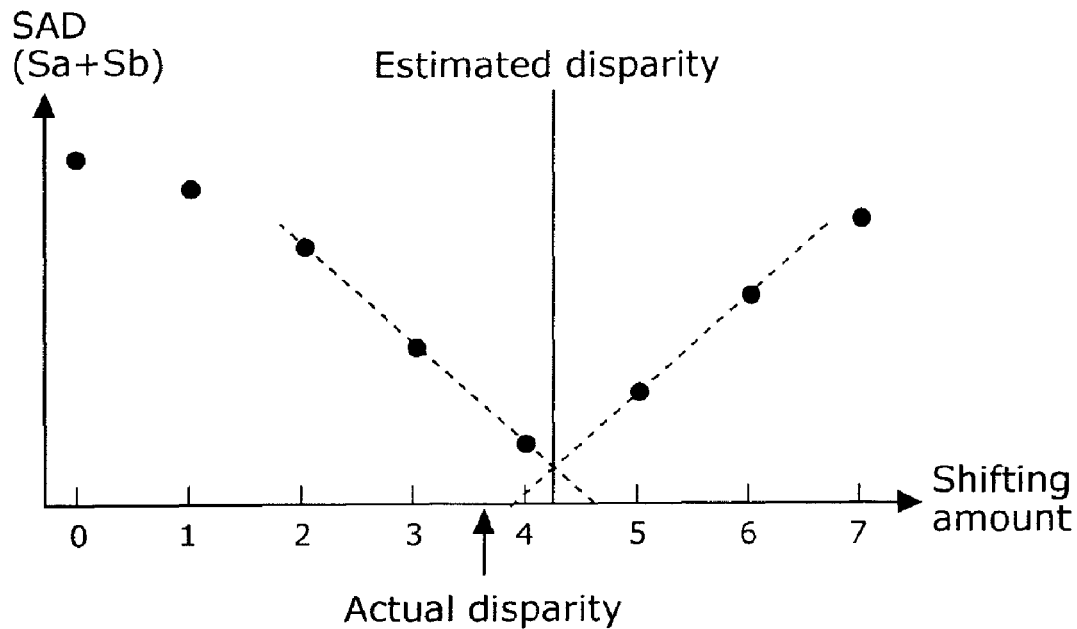
FIG. 19 is a diagram which illustrates a transition of an integrated SAD according to the third embodiment of the present invention.

The following describes a case where a baseline direction error Error_h exists. It is assumed here that a baseline vertical direction error does not exist. In the case where there is the baseline direction error Error_h exists, since the baseline length Ba differs from the baseline length Bb as shown in FIG. 13, a disparity Pa of the picture a differs from a disparity Pb of the picture b for the same object as shown in FIG. 17. Therefore, the symmetrical properties of the SAD transition between the picture s and the picture a (FIG. 18A) and the SAD transition between the picture s and the picture b (black dots in FIG. 18B) with respect to the actual disparity decrease, as shown in FIG. 18A and FIG. 18B. The actual disparity here indicates the actual disparity between the picture s and the picture a. The symmetrical property with respect to the actual disparity further decreases as the baseline direction error Error_h is greater. This is because in the case where the baseline direction error Error_h is positive, for example, the SAD transition between the picture s and the picture b moves in parallel towards where the shifting amount becomes larger as shown in FIG. 18B. The greater the baseline direction error Error_h is, the more amounts the parallel movement becomes, and thus the symmetrical property decreases. In FIG. 18B, the SAD transition indicated by white dots is a SAD transition between the picture s and the picture b (that is, Error_h=0) in FIG. 10 of the second embodiment. FIG. 19 shows a transition of an integrated SAD to which the SAD of FIG. 18A and FIG. 18B is added for each of the shifting amount. As clearly shown in FIG. 19, an estimated disparity is shifted from the actual disparity due to the decease in the symmetrical property of the SAD transition with the actual disparity being the basis.

Figure 20:
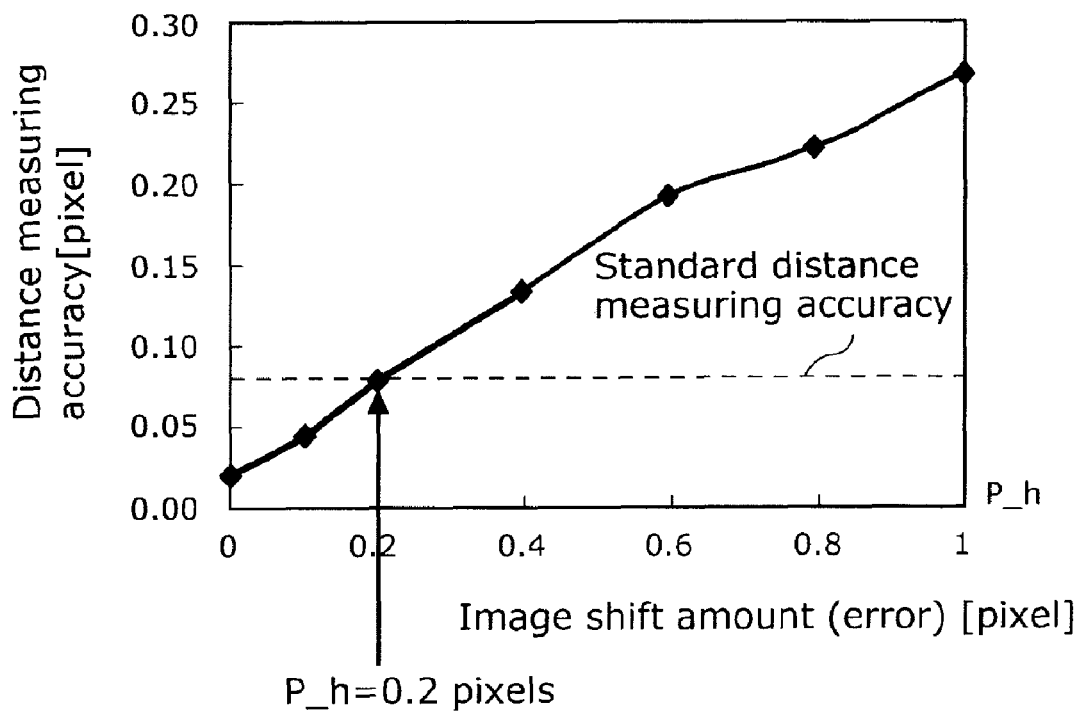
FIG. 20 is a diagram which explains a performance of the distance measuring apparatus according to the third embodiment of the present invention.

FIG. 20 shows a graph indicating a simulation result of decrease in the measuring accuracy (increase in a disparity detection error) in the case where an object is imaged by using a distance measuring apparatus having baseline direction error Error_h as shown in FIG. 13. Since the disparity detection error is caused by a shift amount of imaging to the disparity search direction, the horizontal axis in FIG. 20 is a shift amount of imaging to the disparity search direction. When an image shift amount of the horizontal axis in FIG. 20 is assumed to be P_h, Error_h can be calculated by using (Equation 9).

[Equation 9]

$$\text{Error\_h} = \frac{D \cdot \text{pitch} \cdot P\_h}{f} \quad \text{Equation 9}$$

Here, D is a distance to an object, pitch is a pixel pitch, and f is a focal distance. FIG. 20 shows that the disparity detection error becomes greater as the image shift P_v becomes larger. The standard measuring accuracy indicated by the dot line in FIG. 20 is a simulation result of measuring accuracy (disparity detection error) of a conventional stereo camera (three-lens) of FIG. 40A in the case where the same object is imaged. The focal distance, the pixel pitch, and the distance to the object of the conventional stereo camera are the same, and each of the baseline length of a standard imaging optical system s and a reference imaging optical system a and the baseline length of a standard imaging optical system s and a reference imaging optical system b of FIG. 40A is the same as the baseline length Ba of the present embodiment of FIG. 13. Since an implementation error which corresponds to the baseline vertical direction error Error_h is not provided to the simulation of the conventional stereo camera (three-lens) (because it can be corrected by a conventional calibration scheme and the like), the standard measuring accuracy becomes a constant value. FIG. 20 shows that it is possible to measure a distance (disparity detection) with a higher degree of accuracy than conventional stereo cameras when the image shift P_h is equal to or less than 0.2 pixels. Therefore, the distance measuring apparatus 70 according to the present embodiment can measure a distance (disparity detection) with a higher degree of accuracy than conventional stereo cameras by configuring the distance measuring apparatus 70 so that the baseline vertical direction error Error_h satisfies (Equation 10).

[Equation 10]

$$\text{Error\_h} \leq \frac{D \cdot \text{pitch} \cdot 0.2}{f} \quad \text{Equation 10}$$

For example, in the case of the (smallest) distance to the object D=500 mm, the pixel pitch pitch=0.002 mm, and the focal distance 5 mm, it is possible to measure a distance (disparity detection) with a higher degree of accuracy than conventional stereo cameras by setting the perpendicular direction error Error_v to satisfy equal to or less than 0.04 mm. Therefore, it is preferable to implement camera so that a relative position of the optical center of each of the cameras in FIG. 13 satisfies (Equation 10) with a high degree of accuracy. For example, it is possible to relatively easily implement the above by integrally molding the lenses 2s, 2a, and 2b. Further, it is to be understood that it is also possible to implement a stereo camera by using a mass producing camera technique such as a wafer-level camera (see Nikkei MICRODEVICES July 2008) that is implemented by using a technique of MEMS and the like. Further, it is to be understood that, although the present embodiment descries three-lens, a number of optical systems including five-lens, seven-lens, and nine-lens may also be applied. It is to be noted that, as in P_h=0.15, P_h=0.2 obtained from the graph shown in FIG. 20 is not a value that is obtained only when a specific object is imaged. The same tendency is obtained even when the object changes, and P_h=0.2 is a value that does not depend on the object.

As described above, the distance measuring apparatus 70 according to the present embodiment can measure a distance (disparity detection) with a higher degree of accuracy than conventional stereo cameras, as long as it is configured to satisfy (Equation 8) and (Equation 10).

Fourth Embodiment

The following describes a distance measuring apparatus according to a fourth embodiment of the present invention.

The distance measuring apparatus 80 according to the present embodiment differs from the distance measuring apparatus 60 according to the second embodiment in that eight reference imaging optical systems are provided and a disparity conversion unit that converts differences between the reference imaging optical systems is included in the correlation value calculation unit 6. However, other configuration units and features of the distance measuring apparatus 80 are the same as those of the distance measuring apparatus 60 according to the second embodiment. Therefore, description will be focused on a characteristic part of the distance measuring apparatus of the present embodiment.

Figure 21:
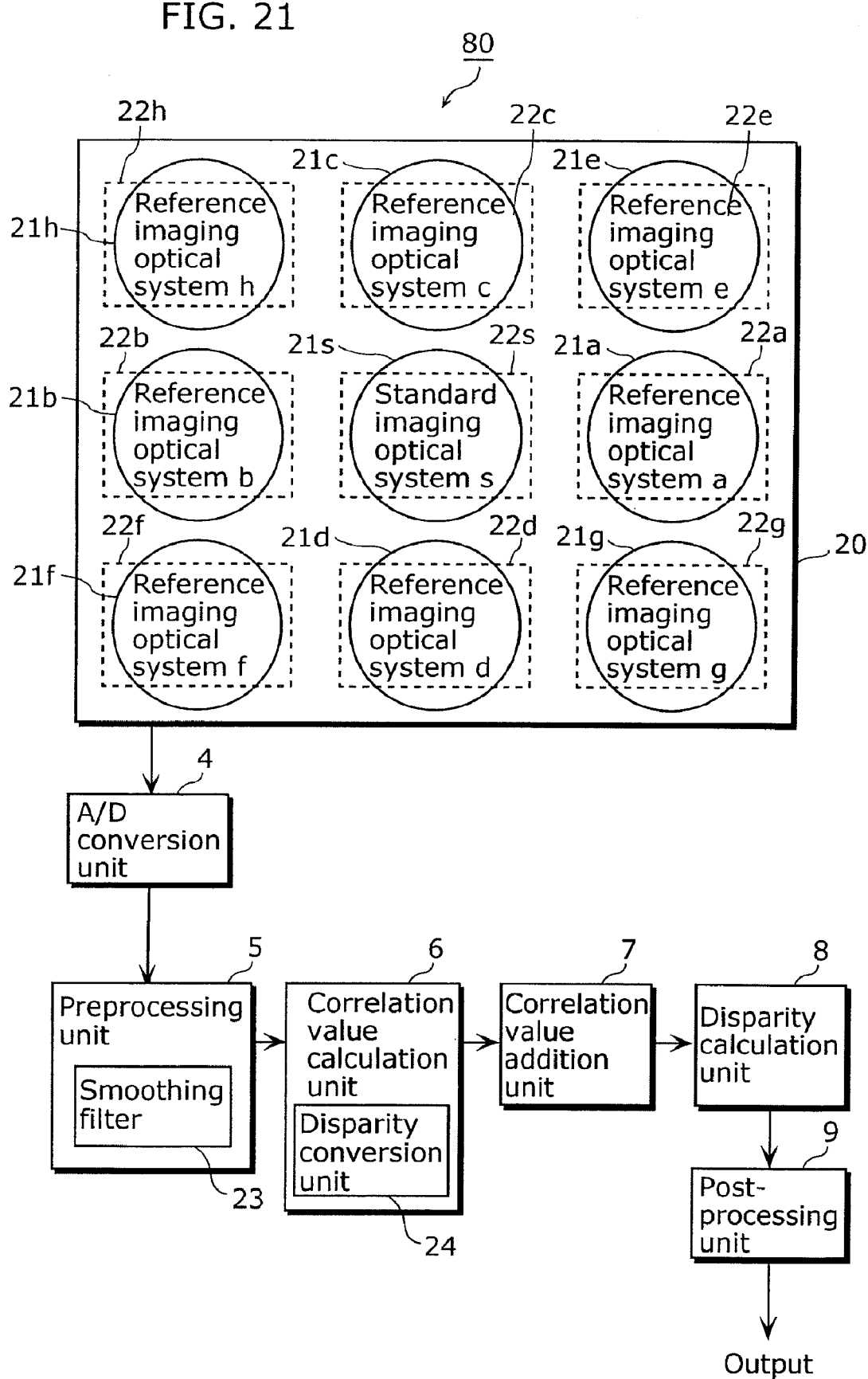
FIG. 21 is a diagram which illustrates a configuration of a distance measuring apparatus according to a fourth embodiment of the present invention.

FIG. 21 is a diagram which illustrates a configuration of a distance measuring apparatus 80 according to the present embodiment. It is to be noted that the same numerals are assigned to the same configuration units as in the second embodiment and the description that is overlapped will be omitted.

As shown in FIG. 21, the distance measuring apparatus 80 includes a compound eye camera 20. The compound eye camera 20 includes a single solid-state imaging device such as a CCD or a CMOS which includes nine lens arrays which are integrally molded and nine different imaging regions. Here, an optical bandwidth separation filter and an aperture are not shown because they are not central features of the present invention. In the compound eye camera 20, a lens radius is smaller than conventional cameras, so that it is possible to shorten a focal distance of the lens and have a significantly small thickness for the entire optical system. Further, it is also possible, by integrally molding the lens arrays, to make the relative position relationship between the optical axes of each of the optical systems included in the array a high accuracy (less than 5 μm errors, for example).

It is to be noted that, although the present embodiment describes the case where each of the imaging optical systems is a lens array, the distance measuring apparatus to which the present invention is applied is not limited to such a distance measuring apparatus. For example, the distance measuring apparatus may include a separated imaging optical system. It may be possible to use plural imaging devices.

The standard imaging optical system s includes a lens 21s and imaging region 22s and is arranged near the center of the solid-state imaging device. The reference imaging optical systems a to h include lenses 21a to 21h and imaging regions 22a to 22h, respectively.

Here, the standard imaging optical system s and reference imaging optical systems s to h have features described below, as in the distance measuring apparatus 60 according to the second embodiment. First, an optical axis of each of the imaging optical system is in parallel with each other. Further, the optical center of each of the imaging optical systems is arranged on the same plane and the plane is vertical to the optical axis. Furthermore, the imaging region (two-dimensional plane) and the optical axis of each of the imaging optical systems are arranged vertically, and a focal distance (a distance between the imaging region and optical center) is the same among all of the imaging optical systems.

Further, the optical centers of the standard imaging optical system s, the reference imaging optical system a, and the reference imaging optical system b are arranged on the same straight line. Further, the optical center of the reference imaging optical system a and the optical center of the reference imaging optical system b are arranged at positions to be symmetric with respect to a point with the standard imaging optical system s being the basis. Further, the optical centers of the standard imaging optical system s, the reference imaging optical system c, and the reference imaging optical system d are arranged on the same straight line. Further, the optical center of the reference imaging optical system c and the optical center of the reference imaging optical system d are arranged at positions to be symmetric with respect to a point as the standard imaging optical system s being the basis. Further, the optical centers of the standard imaging optical system s, the reference imaging optical system e, and the reference imaging optical system f are arranged on a same straight line. Further, the optical center of the reference imaging optical system e and the optical center of the reference imaging optical system f are arranged at positions to be symmetric with respect to a point as the standard imaging optical system s being the basis. Further, the optical centers of the standard imaging optical system s, the reference imaging optical system g, and the reference imaging optical system h are arranged on a same straight line. Further, the optical center of the reference imaging optical system g and the optical center of the reference imaging optical system h are arranged at positions to be symmetric with respect to a point as the standard imaging optical system s being the basis Further, it is assumed, for convenience, that the above-mentioned straight line connecting the optical centers of the standard imaging optical system s, the reference imaging optical system a, and the reference imaging optical system b are parallel to the pixel array in the horizontal direction of the imaging region 22s. Therefore, both of the disparity that occurs between the standard imaging optical system s and the reference imaging optical system a and the disparity that occurs between the standard imaging optical system s and the reference imaging optical system b occur in the horizontal direction of the pixel array in each of the imaging regions.

As described above, the baseline length Ba of the standard imaging optical system s and the reference imaging optical system a and the baseline length Bb of the standard imaging optical system s and the reference imaging optical system b are the same. Further, the baseline length Bc of the standard imaging optical system s and the reference imaging optical system c and the baseline length Bd of the standard imaging optical system s and the reference imaging optical system d are the same. Further, the baseline length Be of the standard imaging optical system s and the reference imaging optical system e and the baseline length Bf of the standard imaging optical system s and the reference imaging optical system f are the same. Further, the baseline length Bg of the standard imaging optical system s and the reference imaging optical system g and the baseline length Bh of the standard imaging optical system s and the reference imaging optical system h are the same.

The correlation value calculation unit 6 includes a disparity conversion unit 24 that performs processing of converting disparity, in addition to the processing of calculating a correlation value explained in the first embodiment. The disparity conversion unit 24 converts a shifting amount of a block to a shifting amount that can be added by the correlation value addition unit 7 when calculating a correlation value of the reference imaging optical systems arranged such that the baseline length differs. For example, the disparity conversion unit 24, when calculating a correlation value of the reference imaging optical system e arranged so as to have a baseline length different from the reference imaging optical system a, converts a shifting amount of a block to a shifting amount that can be added by the correlation value addition unit 7, by multiplying a shifting amount of a block used when calculating the correlation value of the reference image generated in the reference imaging optical system a by Le·Me (=Ke) that is a product of Le and me, where Le is a value obtained by dividing the baseline length Be by the baseline length Ba and Me is a value obtained by dividing a pixel pitch pitch_a in the direction parallel to the baseline length Ba by a pixel pitch pitch_e in the direction parallel to the baseline length Be. Here, the pixel pitch in the direction parallel to the baseline length is the shortest pitch in which a dot corresponding to a central dot of a pixel on the same straight line parallel to the baseline in a picture captured in the imaging optical system.

It is to be noted that, in the present embodiment, a unit of the shifting amount is "pixel" that represents a pixel pitch in the direction of the baseline. Therefore, when adding a correlation value between imaging optical systems having different pixel pitches depending on the baseline direction, the disparity conversion unit 24 needs to perform unit conversion. More specifically, conversion of the disparity needs to be carried out by not only multiplying a base shifting amount by a ratio of the baseline length, but also further multiplying by Me that is a ratio of the pixel pitch. However, in the case where a unit of the shifting amount is a unit that does not depend on the baseline direction, for example, the case of a unit such as millimeter, it is unnecessary to convert the unit. More specifically, the disparity conversion unit 24 can convert the shifting amount by multiplying Le that is the ratio of the baseline length by the base shifting amount without using Me that is the ratio of the pixel pitch.

The correlation value addition unit 7 adds the correlation value calculated in the correlation value calculation unit 6 for each combination of the optical systems for each corresponding one of the shifting amounts, based on the shifting amount converted in the disparity conversion unit 24. As a result, the correlation value addition unit 7 calculates an integrated correlation value that is a transition symmetrical with the actual disparity being the basis.

Figure 22:
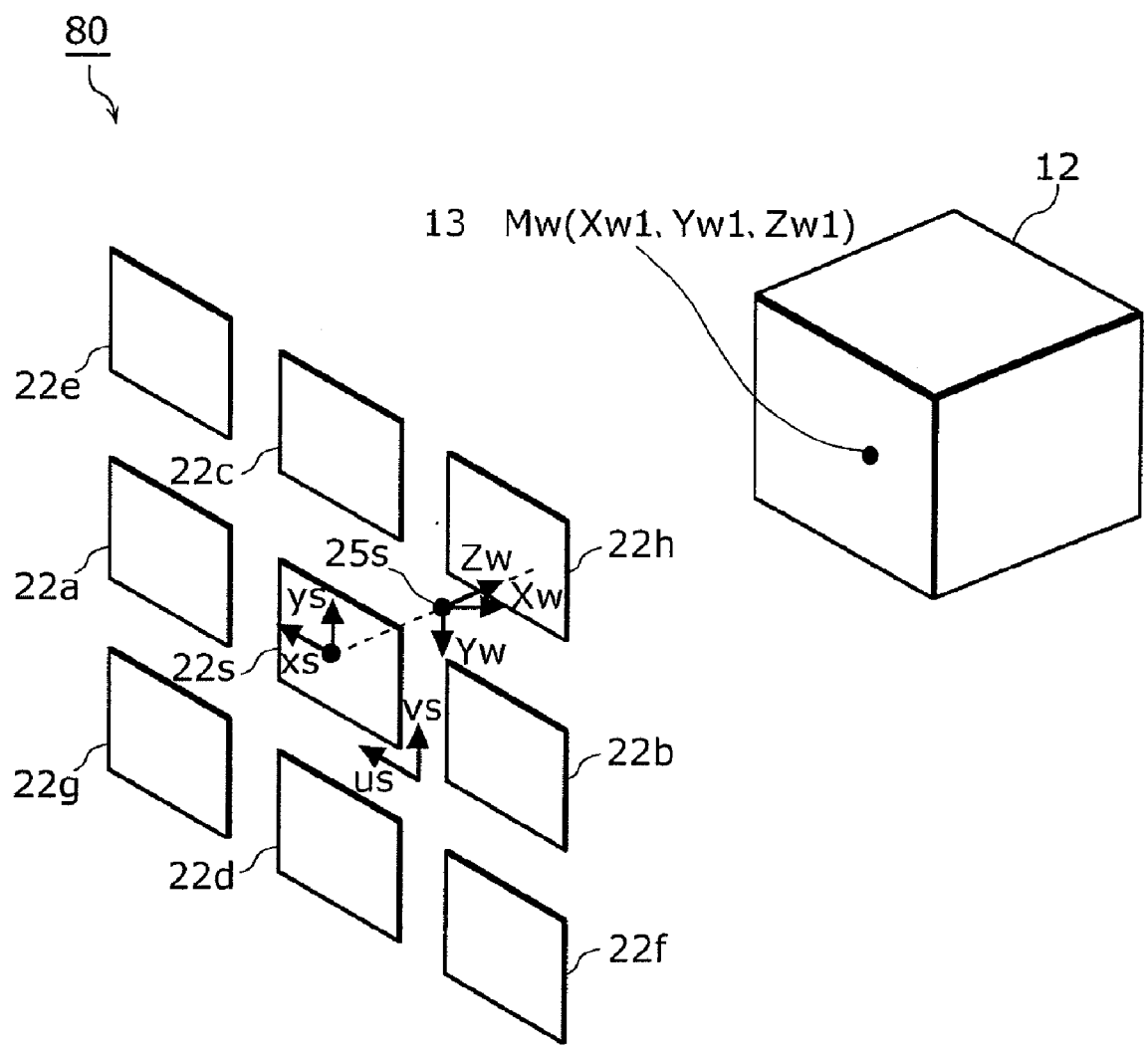
FIG. 22 is a diagram which illustrates a positional relationship between the distance measuring apparatus and an object according to the fourth embodiment of the present invention.

FIG. 22 is a diagram which illustrates a positional relationship between the distance measuring apparatus 80 and an object 12 as shown in FIG. 21.

As shown in the diagram, in the same manner as in the second embodiment, it is assumed that the optical center 25s of the standard imaging optical system s is an original point Mw (0, 0, 0,) of the world coordinate system and the world coordinate system of the point 13 that is a point on the surface of the object 12 is Mw (Xw1, Yw1, Zw1,).

Now, as to the reference imaging optical system c and the reference imaging optical system d, in the same manner as the reference imaging optical system a and the reference imaging optical system b, the optical center of the imaging optical system is arranged point-symmetrically with respect to the optical center of the standard imaging optical system s and each of the optical center is arranged on the same straight line. Therefore, a transition of the SAD that is symmetrical with the actual disparity being the basis can be obtained by adding the SAD for each shifting amount obtained through block matching calculation for the standard imaging optical system s and the reference imaging optical system c and the standard imaging optical system s and the reference imaging optical system d. However, in the case where the baseline length of the standard imaging optical system s and the reference imaging optical system a or the reference imaging optical system b differs from the baseline length of the standard imaging optical system s and the reference imaging optical system c or the reference imaging optical system d, the actual disparity differs. Therefore, even when the correlation value addition unit 7 synthesizes (adds) a transition of the SAD for each of the same shifting amount, a transition of the SAD that is symmetrical with the actual disparity being the basis cannot be obtained. Therefore, it is necessary that the disparity conversion unit 24 changes the shifting amount used for calculating the SAD so as to correspond to the baseline length and the pixel pitch.

The following describes a fundamental operation of the distance measuring apparatus 80 configured as described above according to the present embodiment.

Figure 23:
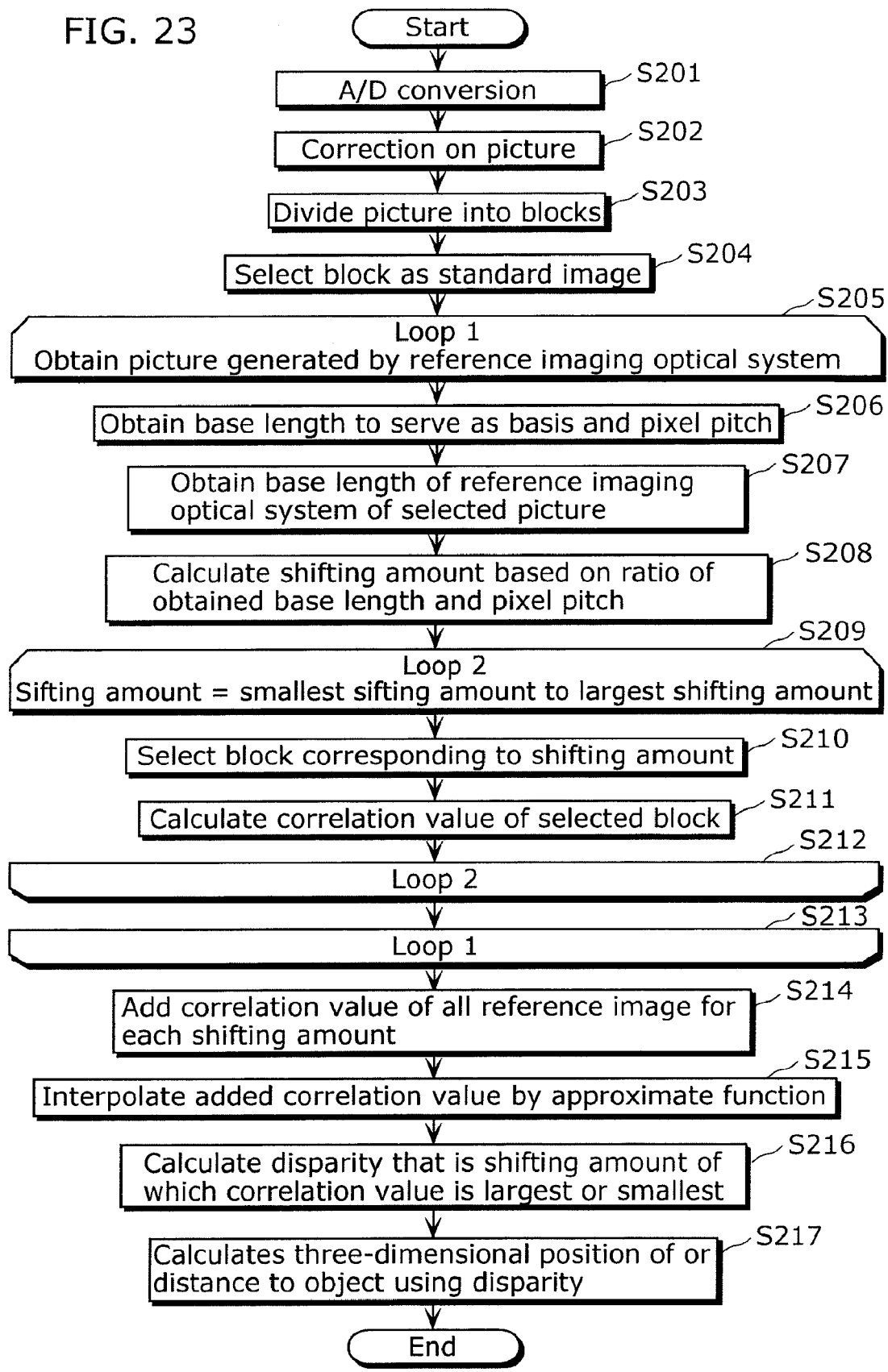
FIG. 23 is a flowchart which shows a operational flow of calculating a three-dimensional location of or distance to the object performed by the distance measuring apparatus according to the fourth embodiment of the present invention.

FIG. 23 is a flowchart which shows a processing flow of calculating a three-dimensional position of or a distance to the object 12 performed by the distance measuring apparatus 80.

Processes in Steps S201 to S204 are the same as those in Steps S101 to S104 shown in FIG. 3 according to the first embodiment, and thus descriptions for Steps S201 to S204 will be omitted.

When the process in Step S240 completes, the correlation value calculation unit 6 starts a loop 1 when one of the pictures a to h which are generated by the reference imaging optical system and on which processes in Steps S206 to S212 described below have not yet been performed is obtained (S205).

Next, the disparity conversion unit 24 included in the correlation value calculation unit 6, when the standard imaging optical system s and the reference imaging optical system a and the reference imaging optical system b are the basis, obtains the baseline length of the reference imaging optical system a and the standard imaging optical system s (the baseline length serves as a basis) and the pixel pitch (S206). Then, the disparity conversion unit 24 obtains the baseline length of the reference imaging optical system and the standard imaging optical system s generated the picture selected in Step S205 and the pixel pitch (S207). Subsequently, the disparity conversion unit 24 calculates a new shifting amount based on the baseline length serves as the basis obtained in Step S206 and the baseline length and the pixel pitch obtained in Step S207 (S208).

Then, the correlation value calculation unit 6 starts a loop 2 when the new shifting amount calculated as described above is obtained (S209).

Further, the correlation value calculation unit 6 selects, as a reference image, the block corresponding to the shifting amount obtained in Step S209, in the picture that has been obtained by selecting from among pictures a to h in Step S205 (S210). Next, the correlation value calculation unit 6 calculates a correlation value, such as SAD, which represents a degree of similarity between the standard image that is a block of the pictures s selected in Step S204 and the reference image that is a block among the images a to h selected in Step S209 (S211).

As described above, the correlation value calculation unit 6 calculates a correlation value for each of the new shifting amounts calculated in Step S208 (S212, S209). Here, the correlation value calculation unit 6 ends the loop 2 (S209, S212) when the shifting amount reaches the maximum shifting amount.

Further, when the loop 2 (S209, S212) completes, which is the calculation of the correlation value for each of the shifting amounts, the correlation value calculation unit 6 obtains the picture which is generated by the reference imaging optical system and on which processes for calculating the correlation value have not yet been performed, and repeats the processes of the loop 2 (S209, S212) (S213, S205). Here, when there is no picture which has been generated by the reference imaging optical system and has not yet been performed the processes of calculating the correlation value, the correlation value calculation unit 6 ends the loop 1 (S205 to S213).

Next, the correlation value addition unit 7 adds, for each corresponding shifting volume, the correlation value between the standard image and each of the reference images calculated by the above-described processing (S214). Here, not only the correlation value of the reference imaging optical system arranged symmetrically, but also the correlation values of all of the reference imaging optical systems are added. The integrated correlation value obtained by the processing forms a symmetrical distribution with the actual disparity being the basis. Here, the actual disparity is an amount of disparities for the baseline length serves as the basis and the pixel pitch.

Processes in Steps S215 to S217 are the same as those in Steps S112 to S114 shown in FIG. 3 according to the first embodiment, and thus descriptions for that will be omitted.

The following describes in detail the processing explained in FIG. 23. In Step S208 of FIG. 23, the disparity conversion unit 24 calculates a new shifting amount based on a ratio of the baseline length and the pixel pitch. More specifically, When it is assumed that the baseline length that serves as a basis is the baseline length Ba of the reference imaging optical system a and the pixel pitch that serves as a basis is an pixel pitch pitch_a in the direction parallel to the baseline length Ba in the case where the correlation value calculation unit 6 calculates the correlation value of the image c generated by the reference imaging optical system c, it is possible that the disparity conversion unit 24 can calculate an increment amount Kc (unit: pixel) of the shifting amount at the time of calculating the SAD transition from the ratio of the baseline length by using (Equation 11). It is to be noted that the increased amount at the time of calculating the correlation value of the picture a is one pixel.

[Equation 11]

$$Kc = \frac{Bc}{Ba} \cdot \frac{pitch\_a}{pitch\_c}$$

Equation 11

Here, BC is a baseline length between the standard imaging optical system s and the reference imaging optical system c, and the pitch_c is an pixel pitch in the direction parallel to the baseline length Bc. It is to be noted that the baseline length Ba and the baseline length Bb are identical and the baseline length Bc and the baseline length Bd are identical, as described above. Therefore, the disparity conversion unit 24 can calculate the shifting amount at the time of calculating the SAD transition of the standard imaging optical system s and the reference imaging optical system c, and the standard imaging optical system s and the reference imaging optical system d, using the increased amount Kc described above. More specifically, a new shifting amount becomes 0 pixel, Kc pixel, 2·Kc pixels, 3·Kc pixels, . . . , when the smallest shifting amount is assumed to be 0 pixel. A shifting amount becomes −2·Kc pixels, −Kc pixels, 0 pixel, Kc pixels, 2·Kc pixels, 3 Kc pixels, . . . when the smallest shifting amount is assumed to be −2 pixels. It is to be noted that the shifting amount can be a unit of sub-pixel depending on the value of the increased amount described above. In such a case, the correlation value calculation unit 6 extracts a reference image with bilinear interpolation and the like at the time of selecting a reference image, so that the correlation value can be calculated.

In the same manner, the disparity conversion unit 24 calculates a new shifting amount at the time of calculating the SAD in the case of a combination of the standard imaging optical system s and the reference imaging optical system e and the reference imaging optical system f. The increased amount used by the disparity conversion unit 24 for calculating a new shifting amount is obtained by using (Equation 12).

[Equation 12]

$$Ke = \frac{Be}{Ba} \cdot \frac{pitch\_a}{pitch\_e}$$ Equation 12

Here, Be is the baseline length between the standard imaging optical system s and the reference imaging optical system e, and pitch_e is the pixel pitch in the direction parallel to the baseline length Be. It is to be noted that the baseline length Be and the baseline length Bf are identical as described above. Therefore, the disparity conversion unit 24 can calculate the shifting amount at the time of calculating the SAD transition of the standard imaging optical system s and the reference imaging optical system e, and the standard imaging optical system s and the reference imaging optical system f by using the increased amount Ke as described above. More specifically, a new shifting amount becomes 0 pixel, Ke pixel, 2·Ke pixels, 3·Ke pixels, . . . , when the minimum shifting amount is assumed to be 0 pixel.

In the same manner, the disparity conversion unit 24 calculates a new shifting amount at the time of calculating the SAD in the case of a combination of the standard imaging optical system s and the reference imaging optical system g and the reference imaging optical system h as well. The increased amount used by the disparity conversion unit 24 for calculating a new shifting amount is obtained by using (Equation 13).

[Equation 13]

$$Kg = \frac{Bg}{Ba} \cdot \frac{pitch\_a}{pitch\_g}$$ Equation 13

Here, Bg is the baseline length between the standard imaging optical system s and the reference imaging optical system g, and pitch_g is the pixel pitch in the direction parallel to the baseline length Bg. It is to be noted that the baseline length Bg and the baseline length Bh are identical as described above. Therefore, the disparity conversion unit 24 can calculate the shifting amount at the time of calculating the SAD transition of the standard imaging optical system s and the reference imaging optical system g, and the standard imaging optical system s and the reference imaging optical system h by using the increased amount Kc described above. More specifically, a new shifting amount becomes 0 pixel, Kg pixel, 2·Kg pixels, 3·Kg pixels . . . .

Here, it is assumed that the SAD transition of the standard imaging optical system s and the reference imaging optical systems a to h are represented by indefinite numbers Sa(i), Sb(i), Sc(i), Sd(i), Se(i), Sf(i), Sg(i), and Sh(i), respectively. In such a case, the correlation value addition unit 7 synthesizes (adds) the SAD transition by using (Equation 14) as shown in Step S214 of FIG. 23. The shifting amount used in the synthesizing the SAD transition is a new shifting amount calculated by the disparity conversion unit 24.

[Equation 14]

$$S\_sum(i) = Sa(i) + Sb(i) + Sc(i) + Sd(i) + Se(i) + Sf(i) + Sg(i) + Sh(i)$$ Equation 14

(i=the smallest shifting amount, the smallest shifting amount+1, the smallest shifting amount+2, . . . the largest shifting amount)

As described above, the SAD transition synthesized by the correlation value addition unit 7 becomes symmetrical with the actual disparity being the basis, in the same manner as in the first embodiment. Further, since the number of the combinations of the standard imaging optical system s and two reference imaging optical systems that are symmetrical to the standard imaging optical system, change in the SAD transition is decreased due to the effect of smoothing, and further, linearity in the SAD transition is improved.

As described above, the disparity calculation unit 8 calculates a disparity in the sub-pixel level using the correlation value S_sum synthesized by the correlation value addition unit 7 as shown in Steps S215 and S216 of FIG. 23 in the same manner as in the second embodiment. At this time, the improvement in the linearity of the SAD transition makes it possible to estimate the sub-pixel disparity with a high degree of accuracy regardless of the distribution of brightness of an object in the case where a low-dimensional interpolation function is used.

Then, based on the disparity of the sub-pixel level calculated by the disparity calculation unit 8, the post-processing unit 9 converts the disparity into a form suited for output and outputs data as shown in Step S217 of FIG. 23. For example, when a three-dimensional position of an object is outputted, m (us1, vs1) that is a two-dimensional picture coordinate system of the picture s is converted into ms (xs1, ys1) that is a two-dimensional coordinate system where an intersection point between the optical axis of the standard imaging optical system s and the imaging region 22s of FIG. 22 is an original point, so that a three-dimensional position for each block of the picture s can be obtained by using (Equation 1), (Equation 2), and (Equation 3) as in the description of the Background Art. A parameter of the baseline length used at this time is the baseline length Ba (the baseline length between the standard imaging optical system s and the reference imaging optical system a). It is to be noted that the disparity P of (Equation 1) can be obtained by multiplying the sub-pixel disparity calculated by the processes described above, by a pixel pitch.

According to the present embodiment as described above, since the transition of the correlation value becomes symmetrical with the actual disparity being the basis regardless of the distribution of brightness of an object, it is possible to provide a distance measuring apparatus which can estimate sub-pixel disparity regardless of the object with a high degree of accuracy. Further, change in the correlation value transition is reduced due to the effect of smoothing by increasing the number of the combinations of two reference imaging optical systems that are point symmetrical with respect to the standard imaging optical system s, and it is possible to provide a distance measuring apparatus that can estimate the sub-pixel disparity with a further high degree of accuracy by using low-dimensional interpolation function.

PRACTICAL EXAMPLE

Figure 24A:
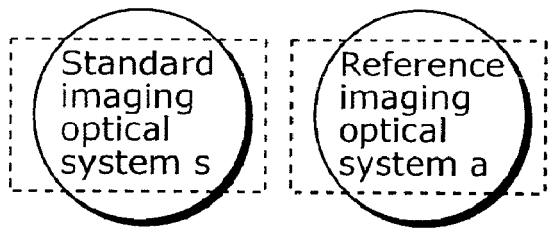
FIG. 24A is a diagram which illustrates a configuration of a distance measuring apparatus according to a practical example of the present invention.
Figure 24B:
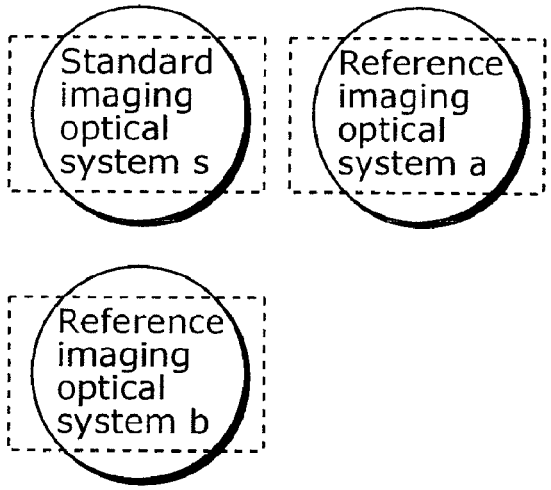
FIG. 24B is a diagram which illustrates a configuration of the distance measuring apparatus according to the practical example of the present invention.
Figure 24C:
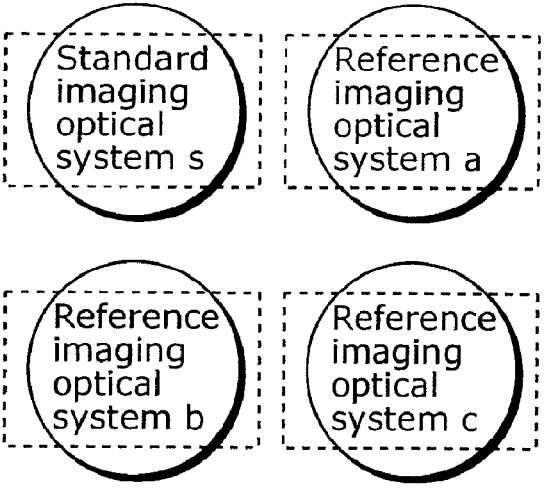
FIG. 24C is a diagram which illustrates a configuration of the distance measuring apparatus according to the practical example of the present invention.
Figure 24D:
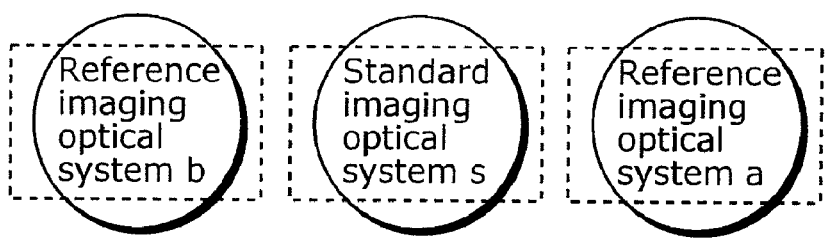
FIG. 24D is a diagram which illustrates a configuration of the distance measuring apparatus according to the practical example of the present invention.
Figure 24E:
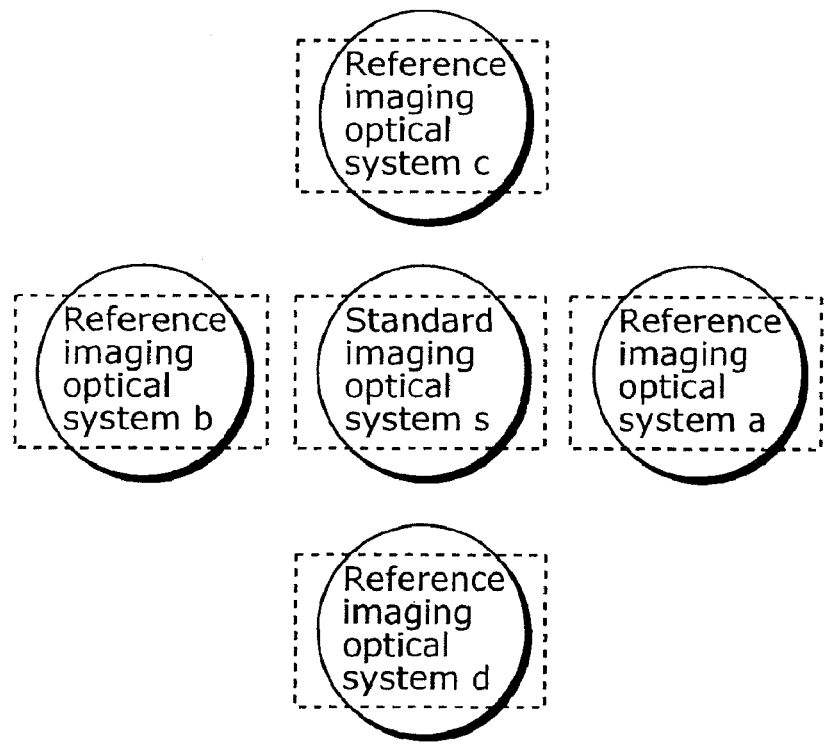
FIG. 24E is a diagram which illustrates a configuration of the distance measuring apparatus according to the practical example of the present invention.
Figure 24F:
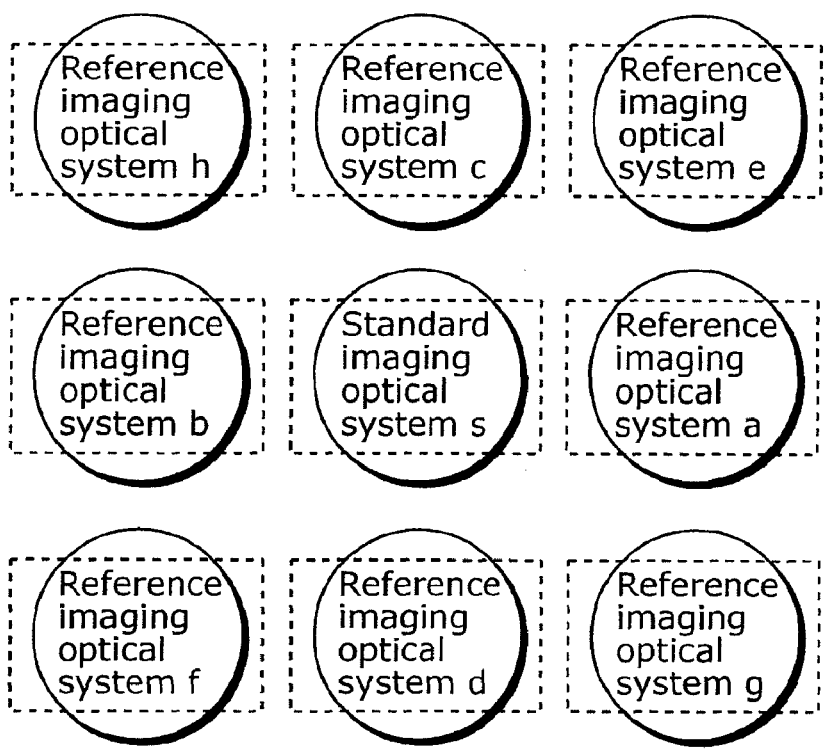
FIG. 24F is a diagram which illustrates a configuration of the distance measuring apparatus according to the practical example of the present invention.
Figure 25A:
FIG. 25A is a diagram which illustrates a picture for performance evaluation with the distance measuring apparatus according to the practical example of the present invention.
Figure 25B:
FIG. 25B is a diagram which illustrates a picture for performance evaluation with the distance measuring apparatus according to the practical example of the present invention.
Figure 25C:
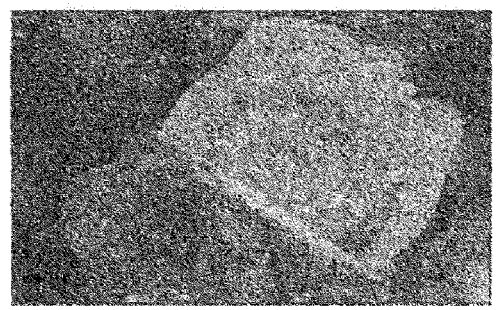
FIG. 25C is a diagram which illustrates a picture for performance evaluation with the distance measuring apparatus according to the practical example of the present invention.
Figure 25D:
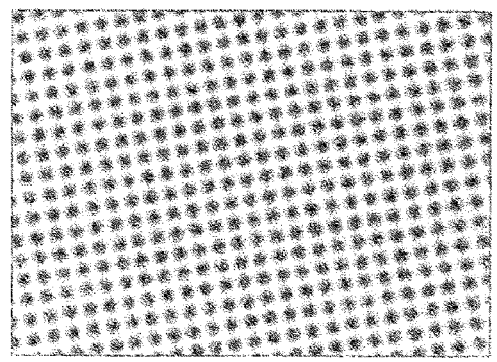
FIG. 25D is a diagram which illustrates a picture for performance evaluation with the distance measuring apparatus according to the practical example of the present invention.
Figure 26C:
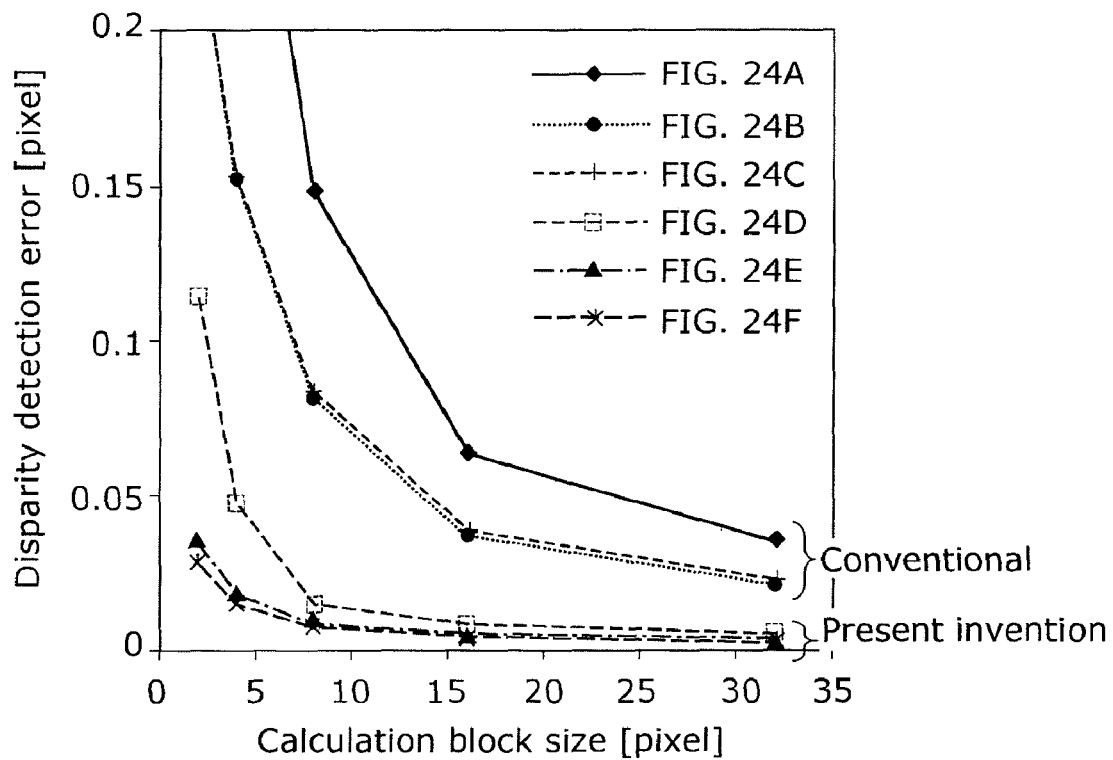
FIG. 26C is a diagram which illustrates performance evaluation with the distance measuring apparatus according to the practical example of the present invention.
Figure 26D:
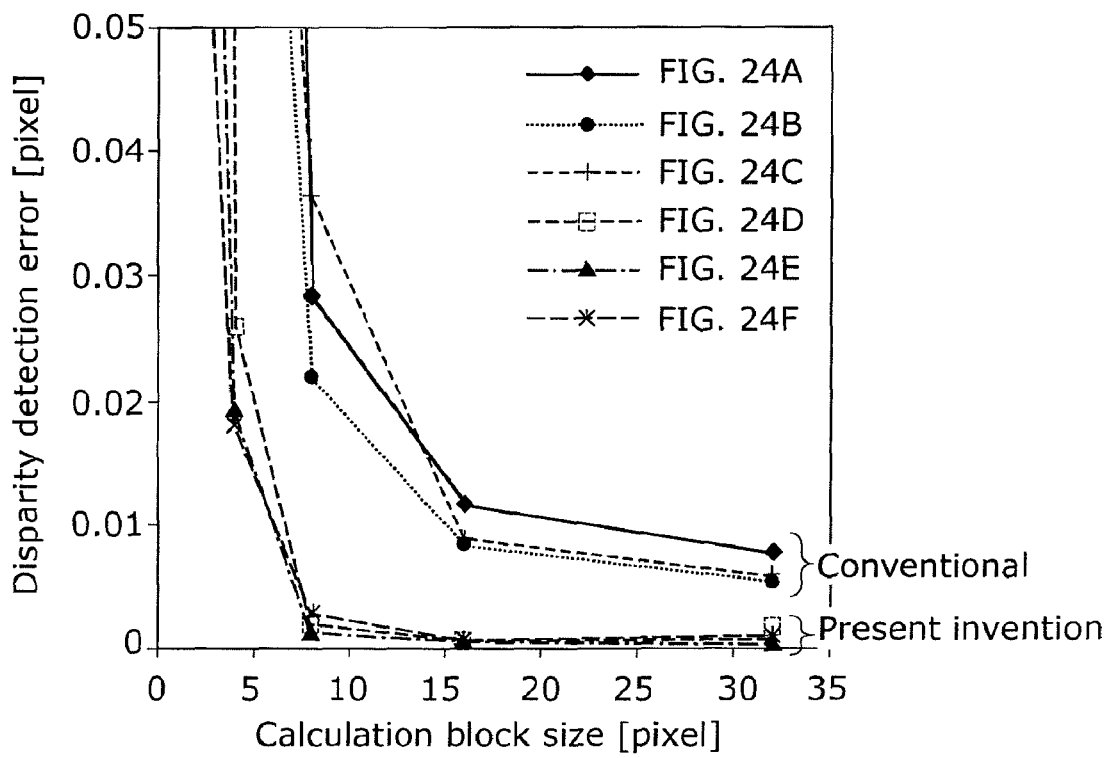
FIG. 26D is a diagram which illustrates performance evaluation with the distance measuring apparatus according to the practical example of the present invention.

This practical example shows an example of a simulation result of a comparison of measuring accuracy (disparity detection accuracy) between a conventional stereo camera and a distance measuring apparatus according to the present invention. FIG. 24A to FIG. 24C show configurations of a conventional stereo camera. FIG. 24D to FIG. 24F show configurations of a distance measuring apparatus according to the present invention in which optical centers of two reference optical systems are arranged point-symmetrically with respect to an optical center of a standard imaging optical system. The distance measuring apparatus includes at least one pair of the reference optical systems. With the above configuration, an integrated correlation value is symmetrical with respect to the actual disparity. In FIG. 24A to FIG. 24F, all of the optical systems have the same focal distance, pixel pitch in a horizontal and vertical direction, and distance to an object. The baseline length of each reference image to the standard imaging optical system is the same in the case where the baseline is in the horizontal or vertical direction, and square root of 2 times of the baseline length in the horizontal direction in the case where the baseline is in an oblique direction. The baseline vertical direction error and the baseline direction error as described in the third embodiment are not included here. FIG. 25A to FIG. 25D are diagrams which illustrate an object used for comparing measuring accuracy. For each object in FIG. 25A to FIG. 25D, a shift picture to (disparity picture) of 10.0 to 11.0 pixel-shift with 0.1 pixel interval in between is generated appropriately and ideally according to each of the optical systems and used for comparison simulation. White noise is added to the picture to such a degree that can be observed with an actual imaging device. FIG. 26A to FIG. 26D are graphs which show results of comparison simulations corresponding to each of the object in FIG. 25A to FIG. 25D. A horizontal axis in each graph of FIG. 26A to FIG. 26D represents a calculation block size (the number of pixels in one side of square calculation block) at the time of performing the disparity calculation, and a vertical axis represents a disparity detection error. The disparity detection error for each calculation block is calculated by performing regional division with a corresponding calculation block size on each of the objects in FIG. 25A to FIG. 25D and averages the disparity detection error for each calculation block by the entire region of the object. Further, with respect to the disparity detection error for each calculation block, an average value of the disparity detection error is calculated for all of the shifting amounts of the shift picture (disparity picture) of 10.0 to 11.0 pixel-shift with 0.1 pixel interval in between (in other words, all of the disparity amounts of 0.0 to 0.9 with 0.1 pixel interval in between after the decimal point are verified.)

As seen in the simulation result of the comparison of FIG. 26A to FIG. 26D, the disparity detection error in each of the objects is significantly reduced (the disparity detection accuracy is improved) in the distance measuring apparatus according to the present invention compared to conventional stereo cameras.

First Modification

Figure 27A:
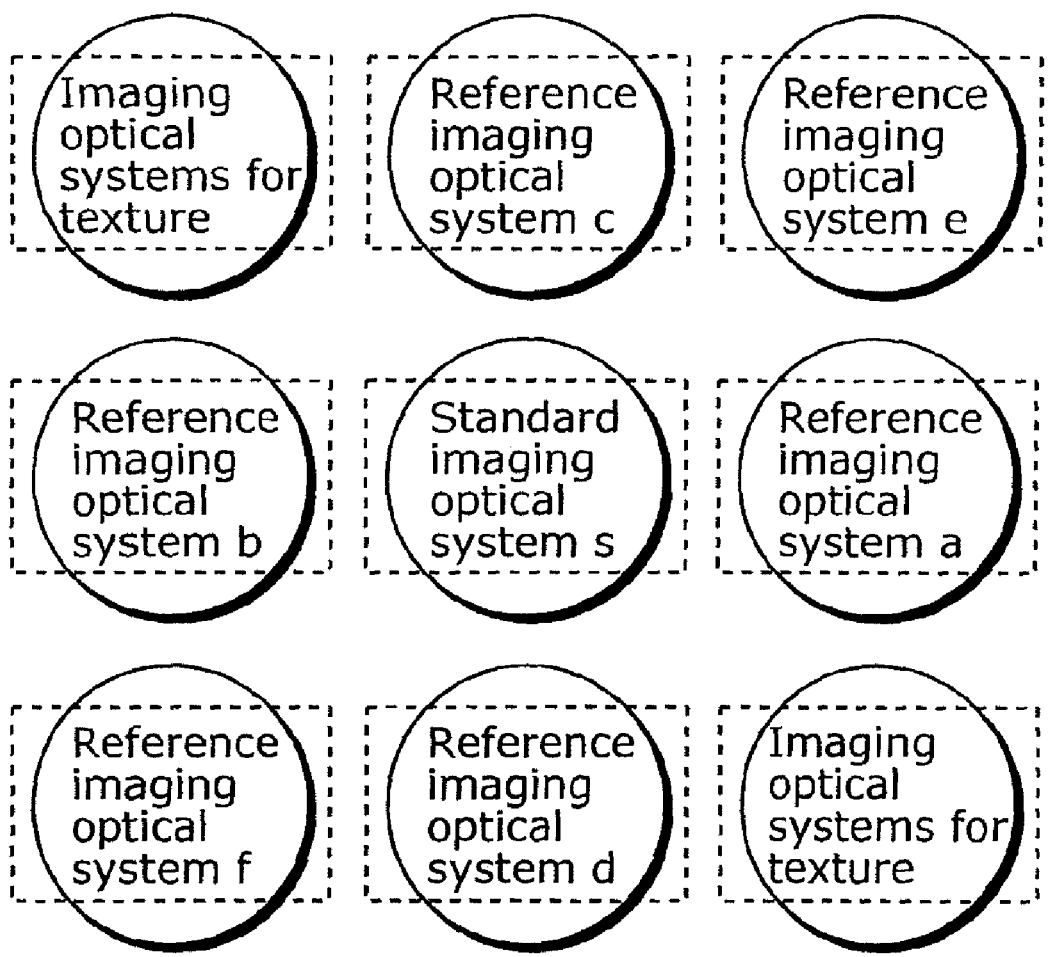
FIG. 27A is a diagram which illustrates an arrangement of imaging optical systems according to the practical example of the present invention.

The distance measuring apparatus according to each of the embodiments described above is an example for explaining the present invention, and the distance measuring apparatus may have a configuration as shown in FIG. 27A.

FIG. 27A is a diagram which illustrates a configuration of an imaging optical system of a distance measuring apparatus according to the present modification example. As shown in the diagram, the distance measuring apparatus according to the present modification includes: a standard imaging optical system s and reference imaging optical systems a to f, and two texture imaging optical systems for applying a texture map to add high-resolution color to a three-dimensional position (shape) of an object which is calculated from the standard imaging optical system s and the reference imaging optical systems a to f. The imaging optical systems for texture may be arranged at any positions and with the any numbers. Further, a new imaging optical system may be added to the distance measuring apparatus according to the present modification for adding an additional feature.

Second Modification

It is to be understood that although the distance measuring apparatus according to each of the embodiments described above includes four or eight reference imaging optical systems, six reference imaging optical systems may be included.

Figure 27B:
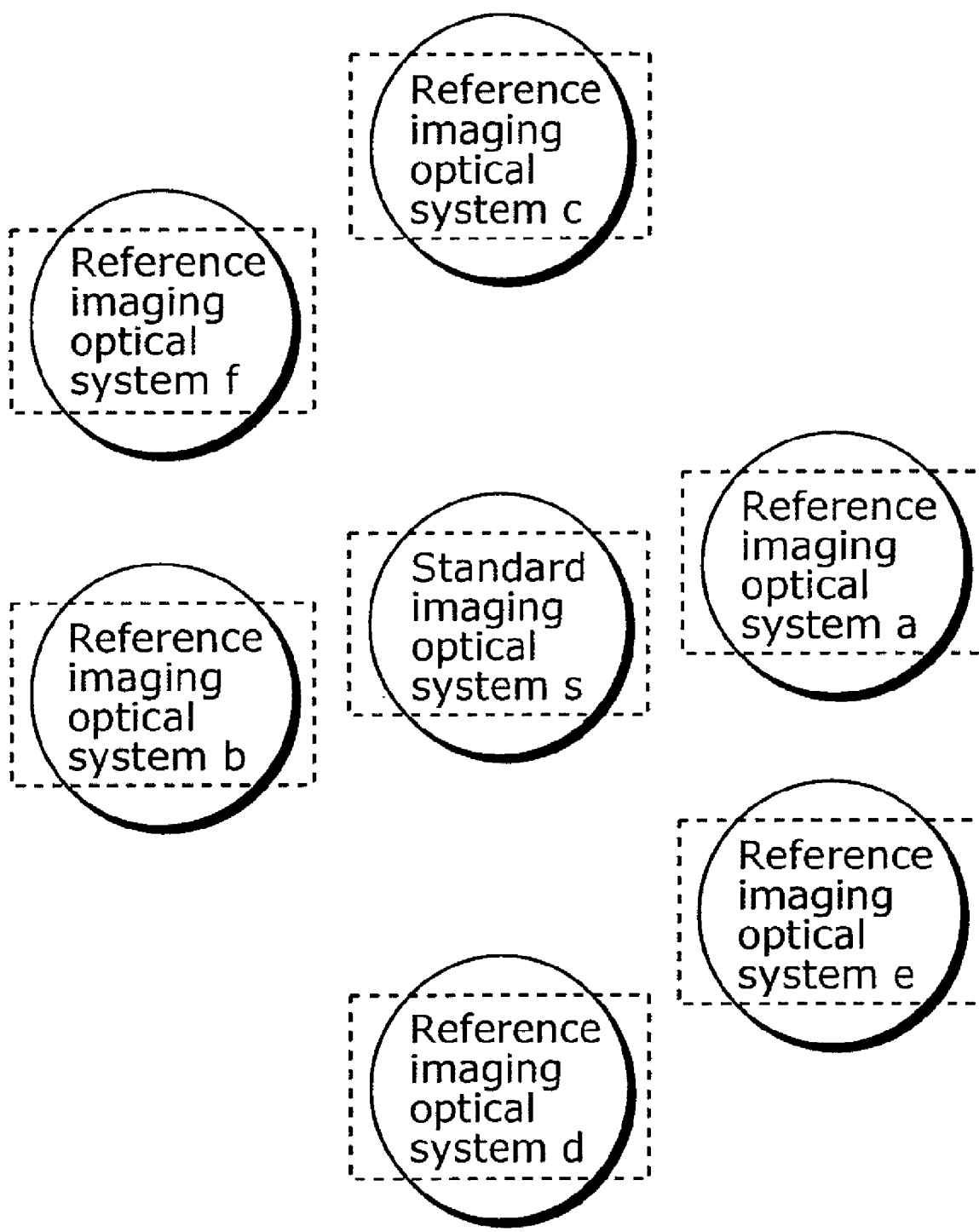
FIG. 27B is a diagram which illustrates an arrangement of imaging optical systems according to the practical example of the present invention.

FIG. 27B is a diagram which shows a configuration of an imaging optical system of a distance measuring apparatus according to the present modification example. As seen in the diagram, the distance measuring apparatus according to the present modification includes seven imaging optical systems. Further, in the distance measuring apparatus according to the present modification, the optical center of a reference imaging optical system a and the optical center of the reference imaging optical system b are arranged substantially in alignment and point-symmetrically with the optical center of a standard imaging optical system s being the basis, the optical center of a reference imaging optical system c and the optical center of the reference imaging optical system d are arranged substantially in alignment and point-symmetrically with the optical center of a standard imaging optical system s being the basis, and the optical center of a reference imaging optical system e and the optical center of the reference imaging optical system f are arranged substantially in alignment and point-symmetrically with the optical center of a standard imaging optical system s being the basis.

It is sufficient for the distance measuring apparatus according to the present invention to have a configuration to include plural sets of two reference imaging optical systems arranged substantially in alignment and substantially point-symmetrically with the optical center of a standard imaging optical system being the basis, as in the distance measuring apparatus according to the present modification. Further, even a distance measuring apparatus that includes, for example, 10 or 12 reference imaging optical systems can also produce an advantageous effect of the present invention.

Now, in the case where equal to or more than four reference imaging optical systems are included as in the distance measuring apparatus according to the forth embodiment and the first and second modifications as described above, the shifting amount at the time of performing block matching calculation become a sub-pixel unit depending on the arrangement of the reference imaging optical systems and a time taken for block matching calculation may sometimes increase. Accordingly, an arrangement of the imaging optical system in which the shifting amount at the time of performing block matching calculation does not become a sub-pixel unit, that is, the time taken for block matching calculation is reduced will be described with reference to FIG. 28A to FIG. 28C.

Figure 28A:
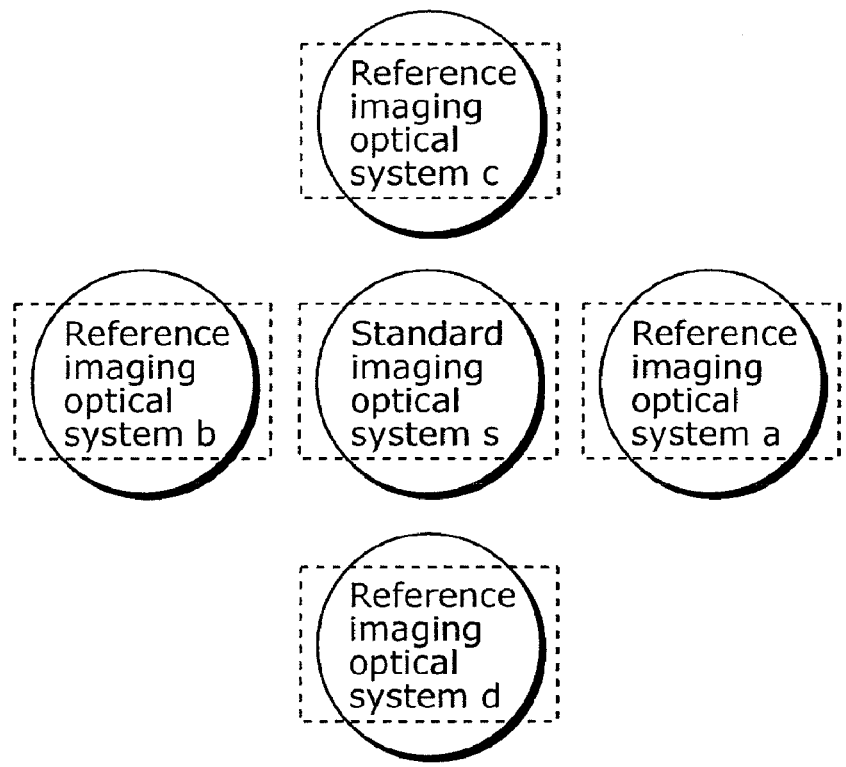
FIG. 28A is a diagram which illustrates an arrangement of imaging optical systems according to an aspect of the present invention.
Figure 28B:
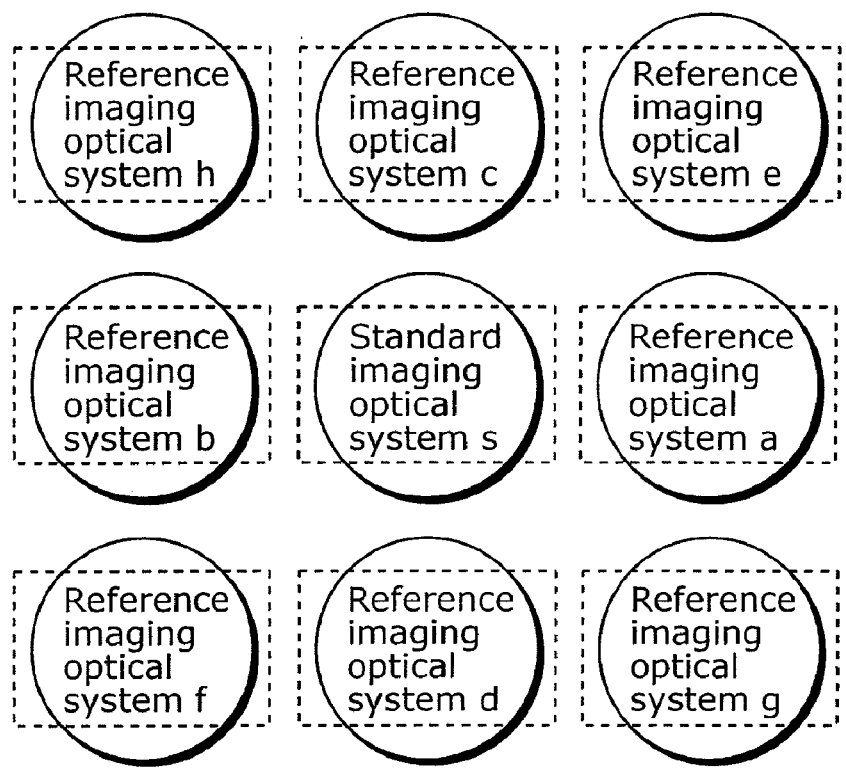
FIG. 28B is a diagram which illustrates an arrangement of the imaging optical systems according to an aspect of the present invention.
Figure 28C:
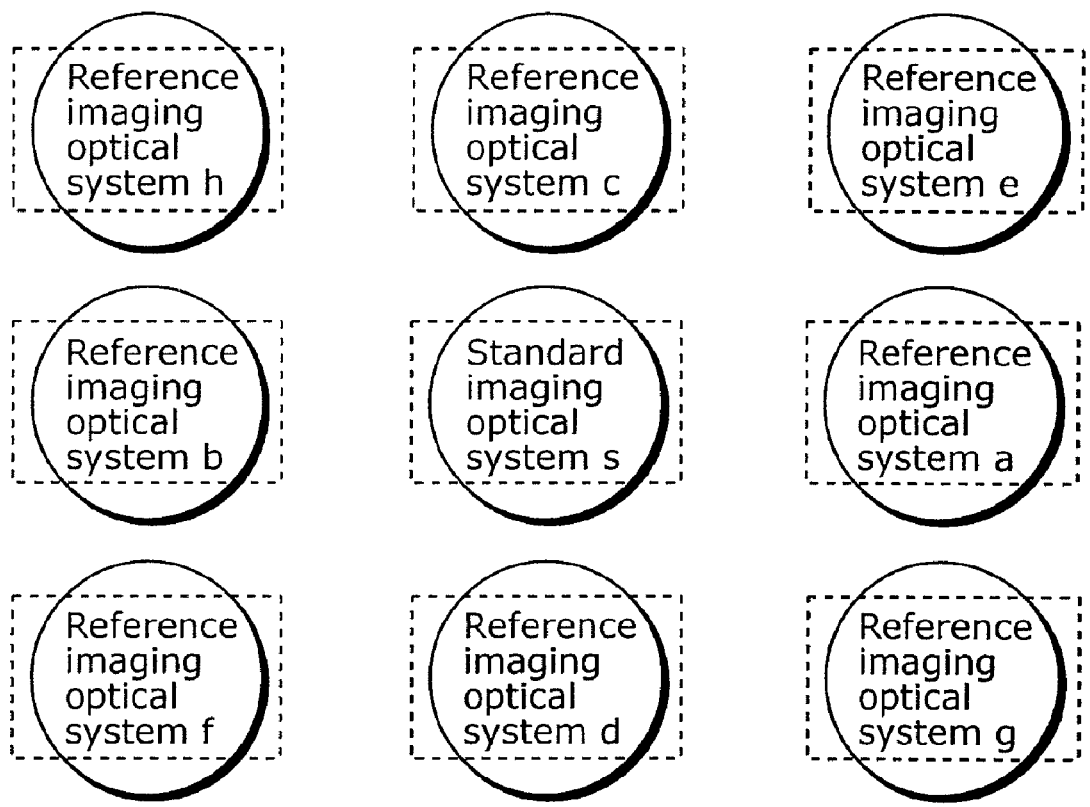
FIG. 28C is a diagram which illustrates an arrangement of the imaging optical systems according to an aspect of the present invention.

FIG. 28A to FIG. 28C are diagrams which show arrangements of imaging optical systems. In each of the imaging optical systems shown in FIG. 28A to FIG. 28C, pixels included in an imaging region of the imaging optical system are arranged parallel in the horizontal direction and in the vertical direction. Here, two reference imaging optical systems in which optical centers are arranged substantially point-symmetrically with the standard imaging optical system being the basis and substantially in alignment as being parallel to the direction of an pixel arrangement (horizontal or vertical) are assumed to be a first imaging optical system group. Further, other two reference imaging optical systems in which optical centers are arranged substantially point-symmetrically with the standard imaging optical system being the basis and substantially in alignment as being parallel to the direction of an pixel arrangement (horizontal or vertical) are assumed to be a second imaging optical system group. In the first and second imaging optical system groups in this case, the baseline length of the standard imaging optical system s and each of two reference imaging optical systems are B1 and B2, respectively. In addition, directions of shifting a block at the time of block matching calculation of the imaging optical system groups 1 and 2, that is, a pixel pitch in the direction parallel to each of the baseline lengths are p1 and p2, respectively.

In the case where B1/p1 and B2/p2 are in the relationship of integral multiple, when selecting a block corresponding to the shifting amount at the time of the block matching calculation as a reference image, a boundary of the block is the same as a boundary of a pixel (a trimming coordinate of the reference image constantly becomes an integer). This makes interpolation calculation such as bilinear interpolation unnecessary when the correlation value calculation unit 6 selects a reference image, and thus it is possible to significantly reduce calculation time.

In the imaging optical system shown in FIG. 28A, it is assumed that the imaging optical system group 1 includes the reference imaging optical system a and the reference imaging optical system b, and the imaging optical system group 2 includes the reference imaging optical system c and the reference imaging optical system d. Here, the pixel pitch in the vertical direction and the pixel pitch in the horizontal direction are the same p1 (p1=p2). The baseline length Ba of the standard imaging optical system s and the reference imaging optical system a is the same as the baseline length Bc of the standard imaging optical system s and the reference imaging optical system c. Accordingly, Ba/p1=Bc/p2 becomes true, and thus the boundary of the block for each shifting amount at the time of block matching calculation matches with the boundary of the pixel. As a result, it is possible to significantly reduce calculation time for block matching calculation.

In the imaging optical system shown in FIG. 28B, in addition to the arrangement of the imaging optical system in FIG. 28A, reference imaging optical systems e, f, g, and h are arranged at an angle of 45 degrees to the pixel array with the baseline length being square root of 2 times lengths with respect to the baseline length Ba. At this time, a pixel pitch p2 in the direction parallel to the baseline length of the standard imaging optical system s and each of the reference imaging optical system e, f, g, and h is sqrt(2) times (p2=sqrt(2)·p1) of the pixel pitch in the horizontal (vertical) direction. Thus, in consideration of Be=sqrt (2)·Ba, Ba/p1=Be/p2 becomes true. Be is the baseline length of the standard imaging optical system s and the reference imaging optical system e. Also in this case, when selecting, as a reference image, a block corresponding to the shifting amount at the time of block matching calculation, the boundary of the block matches with the boundary of the pixel (a trimming coordinate of the reference image constantly becomes an integer). As a result, it is possible to significantly reduce calculation time for block matching calculation.

Unlike FIG. 28A and FIG. 28B, in the imaging optical system shown in FIG. 28C, p1 that is the pixel pitch in the horizontal direction is longer than p2 that is the pixel pitch in the vertical direction. Thus, in order to correspond to the ratio of the pixel pitch in the horizontal direction and the vertical direction, the baseline length Ba of the standard imaging optical system s and the reference imaging optical systems a and b is longer than the baseline length Bc of the standard imaging optical system s and the reference imaging optical systems c and d. More specifically, each of the imaging optical systems is arranged so that Ba/p1=Bc/p2 becomes true. As a result, it is possible to significantly reduce calculation time for block matching calculation as well as FIG. 28A and FIG. 28B.

As described above, it is possible to significantly reduce calculation time for block matching calculation by arranging an imaging region that is an imaging apparatus of each of the imaging optical systems so as to correspond to the position relationship of the pixels included therein. Therefore, each of the imaging optical systems is arranged so that the direction of arrangement and the distance to a pixel included in the imaging region of each of the imaging optical systems and the direction and the length of each of the imaging optical systems are similar, enabling significant reduction in calculation time.

Third Modification

Figure 29A:
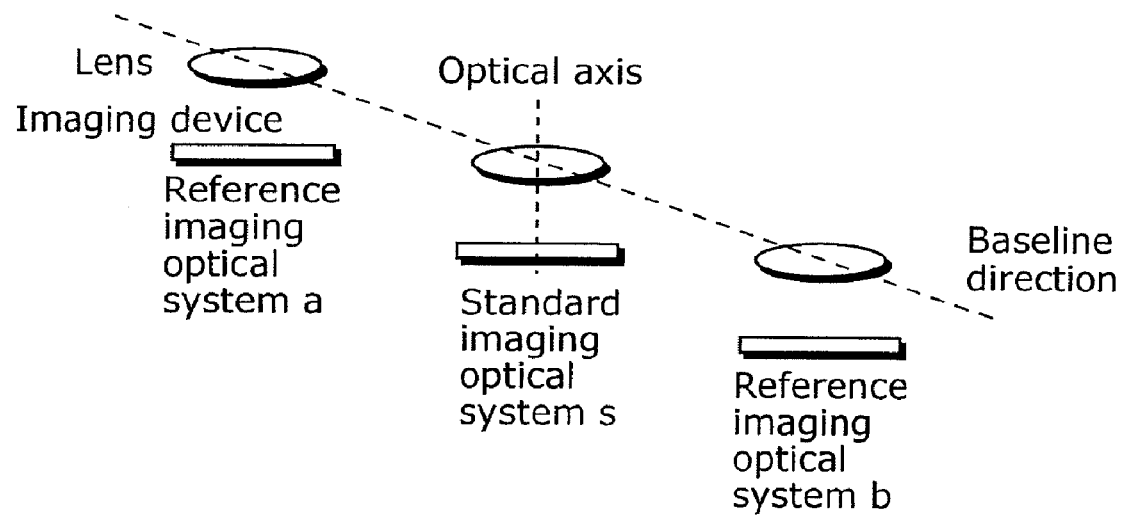
FIG. 29A is a diagram which illustrates an arrangement of the imaging optical systems according to an aspect of the present invention.
Figure 29B:
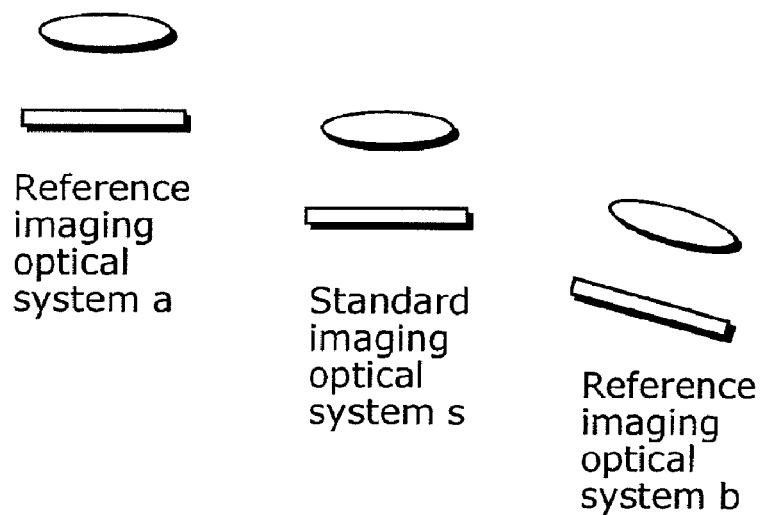
FIG. 29B is a diagram which illustrates an arrangement of the imaging optical systems according to an aspect of the present invention.
Figure 30:
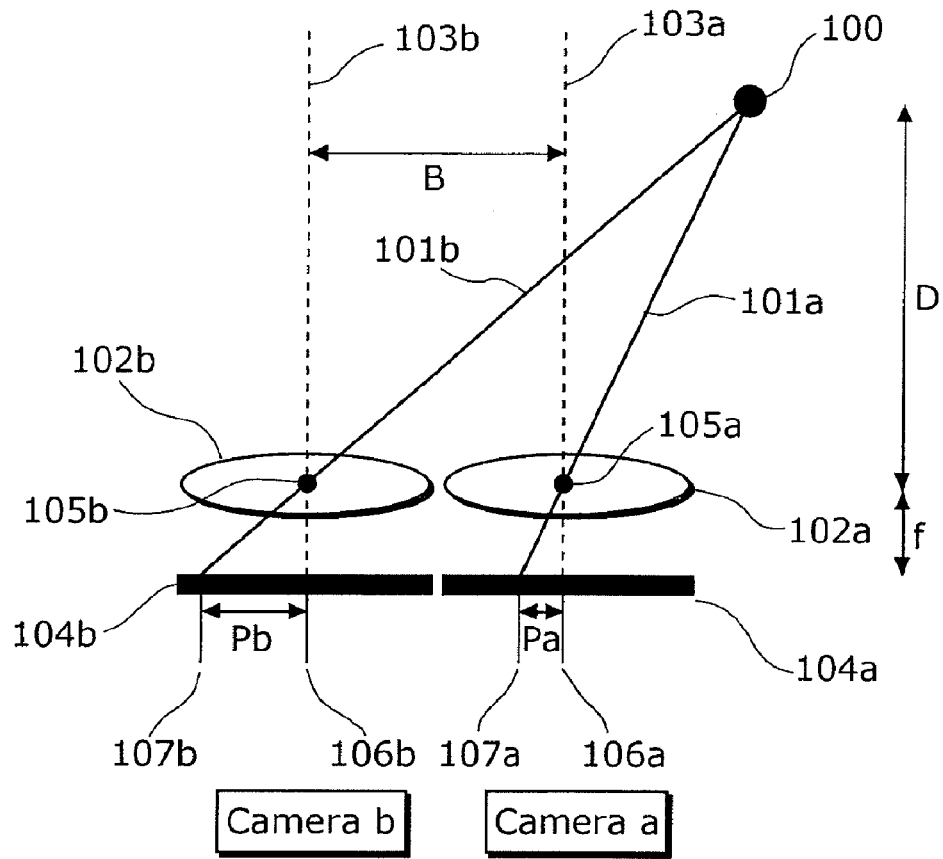
FIG. 30 is a diagram which illustrates an example of a calculation of a distance to an object through stereo distance-measuring method.
Figure 31:
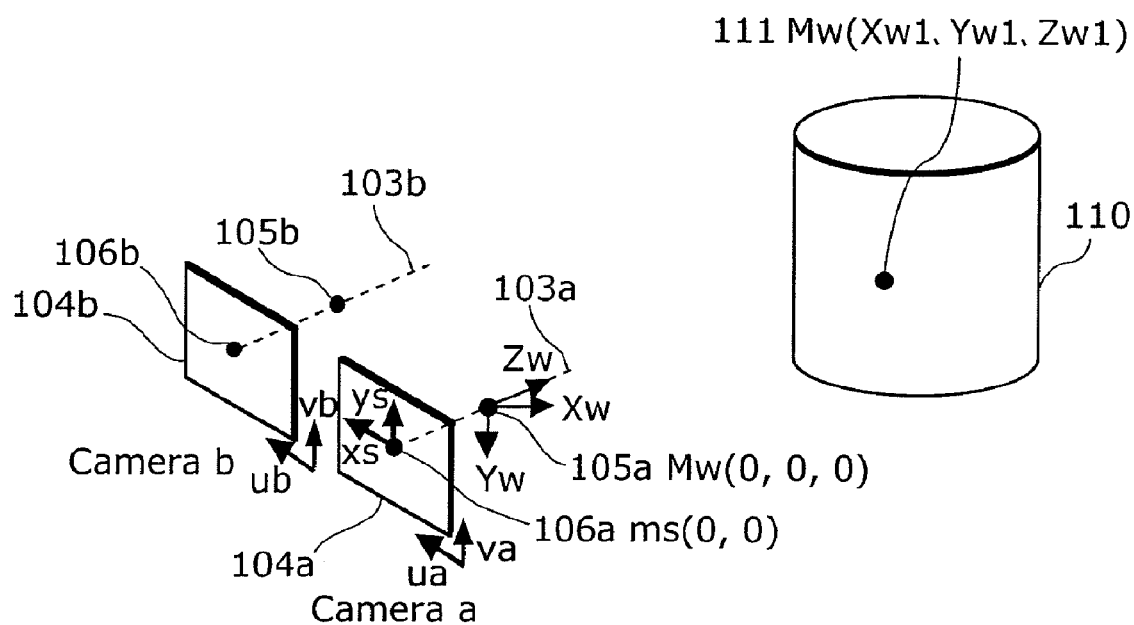
FIG. 31 is a diagram which illustrates a positional relationship between a distance measuring apparatus and an object in a description of a conventional art.
Figure 32:
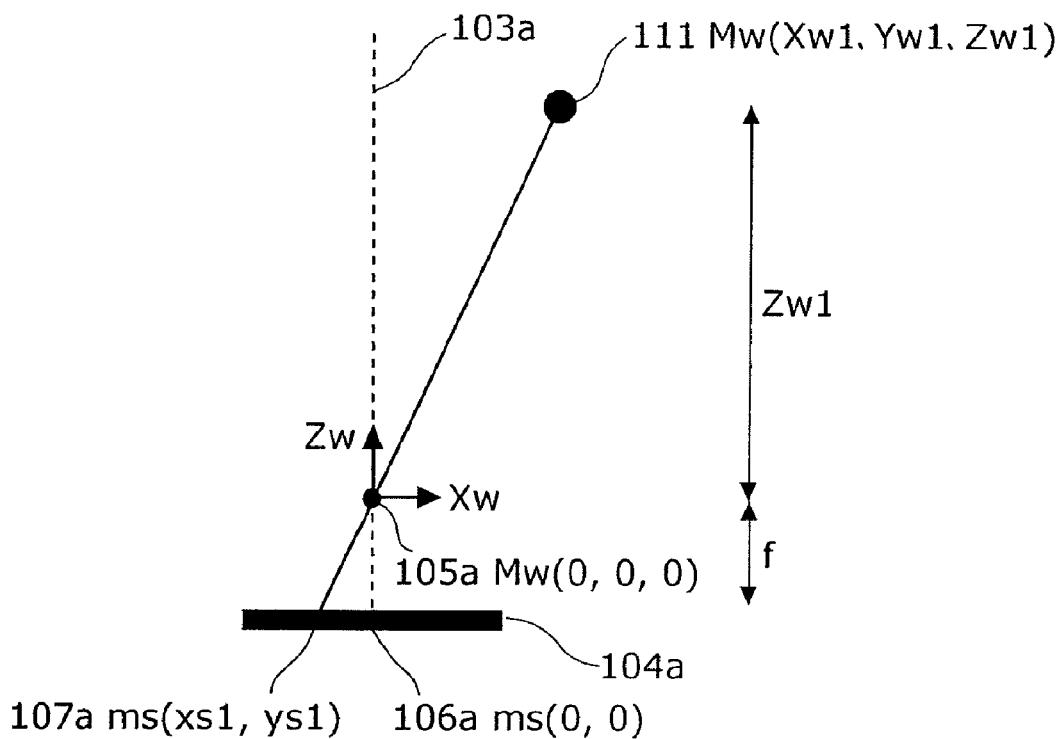
FIG. 32 is a diagram which illustrates a camera and a point on the object viewed from the direction of a minus side of Yw axis in a description of a conventional art.
Figure 33:
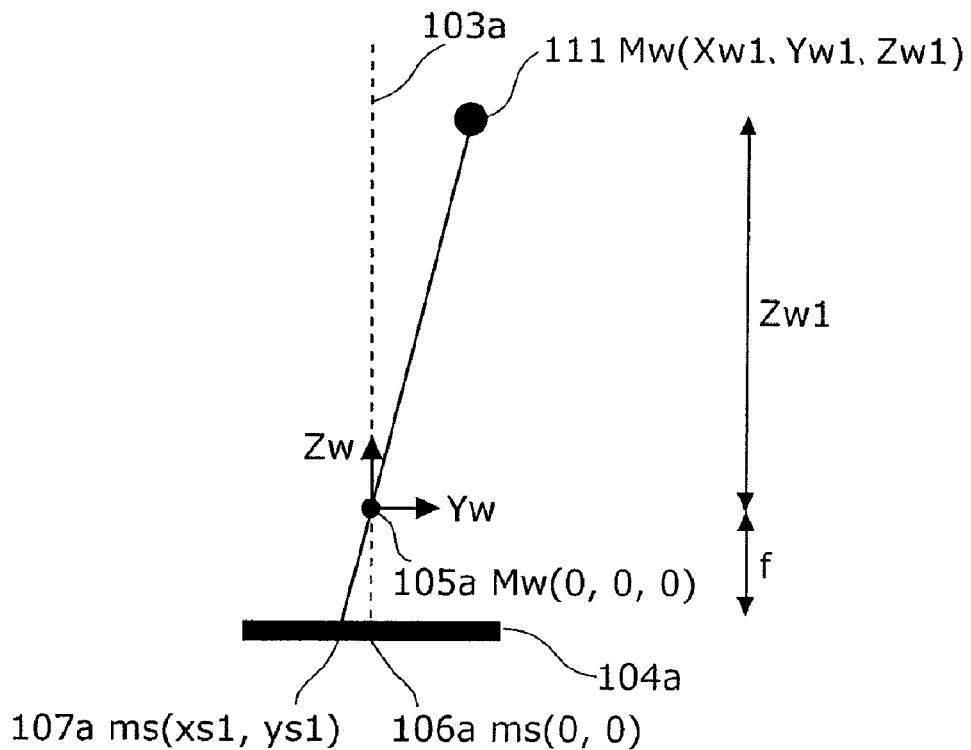
FIG. 33 is a diagram which illustrates the camera and the point on the object viewed from the direction of a plus side of Xw axis in a description of the conventional art.
Figure 34:
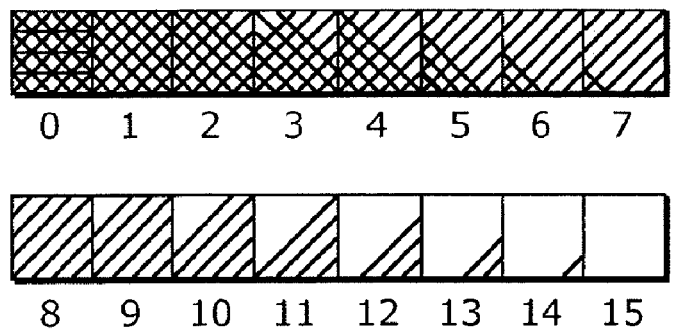
FIG. 34 is a diagram that explains a method of expressing brightness of each pixel in a picture.
Figure 35A:
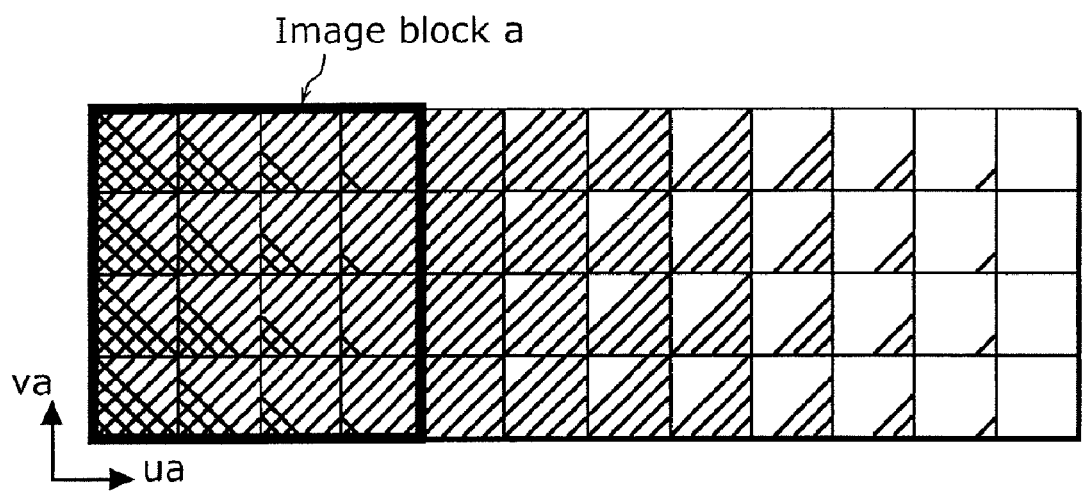
FIG. 35A is a diagram which illustrates a portion of a picture showing a texture of an imaged object viewed from the direction of the object in a description of the conventional art.
Figure 35B:
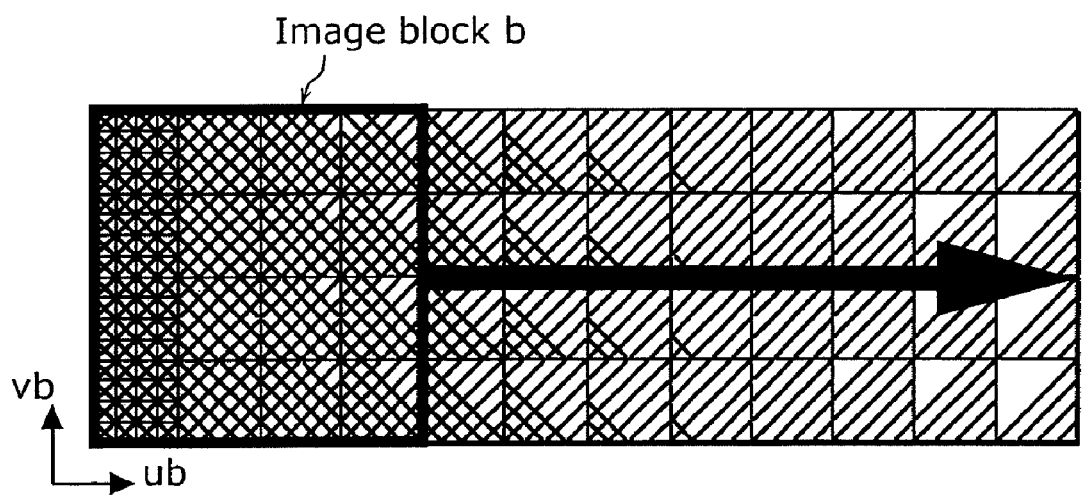
FIG. 35B is a diagram which illustrates a portion of a picture showing a texture of an imaged object viewed from the direction of the object in a description of the conventional art.
Figure 36:
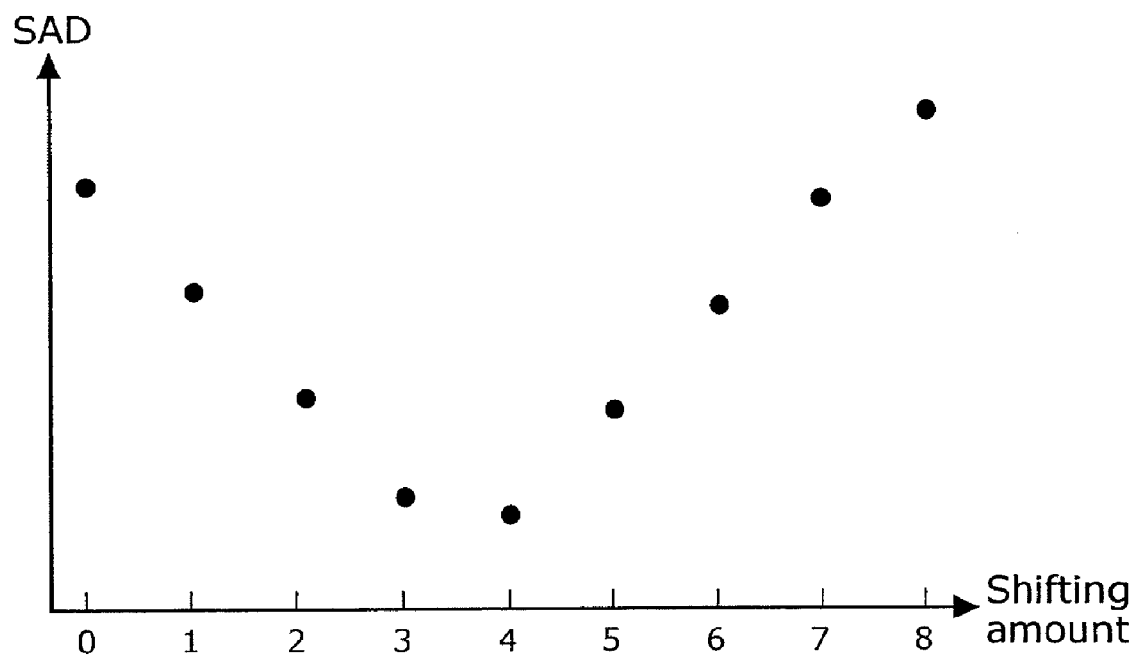
FIG. 36 is a diagram which illustrates a transition of a SAD in a description of the conventional art.
Figure 37:
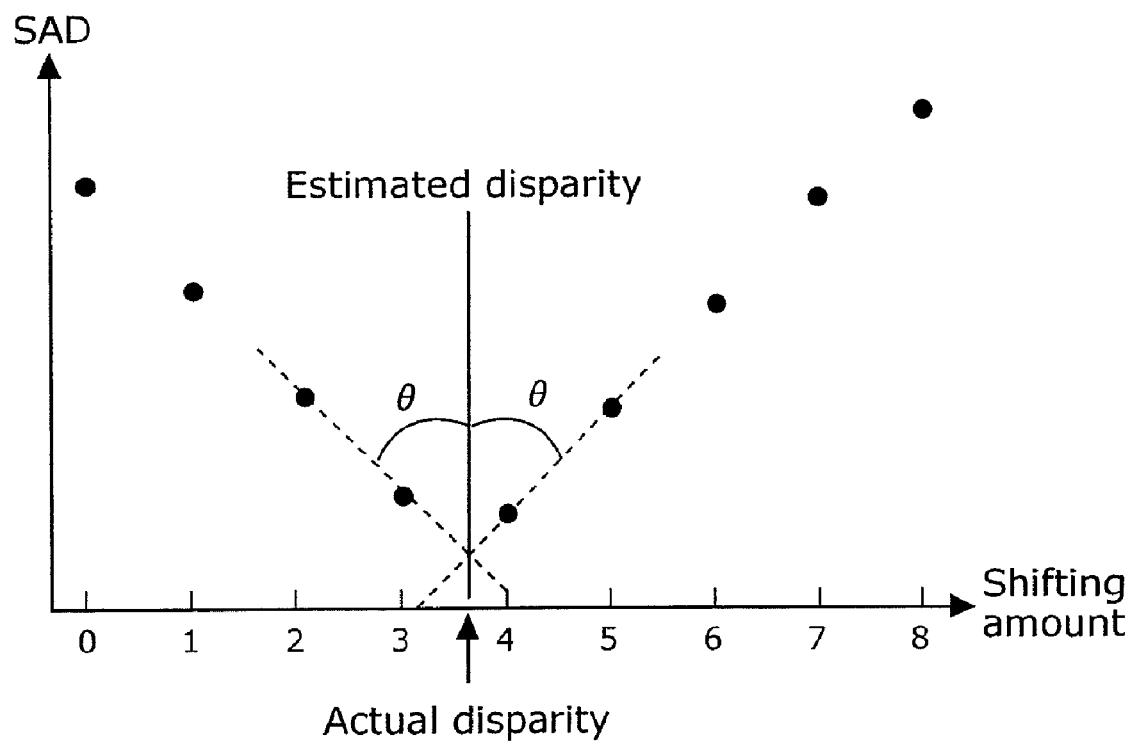
FIG. 37 is a diagram which illustrates a transition of a SAD in a description of the conventional art.
Figure 38A:
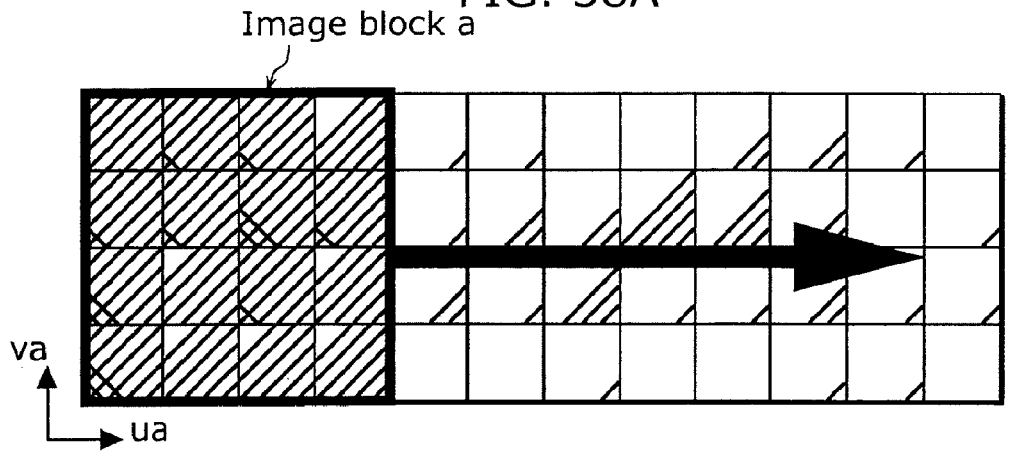
FIG. 38A is a diagram which illustrates a portion of a picture viewed from the direction of the object in a description of the conventional art.
Figure 38B:
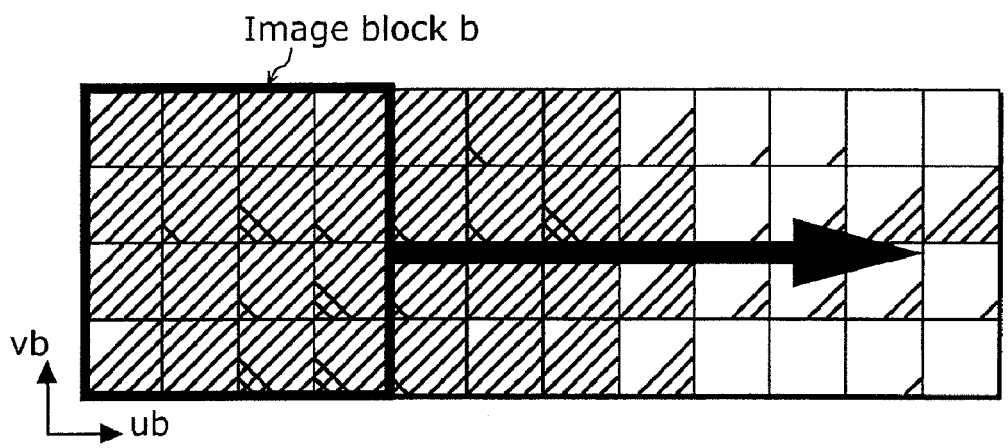
FIG. 38B is a diagram which illustrates a portion of a picture viewed from the direction of the object in a description of the conventional art.
Figure 39:
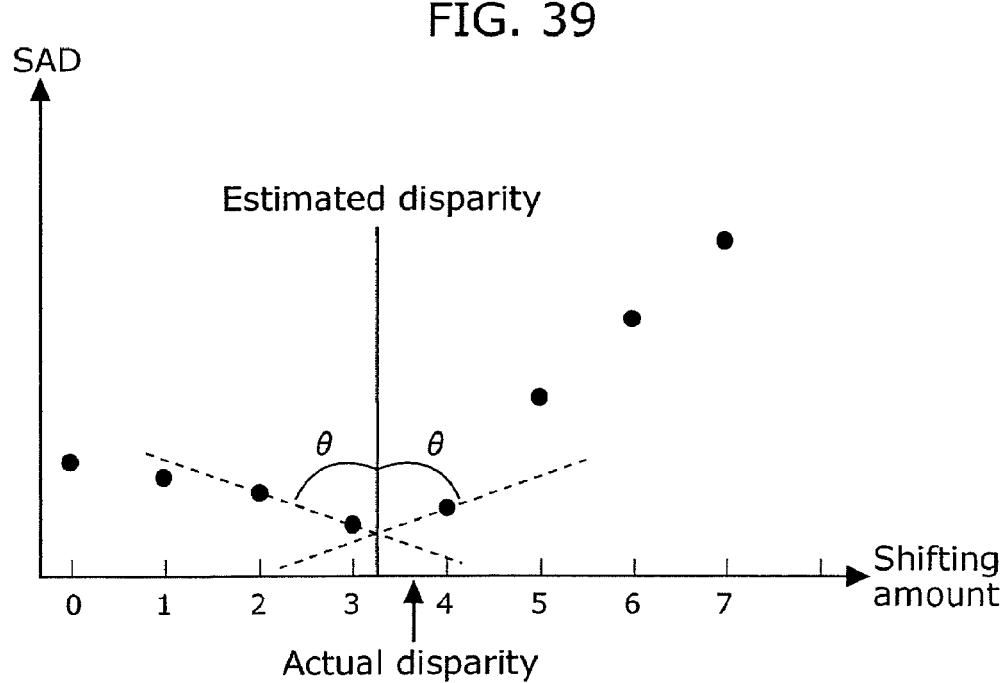
FIG. 39 is a diagram which explains a sub-pixel disparity estimation using equiangular linear fitting in a description of the conventional art.

It is sufficient for the distance measuring apparatus according to each of the embodiments described above that the optical center of each of the reference images is substantially point symmetry with respect to the optical center of the standard imaging optical system s as shown in FIG. 29A and FIG. 29B. FIG. 29A and FIG. 29B are overhead views which show a different example of a distance measuring apparatus according to the present invention. Components other than a lens and an imaging device are not illustrated. As shown in FIG. 29A, the baseline connecting the optical center of each optical system is not have to be vertical to the optical axis of each of the optical systems. In this case, the symmetrical property of transition of a synthesized correlation value with respect to the actual disparity is not impaired when deriving a correlation value with respect to each reference imaging optical system by using a conventional disparity search method in which a block size is variable for each shifting amount at the time of disparity searching, and thus it is possible to produce an effective advantage of the present invention. Or, calculation may be performed by making the optical axis and the baseline direction vertical to each other through calibration (view point transformation) using affine transformation. In addition, as shown in FIG. 29B, the optical axis of each of the optical systems is not have to be parallel with each other. This is because the direction of the optical axis may be corrected by performing calibration (view point transformation) using affine transformation.

The distance measuring apparatus according to the embodiments and modifications of the present invention has been described above. However, a specific constitution of the present invention is not limited to each of the embodiments and each of the modifications described above. Further, it may be possible to combine components in different embodiments and modifications. Various changes and modifications can be applied unless such changes and modifications depart from the scope of the invention.

For example, the imaging optical system according to each of the embodiments and each of the modifications described above may include a color imaging device such as a Bayer array color imaging device. In this case, by using a color picture of which resolution is increased by generally known de-mosaic processing and the like, it is possible to calculate disparity with a high degree of accuracy as in each of the embodiments and the modifications described above.

In addition, although the optical center of the standard imaging optical system and the optical centers of other two reference imaging optical systems are arranged in alignment and point-symmetrically with the optical center of the standard imaging optical system being the basis, it may be possible that the optical center of the standard imaging optical system and the optical centers of other two reference imaging optical systems are arranged substantially in alignment and substantially point-symmetrically with the optical center of the standard imaging optical system being the basis.

The expressions, that is, substantially in alignment and substantially point-symmetrically, represents a range that satisfy conditions of (Equation 8) and (Equation 10) described in the third embodiment.

Further, although a SAD is used as a function that calculates a correlation value in each of the embodiments described above, it is also possible to use a ZNCC (cross-correlation coefficient). In the case where the ZNCC is used, the correlation value is 1 at the highest correlation, and the correlation value is less than 1 when the correlation low. The present invention can also be applied to the case where a shifting amount at which transition of a correlation value becomes the highest is calculated as a disparity at a sub-pixel level. The present invention can also be applied to the case where a correlation value is calculated by using the SSD and or the NCC as a function that calculates the correlation value. More specifically, the transition of the correlation value becomes symmetrical with the actual disparity being the basis according to the present invention, and thus it is possible to calculated sub-pixel disparity with a high degree of accuracy regardless of the highest or lowest of an extremal value of transition of the correlation value.

Further, in the distance measuring apparatus according to each of the embodiments and modifications described above, a three-dimensional position of and a distance to an object does not have to be calculated. In this case, the distance measuring apparatus is referred to as a compound eye imaging apparatus. The compound eye imaging apparatus is configured in the same manner as in the distance measuring apparatus as shown in FIG. 1, for example. However, unlike the distance measuring apparatus, the compound eye imaging apparatus does not include the post-processing unit 9 that calculates a three-dimensional position of and a distance to an object.

Further, the present invention can be implemented not only as the distance measuring apparatus described above, but also as a distance measuring method or a disparity calculating method including characteristic components included in the distance measuring apparatus described above as steps, and as a program which, when loaded into a computer, allows a computer to execute the steps. It should be understood that such a program can be distributed via a recording medium such as a CD-ROM and a transmission medium such as the Internet.

Further, the present invention can also be implemented as a semiconductor integrated circuit (LSI) that implements a portion of functions of components of the distance measuring apparatus described above.

INDUSTRIAL APPLICABILITY

The present invention relates to a compound eye imaging apparatus that can calculate a disparity that occurs in plural imaging optical systems that take an image of the same object, and to a distance measuring apparatus that can obtain a distance between the apparatus and the object or a three-dimensional position or a shape of the object. The present invention is useful to be applied for vehicle installation, monitoring, medical practice, a robot, a game, CG image creation, an input for a three-dimensional image, an automatic focus of a digital camera and a digital video camera, and so on.

The invention claimed is:

1. A compound eye imaging apparatus which calculates a disparity occurring in a plurality of imaging optical systems that take an image of a same object,
said apparatus comprising:
a standard imaging optical system which generates a picture including a standard image by taking an image of the object;
reference imaging optical systems of an even number equal to or larger than two, each of which has an optical center and generates a picture including a reference image by taking an image of the object, the optical centers being arranged substantially point-symmetrically with respect to an optical center of said standard imaging optical system;
a correlation value calculation unit configured to calculate a correlation value indicating a degree of similarity between the standard image and the reference image, for each shifting amount by which a search position of the reference image in the picture generated by said reference imaging optical systems is shifted in a direction parallel to a baseline so that an image position of the reference image which is similar to the standard image is searched for, for each of said reference imaging optical systems of an even number equal to or larger than two, the baseline being a straight line connecting the optical center of said standard imaging optical system and the optical center of said reference imaging optical systems;
a correlation value addition unit configured to calculate an integrated correlation value by adding the correlation value to each corresponding shifting amount, the correlation value being calculated for each of said reference imaging optical systems of an even number equal to or larger than two; and
a disparity calculation unit configured to calculate, at a sub-pixel level, a disparity that is a shifting amount which results in a largest degree of similarity between the standard image and the reference image.

2. The compound eye imaging apparatus according to claim 1,
wherein said disparity calculation unit is configured to calculate a disparity at the sub-pixel level by interpolating the correlation value with use of an interpolation function using a symmetric property, the correlation value having been added for each of the shifting amounts by said correlation value addition unit.

3. The compound eye imaging apparatus according to claim 1,
wherein said compound eye imaging apparatus includes at least four reference imaging optical systems including a pair of first reference imaging optical systems and a pair of second reference imaging optical systems that are different from said first reference imaging optical systems arranged so that a direction of a baseline of said pair of first reference imaging optical systems is at an angle of a predetermined degree to a direction of a baseline of said pair of second reference imaging optical systems, said pair of first reference imaging optical systems being arranged substantially point-symmetrically with respect to the optical center of said standard imaging optical system and said pair of second reference imaging optical systems being arranged substantially point-symmetrically with respect to the optical center of said standard imaging optical system.

4. The compound eye imaging apparatus according to claim 3,
wherein said at least four reference imaging optical systems are arranged so that a first baseline length differs from a second baseline length, the first baseline length being a length of the baseline of said first reference imaging optical system and said standard imaging optical system, the second baseline length being a length of the baseline of said second reference imaging optical system and said standard imaging optical system, and said correlation value calculation unit is configured to calculate, when calculating a correlation value of the reference image generated by said second reference imaging optical systems, the correlation value for each second shifting amount, the second shifting amount being a value obtained by multiplying a value resulted from subtracting the first baseline length from the second baseline length by the first shifting amount used for calculating the correlation value of the reference image generated by said first reference imaging optical systems.

5. The compound eye imaging apparatus according to claim 3, wherein said standard imaging optical system and said at least four reference imaging optical systems are arranged to have a same positional relationship as a positional relationship of pixels included in an imaging apparatus included in said standard imaging optical system.

6. The compound eye imaging apparatus according to claim 1,

Wherein, in each pair of said reference imaging optical systems arranged substantially point-symmetrically with respect to the optical center of said standard imaging optical system, an optical center position error satisfies: the optical center position error $\leq D \cdot pitch \cdot 0.15/f$, where D is a distance to the object, pitch is a pixel pitch, f is a focal length, and the optical center position error is a distance between a straight line and the optical center of one of said pair of reference imaging optical systems, the straight line connecting the optical center of an other of said pair of reference imaging optical systems and the optical center of said standard imaging optical system.

7. The compound eye imaging apparatus according to claim 1,

Wherein, in each pair of said reference imaging optical systems arranged substantially point-symmetrically with respect to the optical center of said standard imaging optical system, a baseline length error that is a difference in a length between a first baseline length and a second baseline length satisfies: the baseline length error $\leq D \cdot pitch \cdot 0.2/f$, where D is a distance to the object, pitch is a pixel pitch, and f is a focal length, the first baseline length being a distance between the optical center of one of said pair of reference imaging optical systems and the optical center of said standard imaging optical system.

8. The compound eye imaging apparatus according to claim 1, further comprising a preprocessing unit configured to apply a smoothing filter to the standard image and the reference image, wherein said correlation value calculation unit is configured to calculate the correlation value based on the standard image and reference image to which smoothing filter has been applied.

9. A distance measuring apparatus which calculates a distance to an object or a three-dimensional location of the object by calculating a disparity occurring in a plurality of imaging optical systems that take an image of the same object, said apparatus comprising:

a standard imaging optical system which generates a picture including a standard image by taking an image of the object;

reference imaging optical systems of an even number equal to or larger than two, each of which has an optical center and generates a picture including a reference image by taking an image of the object, the optical centers being arranged substantially point-symmetrically with respect to an optical center of said standard imaging optical system;

a correlation value calculation unit configured to calculate a correlation value indicating a degree of similarity between the standard image and the reference image, for each shifting amount by which a search position of the reference image in the picture generated by said reference imaging optical systems is shifted in a direction parallel to a baseline so that an image position of the reference image which is similar to the standard image is searched for, for each of said reference imaging optical systems of an even number equal to or larger than two, the baseline being a straight line connecting the optical center of said standard imaging optical system and the optical center of said reference imaging optical systems;

a correlation value addition unit configured to calculate an integrated correlation value by adding the correlation value to each corresponding shifting amount, the correlation value being calculated for each of said reference imaging optical systems of an even number equal to or larger than two;

a disparity calculation unit configured to calculate, at a sub-pixel level, a disparity that is a shifting amount which results in a largest degree of similarity between the standard image and the reference image; and a distance calculation unit configured to calculate a distance from said distance measuring apparatus to the object or a three-dimensional location of the object based on the calculated disparity, a focal length of said standard imaging optical system, and a length of the baseline.

10. A disparity calculation method for calculating a disparity occurring in a plurality of imaging optical systems that take an image of a same object, the plurality of imaging optical systems including: a standard imaging optical system which generates a picture including a standard image by taking an image of the object; and reference imaging optical systems of an even number equal to or larger than two, each of which has an optical center and generates a picture including a reference image by taking an image of the object, the optical centers being arranged substantially point-symmetrically with respect to an optical center of the standard imaging optical system, said disparity calculation method comprising:

calculating a correlation value indicating a degree of similarity between the standard image and the reference image, for each shifting amount by which a search position of the reference image in the picture generated by the reference imaging optical systems is shifted in a direction parallel to a baseline so that an image position of the reference image which is similar to the standard image is searched for, for each of the reference imaging optical systems of an even number equal to or larger than two, the baseline being a straight line connecting the optical center of the standard imaging optical system and the optical center of the reference imaging optical systems;

calculating an integrated correlation value by adding the correlation value to each corresponding shifting amount, the correlation value being calculated for each of the reference imaging optical systems of an even number equal to or larger than two; and calculating, at a sub-pixel level, a disparity that is a shifting amount which results in a largest degree of similarity between the standard image and the reference image.

11. A distance measuring method for calculating a distance to an object or a three-dimensional location of the object by calculating a disparity occurring in a plurality of imaging optical systems that take an image of the same object, the plurality of imaging optical systems including: a standard imaging optical system which generates a picture including a standard image by taking an image of the object; and reference imaging optical systems of an even number equal to or larger than two, each of which has an optical center and generates a picture including a reference image by taking an image of the object, the optical centers being arranged substantially point-symmetrically with respect to an optical center of the standard imaging optical system, said distance measuring method comprising:

calculating a correlation value indicating a degree of similarity between the standard image and the reference image, for each shifting amount by which a search position of the reference image in the picture generated by the reference imaging optical systems is shifted in a direction parallel to a baseline so that an image position of the reference image which is similar to the standard image is searched for, for each of the reference imaging optical systems of an even number equal to or larger than two, the baseline being a straight line connecting the optical center of the standard imaging optical system and the optical center of the reference imaging optical systems;

calculating an integrated correlation value by adding the correlation value to each corresponding shifting amount, the correlation value being calculated for each of the reference imaging optical systems of an even number equal to or larger than two;

calculating, at a sub-pixel level, a disparity that is a shifting amount which results in a largest degree of similarity between the standard image and the reference image; and calculating a distance from the distance measuring apparatus to the object or a three-dimensional location of the object based on the calculated disparity, a focal length of the standard imaging optical system, and a length of the baseline.

\* \* \* \* \*